United States Patent
Hatano et al.

(10) Patent No.: US 12,242,244 B2
(45) Date of Patent: Mar. 4, 2025

(54) CONTROL SYSTEM AND CONTROL METHOD

(71) Applicants: KABUSHIKI KAISHA TOSHIBA, Tokyo (JP); TOSHIBA DIGITAL SOLUTIONS CORPORATION, Kawasaki (JP)

(72) Inventors: Ken Hatano, Itabashi (JP); Rei Yano, Fuchu (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 529 days.

(21) Appl. No.: 17/457,782

(22) Filed: Dec. 6, 2021

(65) Prior Publication Data
US 2022/0091587 A1 Mar. 24, 2022

Related U.S. Application Data

(63) Continuation of application No. PCT/JP2020/021804, filed on Jun. 2, 2020.

(30) Foreign Application Priority Data

Jun. 6, 2019 (JP) .................................. 2019-105919

(51) Int. Cl.
*G05B 19/4155* (2006.01)
*G06F 3/14* (2006.01)

(52) U.S. Cl.
CPC .......... *G05B 19/4155* (2013.01); *G06F 3/14* (2013.01); *G05B 2219/31372* (2013.01)

(58) Field of Classification Search
None
See application file for complete search history.

(56) References Cited

U.S. PATENT DOCUMENTS 5,099,431 A * 3/1992 Natarajan ............... G06Q 10/06
257/E21.525
6,240,330 B1 * 5/2001 Kurtzberg ........ G05B 19/41875
700/121
6,480,755 B1 11/2002 Ootani et al.
(Continued)

FOREIGN PATENT DOCUMENTS

CN 1592259 A 3/2005
CN 101261695 A 9/2008
(Continued)

OTHER PUBLICATIONS

International Search Report issued Jul. 28, 2020 in PCT/JP2020/021804, filed on Jun. 2, 2020, 3 pages.
(Continued)

*Primary Examiner* — Jason Lin
(74) *Attorney, Agent, or Firm* — Maier & Maier, PLLC

(57) ABSTRACT

According to one embodiment, a control system comprises a plurality of devices and a controller. The controller stores first information representing a linkage of a plurality of functions that realize a single process and second information representing a correspondence between the devices and the functions, and controls the devices based on the first information and the second information to realize the single process.

7 Claims, 44 Drawing Sheets

(56) References Cited

U.S. PATENT DOCUMENTS

| | | | |
|---|---|---|---|
| 6,694,202 B2* | 2/2004 | Miyazaki | G06Q 10/087 705/28 |
| 6,856,848 B2* | 2/2005 | Matsumoto | G05B 19/41865 700/100 |
| 7,031,787 B2* | 4/2006 | Kalthoff | G06Q 10/06 700/121 |
| 7,133,878 B2* | 11/2006 | Kalthoff | G06Q 10/06 707/999.102 |
| 7,236,973 B2* | 6/2007 | Kalthoff | G06F 16/215 707/650 |
| 7,509,326 B2* | 3/2009 | Krabel | G06F 16/27 |
| 7,930,149 B2* | 4/2011 | Haag | G06Q 10/087 705/26.5 |
| 8,061,604 B1* | 11/2011 | Wobbe | G06Q 10/087 705/28 |
| 8,438,238 B2* | 5/2013 | Moser | G06F 16/254 707/610 |
| 10,274,440 B2* | 4/2019 | Buvid | G01N 23/20091 |
| 2003/0216819 A1 | 11/2003 | Yasuda | |
| 2005/0089034 A1 | 4/2005 | Sakata et al. | |
| 2007/0168065 A1* | 7/2007 | Nixon | G05B 19/0426 715/965 |
| 2011/0191788 A1 | 8/2011 | Jacobson et al. | |
| 2013/0325534 A1 | 12/2013 | Hitachi | |
| 2014/0317515 A1 | 10/2014 | Suda | |
| 2019/0025785 A1 | 1/2019 | Albers et al. | |
| 2019/0041831 A1 | 2/2019 | Albers et al. | |
| 2020/0265535 A1 | 8/2020 | Okada et al. | |

FOREIGN PATENT DOCUMENTS

| | | | | |
|---|---|---|---|---|
| CN | 103428259 A | | 12/2013 | |
| CN | 103975347 A | | 8/2014 | |
| CN | 105094092 B | * | 2/2018 | |
| DE | 102014100473 A1 | | 7/2015 | |
| JP | 8-214377 A | | 8/1996 | |
| JP | H11188580 A | | 7/1999 | |
| JP | 2001-344008 A | | 12/2001 | |
| JP | 2010-92292 A | | 4/2010 | |
| JP | 201190649 A | | 5/2011 | |
| JP | 2013009259 A | | 1/2013 | |
| JP | 2013-519167 A | | 5/2013 | |
| JP | 2014203359 A | | 10/2014 | |
| JP | 2015-75868 A | | 4/2015 | |
| WO | 2011052084 A1 | | 5/2011 | |
| WO | WO-2019093386 A1 | * | 5/2019 | G06N 3/04 |

OTHER PUBLICATIONS

Wenger et al., "Connecting PLCs with their Asset Administration Shell for Automatic Device Configuration", IEEE 16th International Conference on Industrial Informatics (INDIN), 2018, pp. 74-79.

Chen et al., "Intelligent Scheduling Algorithm and Application in Modernizing Manufacturing Services", IEEE International Conference on Services Computing, 2011, pp. 568-575.

Office Action issued on Jun. 14, 2024, in corresponding Chinese Application No. 202080041551.6, 11 pages.

* cited by examiner

| Function flow information |||||| 
|---|---|---|---|---|---|
| Product P1 (1000 units) || Product P2 (2000 units) || Product P3 (10000 units) ||
| Cutting start date and time | **** **** | Cutting start date and time | **** **** | Drilling start date and time | **** **** |
| Cutting end date and time | **** **** | Cutting end date and time | **** **** | Drilling end date and time | **** **** |
| Drilling start date and time | **** **** | Assembling start date and time | **** **** | Assembling start date and time | **** **** |
| Drilling end date and time | **** **** | Assembling end date and time | **** **** | Assembling end date and time | **** **** |
| Assembling start date and time | **** **** | Drilling start date and time | **** **** | Cutting start date and time | **** **** |
| Assembling end date and time | **** **** | Drilling end date and time | **** **** | Cutting end date and time | **** **** |
| ... | ... | Cutting start date and time | **** **** | ... | ... |
| ... | ... | Cutting end date and time | **** **** | ... | ... |
| ... | ... | ... | ... | ... | ... |

FIG. 2

| Link information | | | | |
|---|---|---|---|---|
| Device \ Function | Drilling (Product P1) | Drilling (Product P2) | Drilling (Product P3) | ... |
| Drill D1 | × | ○ | × | ... |
| Drill D2 | ○ | × | ○ | ... |
| Drill D3 | × | × | × | ... |
| Device \ Function | Cutting (Product P1) | Cutting (Product P2) | Cutting (Product P3) | ... |
| Milling machine m1 | × | × | × | ... |
| Milling machine m2 | ○ | ○ | × | ... |
| Milling machine m3 | × | × | ○ | ... |
| Device \ Function | Assembling (Product P1) | Assembling (Product P2) | Assembling (Product P3) | ... |
| Robot arm r1 | × | × | × | ... |
| Robot arm r2 | ○ | ○ | ○ | ... |
| Robot arm r3 | × | × | × | ... |

F I G. 3

| Function flow information |  |
|---|---|
| Product P1 (1000 units) |  |
| Cutting start date and time | **** |
| Cutting end date and time | **** |
| First drilling start date and time | **** |
| Second drilling start date and time | **** |
| First drilling end date and time | **** |
| Second drilling end date and time | **** |
| Assembling start date and time | **** |
| Assembling end date and time | **** |
| ... | ... |

F I G. 5

| Function flow information |  |
|---|---|
| Product P2 (2000 units) |  |
| Cutting start date and time | **** |
| Cutting end date and time | **** |
| Assembling start date and time | **** |
| Assembling end date and time | **** |
| Drilling start date and time | **** |
| Drilling end date and time | **** |
| Cutting start date and time | **** |
| Cutting end date and time | **** |
| ... | ... |

F I G. 6

| Function flow information | |
|---|---|
| Product P3 (10000 units) | |
| First drilling start date and time | **** |
| Second drilling start date and time | **** |
| First drilling end date and time | **** |
| Second drilling end date and time | **** |
| Assembling start date and time | **** |
| Assembling end date and time | **** |
| Cutting start date and time | **** |
| Cutting end date and time | **** |
| ... | ... |

F I G. 7

| Link information | | | | | | |
|---|---|---|---|---|---|---|
| Function \ Device | First drilling (Product P1) | Second drilling (Product P1) | Drilling (Product P2) | First drilling (Product P3) | Second drilling (Product P3) | ... |
| Drill D1 | × | × | ○ | × | × | ... |
| Drill D2 | ○→× | × | × | ○→× | × | ... |
| Drill D3 | × | ○ | × | × | ○ | ... |

F I G. 8

| Function flow information |  |
|---|---|
| Product P1 (1000 units) | |
| Cutting start date and time | **** |
| Cutting end date and time | **** |
| Second drilling start date and time | **** |
| Second drilling end date and time | **** |
| Assembling start date and time | **** |
| Assembling end date and time | **** |
| ... | ... |

F I G. 10

| Function flow information |  |
|---|---|
| Product P3 (10000 units) | |
| First drilling start date and time | **** |
| First drilling end date and time | **** |
| Second drilling start date and time | **** |
| Second drilling end date and time | **** |
| Assembling start date and time | **** |
| Assembling end date and time | **** |
| Cutting start date and time | **** |
| Cutting end date and time | **** |
| ... | ... |

F I G. 11

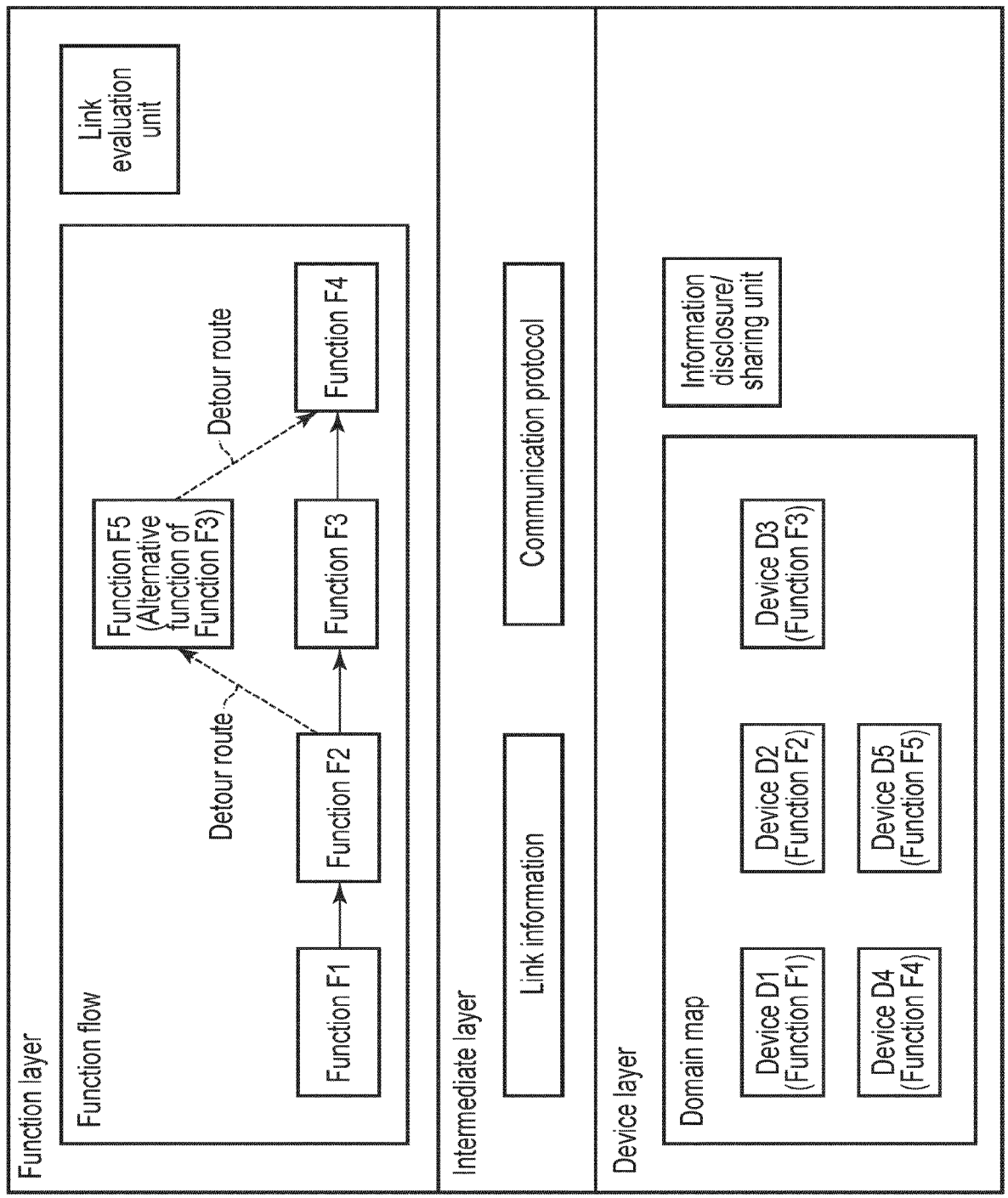
F I G. 12

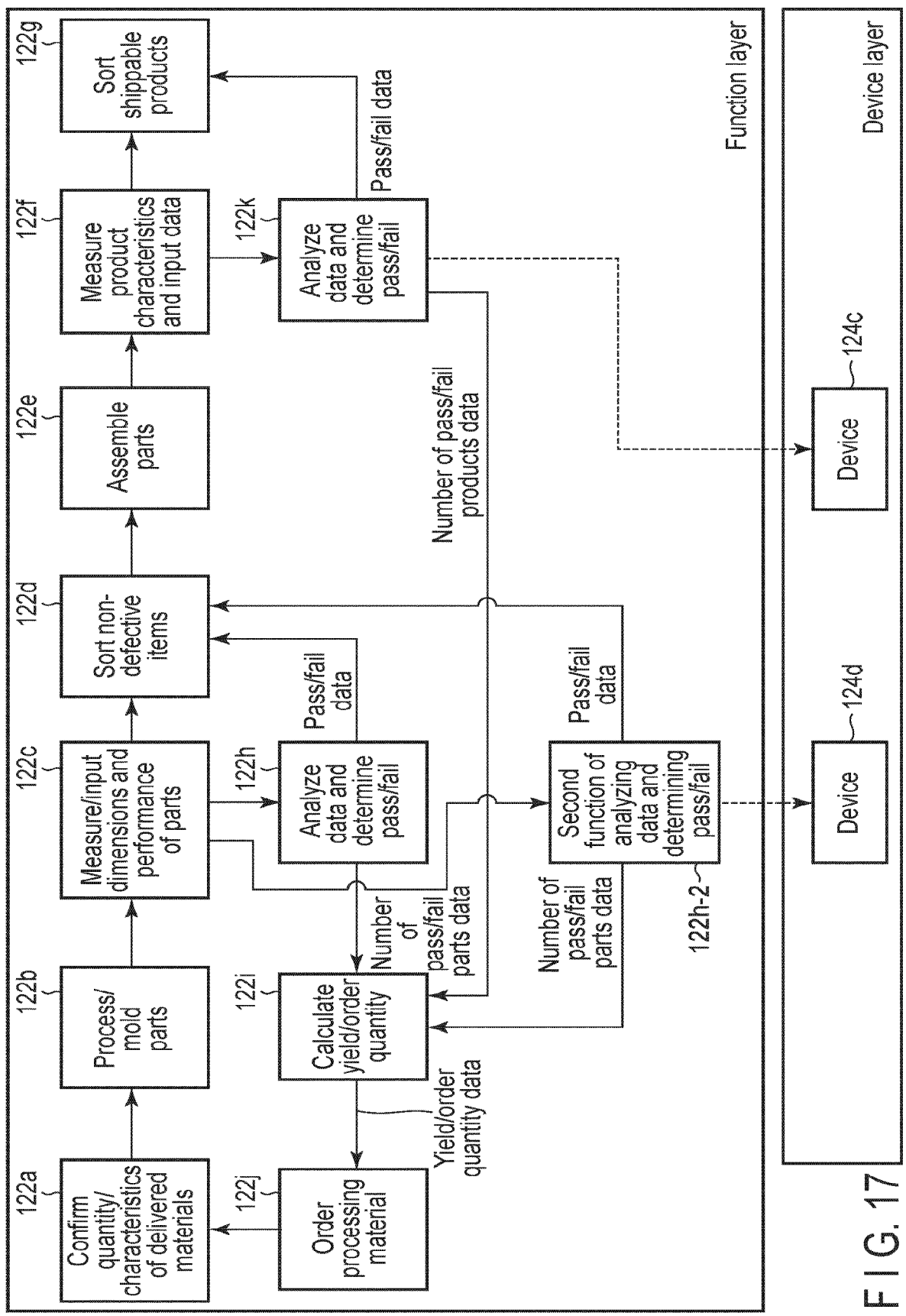
F I G. 17

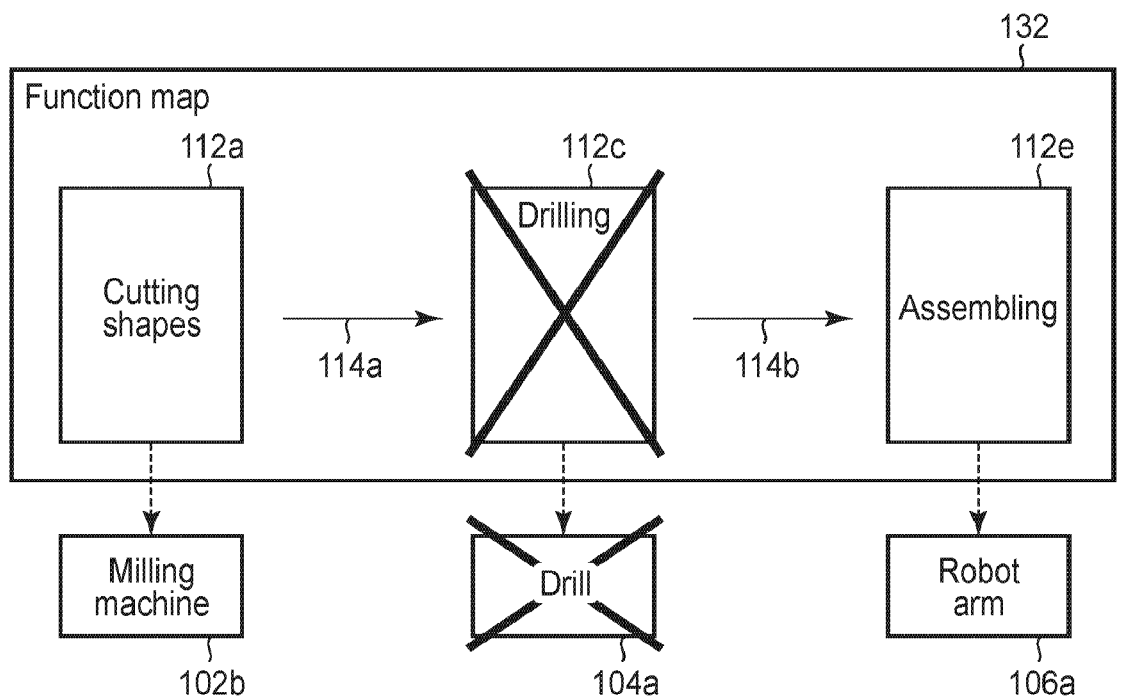
F I G. 18
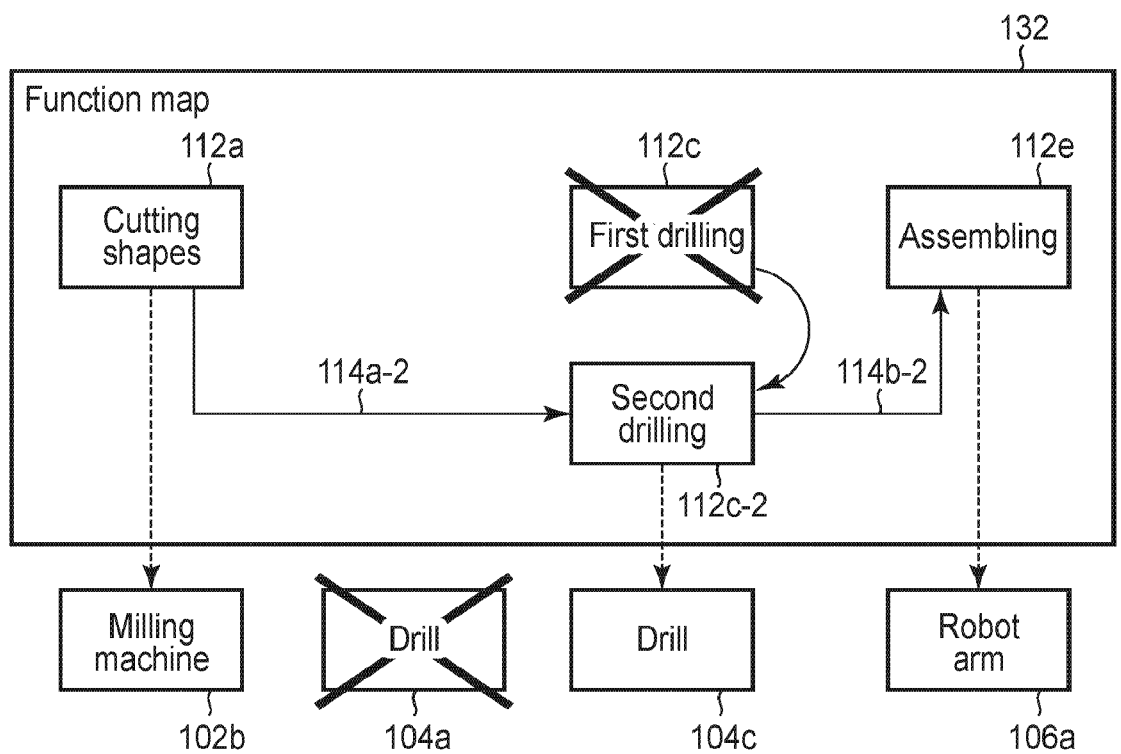
F I G. 19

| Operation rate management information | | | |
|---|---|---|---|
| Company | Factory | Device | Operation rate |
| Company CA | Factory FA1 | Milling machine M1 | 50% |
| | | Milling machine M2 | 30% |
| | | ... | ... |
| | | Drill D1 | 0% |
| | | Drill D2 | 90% |
| | | ... | ... |
| | | Robot arm R1 | 75% |
| | | Robot arm R1 | 0% |
| | | ... | ... |
| | Factory FA2 | Milling machine M1 | 0% |
| | | ... | ... |
| | | Drill D1 | 0% |
| | | ... | ... |
| | | Robot arm R1 | 90% |
| | | ... | ... |
| | ... | ... | ... |
| Company CB | Factory FB1 | Milling machine M1 | 40% |
| | | ... | ... |
| | | Drill D1 | 0% |
| | | ... | ... |
| | | Robot arm R1 | 90% |
| | | ... | ... |
| | Factory FB2 | Milling machine M1 | 80% |
| | | ... | ... |
| | | Drill D1 | 80% |
| | | ... | ... |
| | | Robot arm R1 | 0% |
| | | ... | ... |
| | ... | ... | ... |
| ... | ... | ... | ... |

F I G. 20

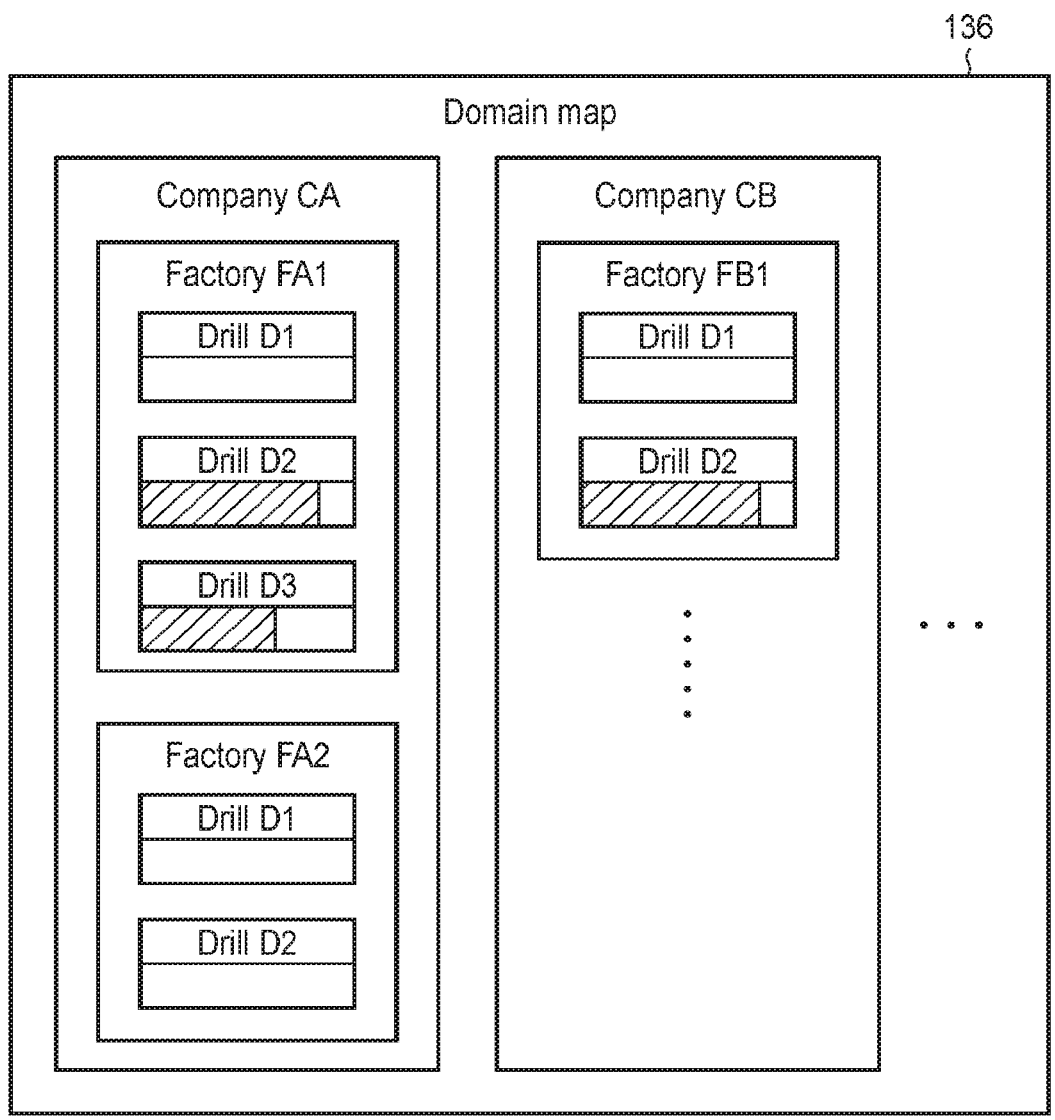
F I G. 21

| Device | Link information | | | |
|---|---|---|---|---|
| | Function | Function F1 | Function F2 | Function F3 |
| Device D1<br>Device identification information : ****<br>Domain device identification information : ****<br>Performance : ****<br>Additional performance : ****<br>Attributes : **** | Function flow creation date and time | **** | **** | ⋯ |
| | Unlinked date and time | — | — | **** |
| Device D2<br>Device identification information : ****<br>Domain device identification information : ****<br>Performance : ****<br>Additional performance : ****<br>Attributes : **** | Function flow creation date and time | **** | — | **** |
| | Unlinked date and time | — | **** | — |
| Device D3 | | ⋮ | ⋮ | ⋮ |
| ⋮ | ⋮ | ⋮ | ⋮ | ⋮ |

F I G. 25

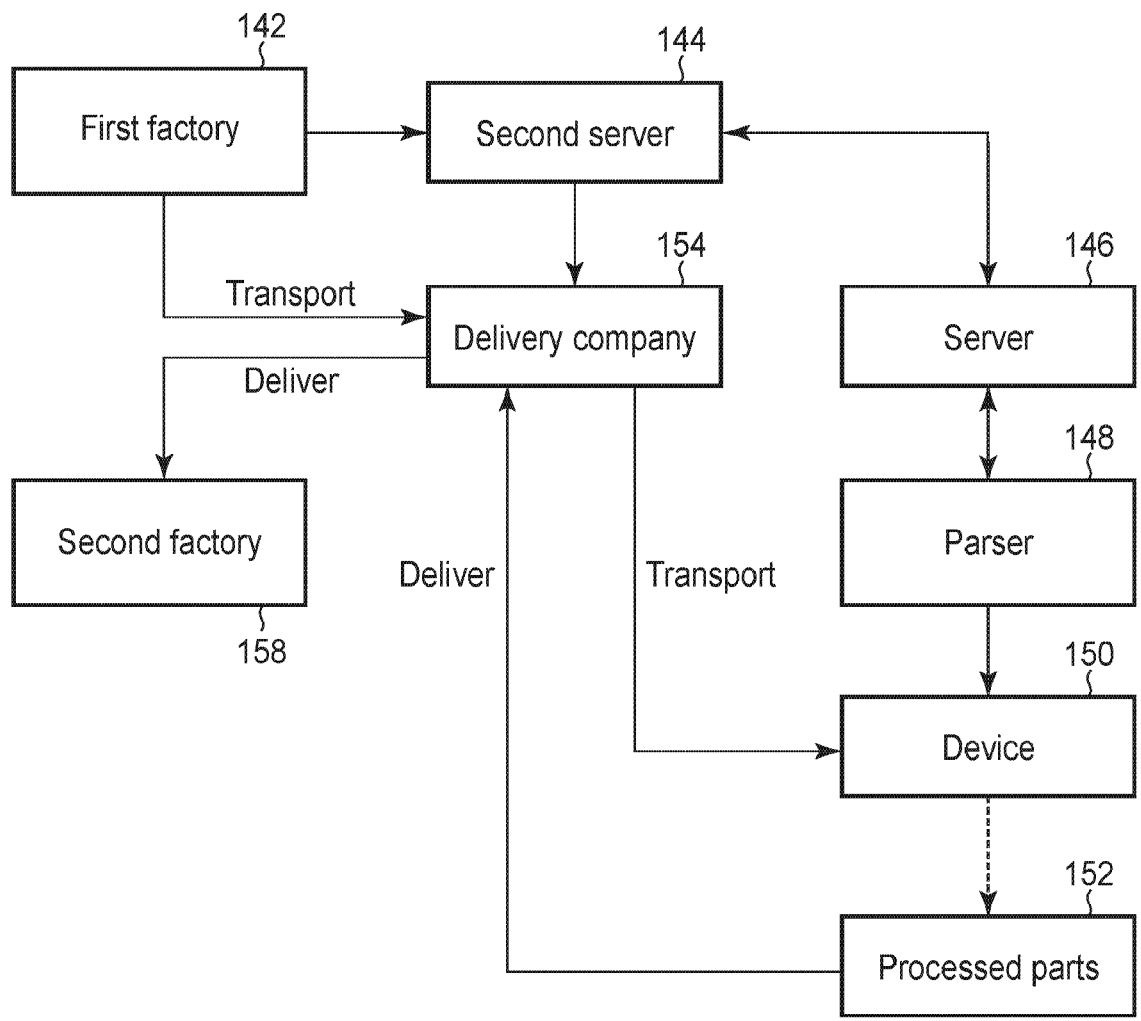
F I G. 26

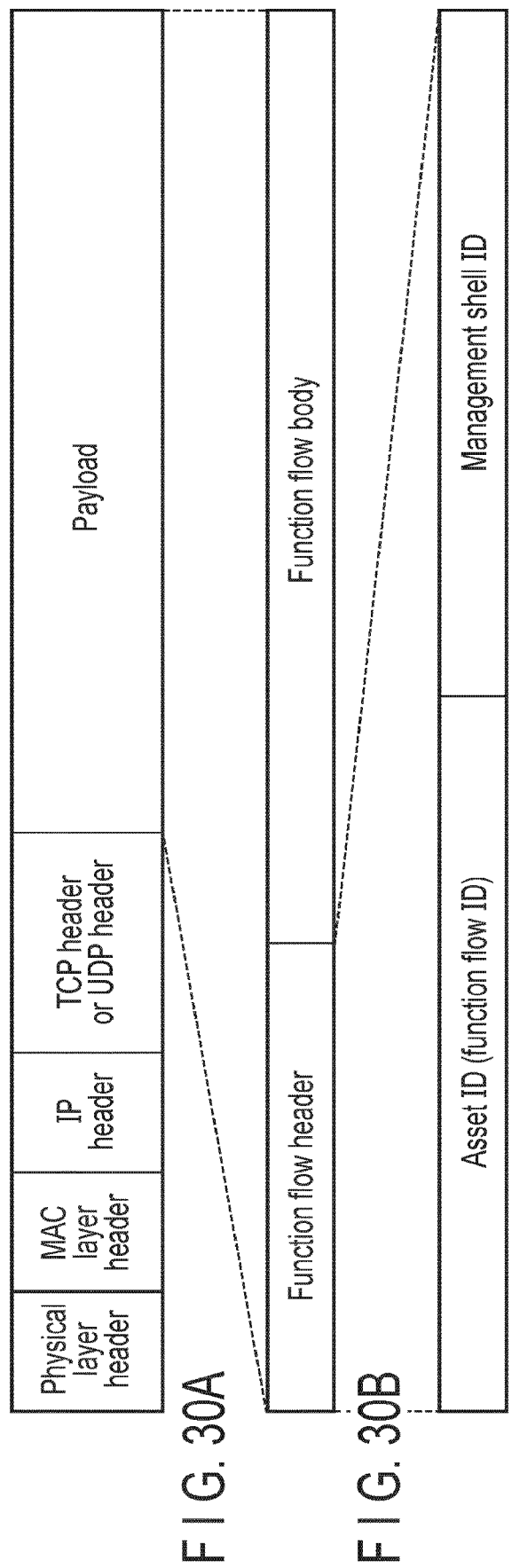

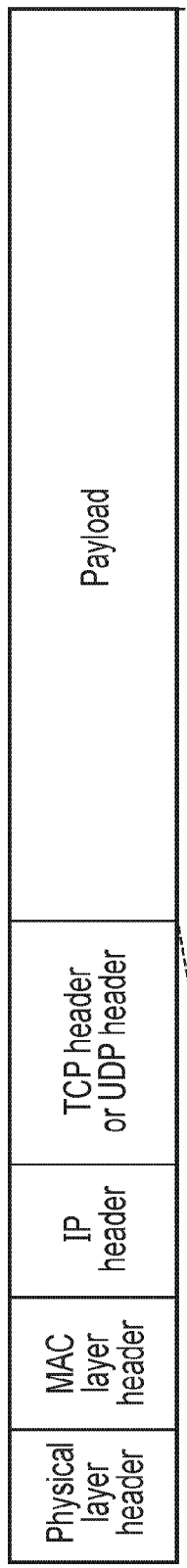
F I G. 31A
F I G. 31B
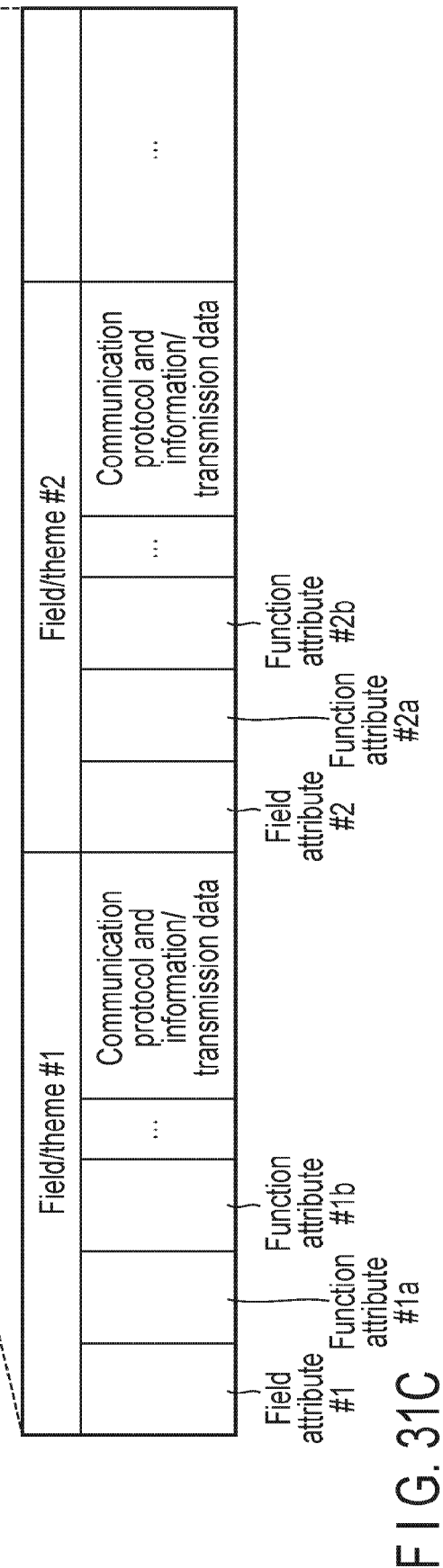
F I G. 31C

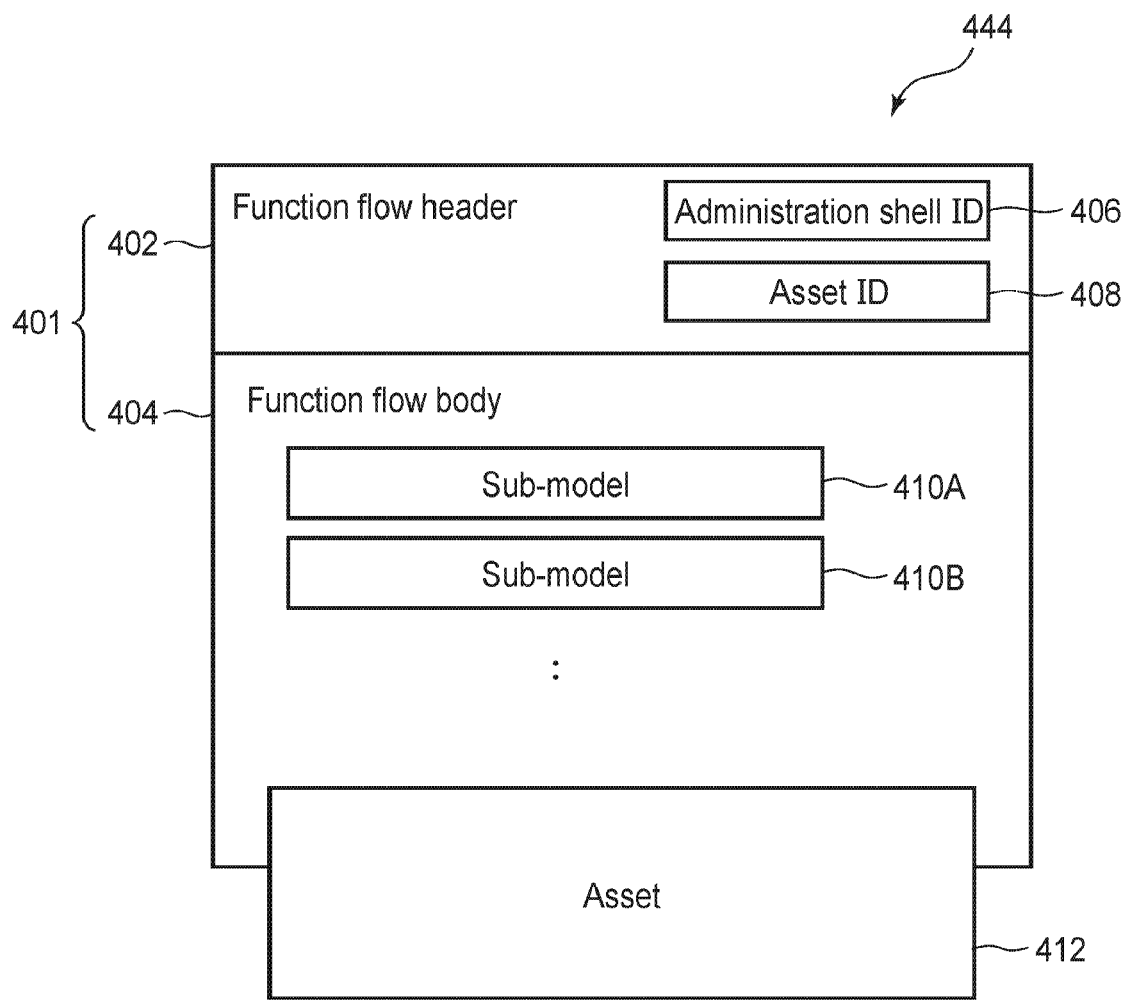
F I G. 32

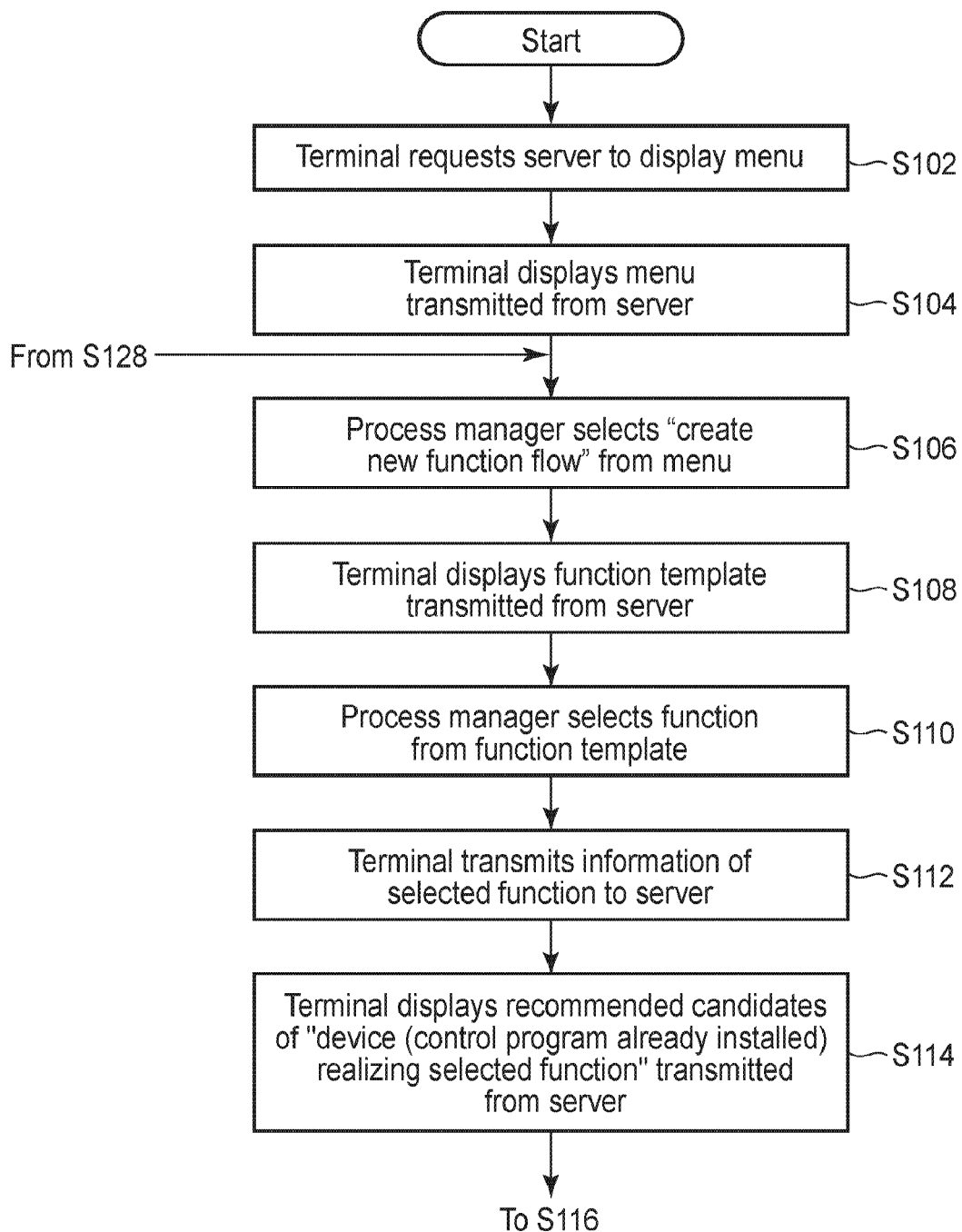
F I G. 38

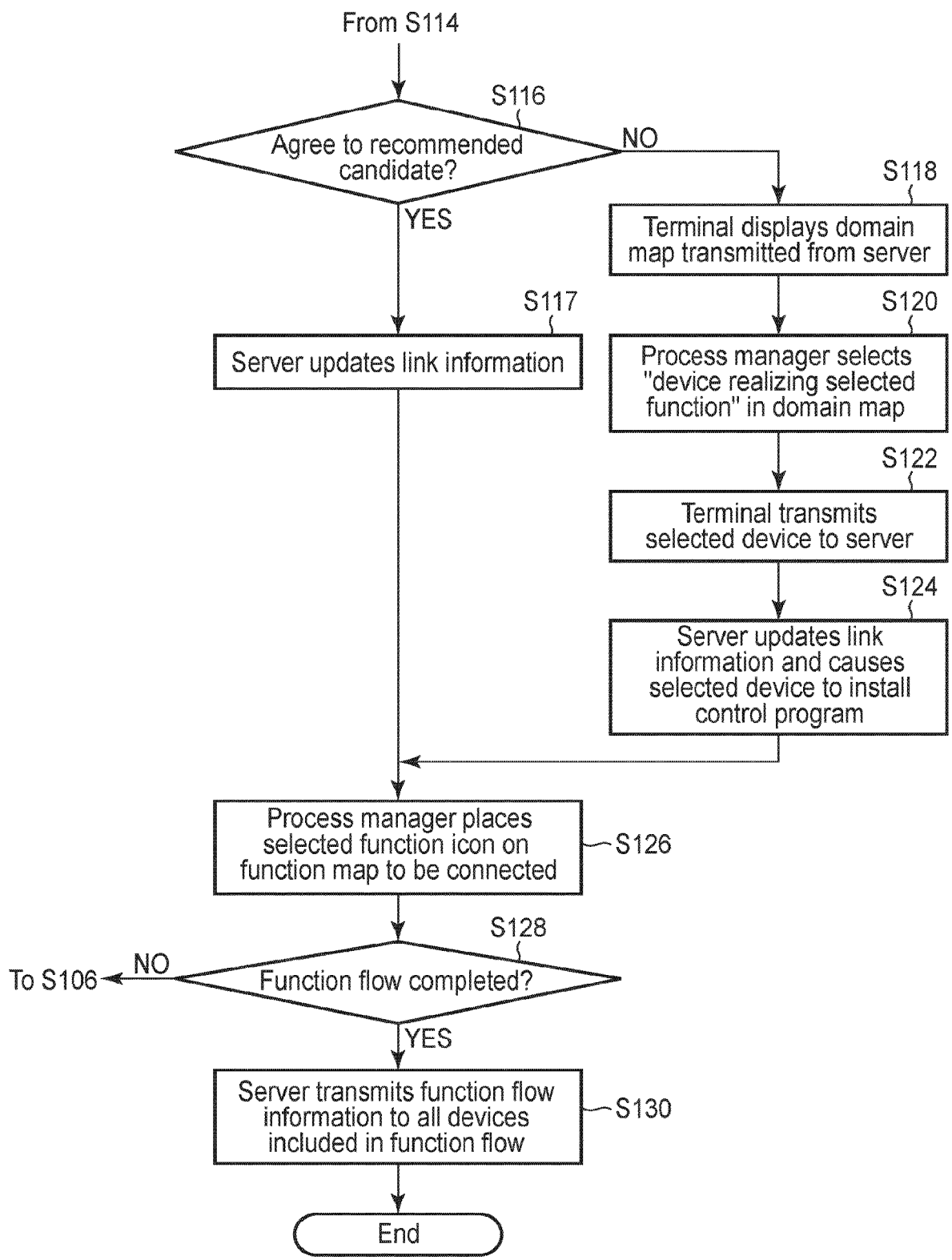
F I G. 39

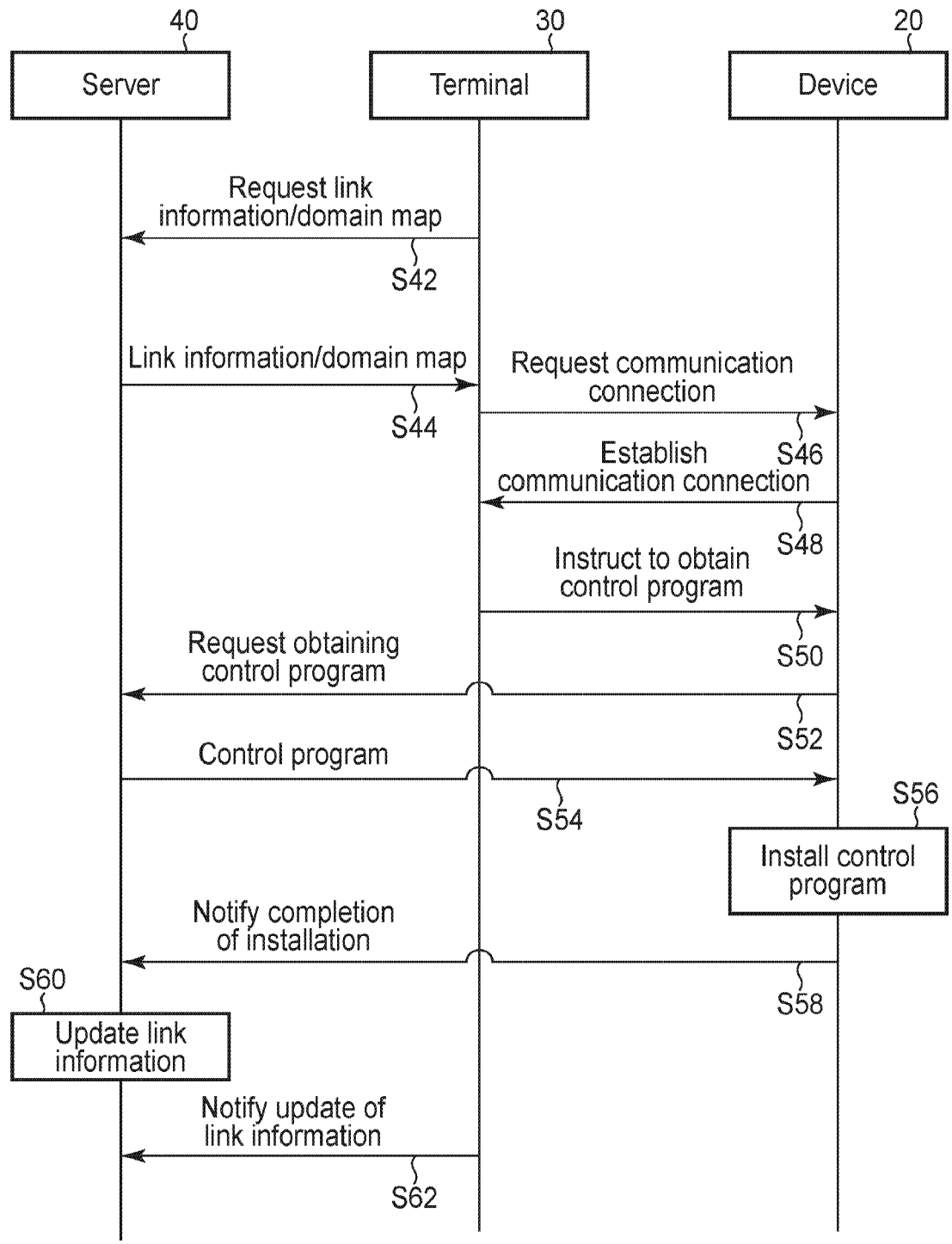
F I G. 40

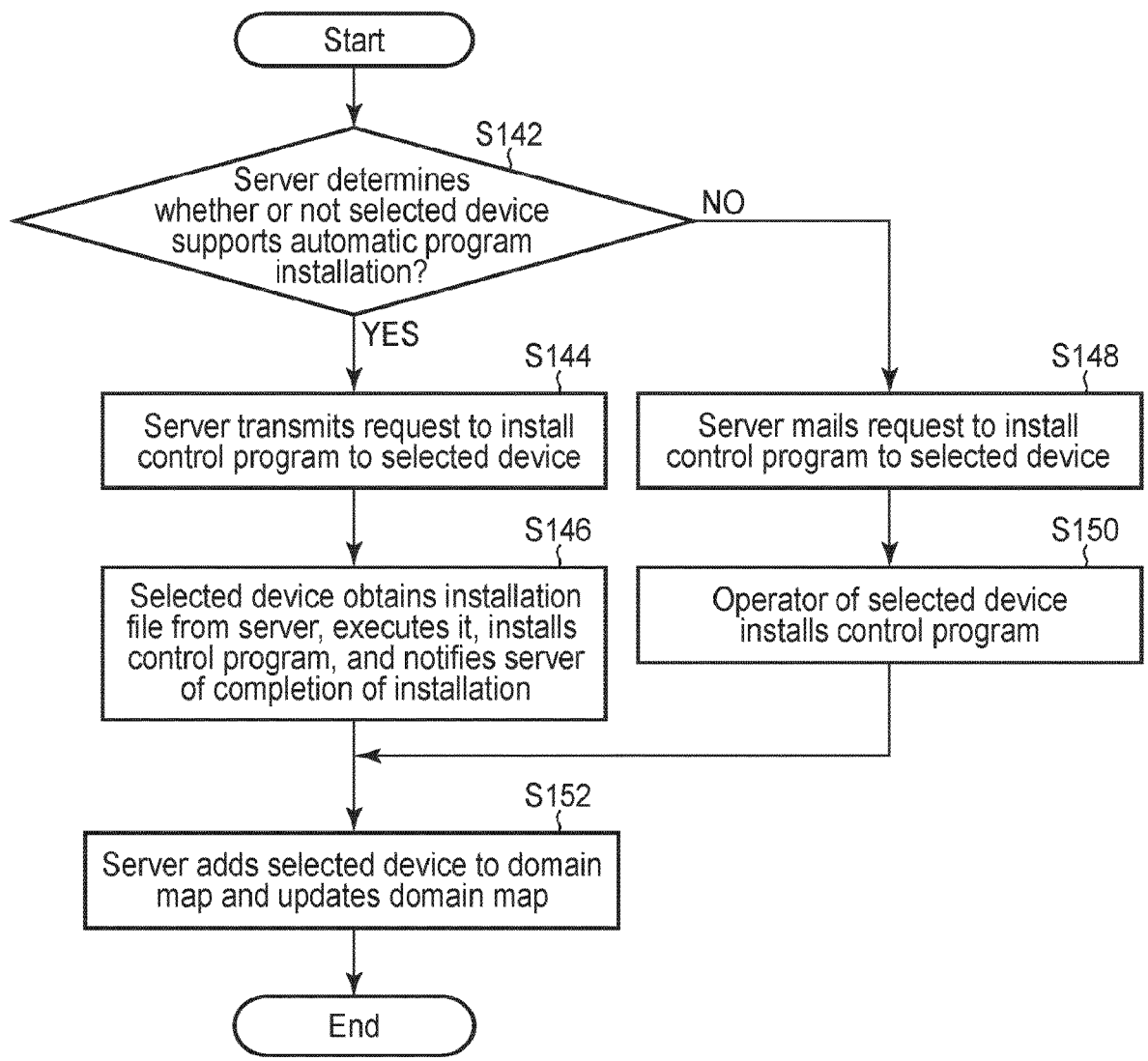
F I G. 41

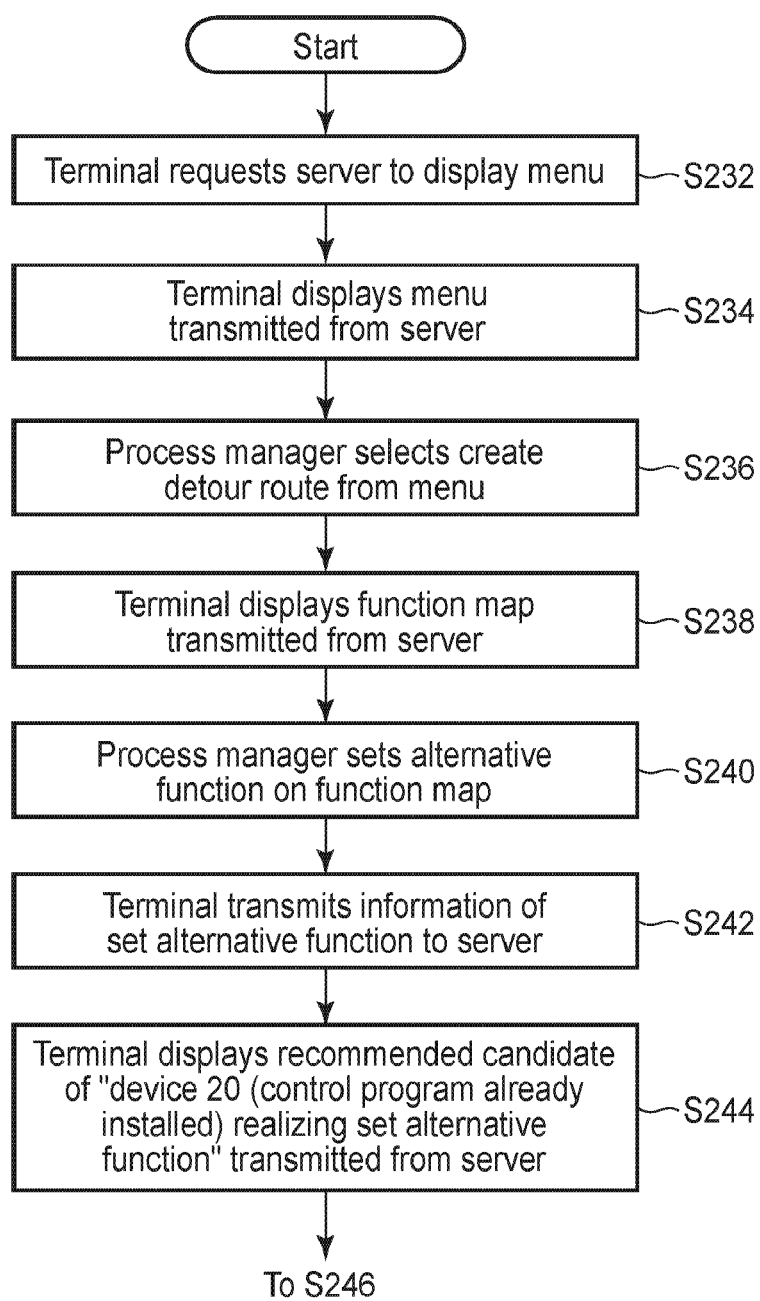
F I G. 44

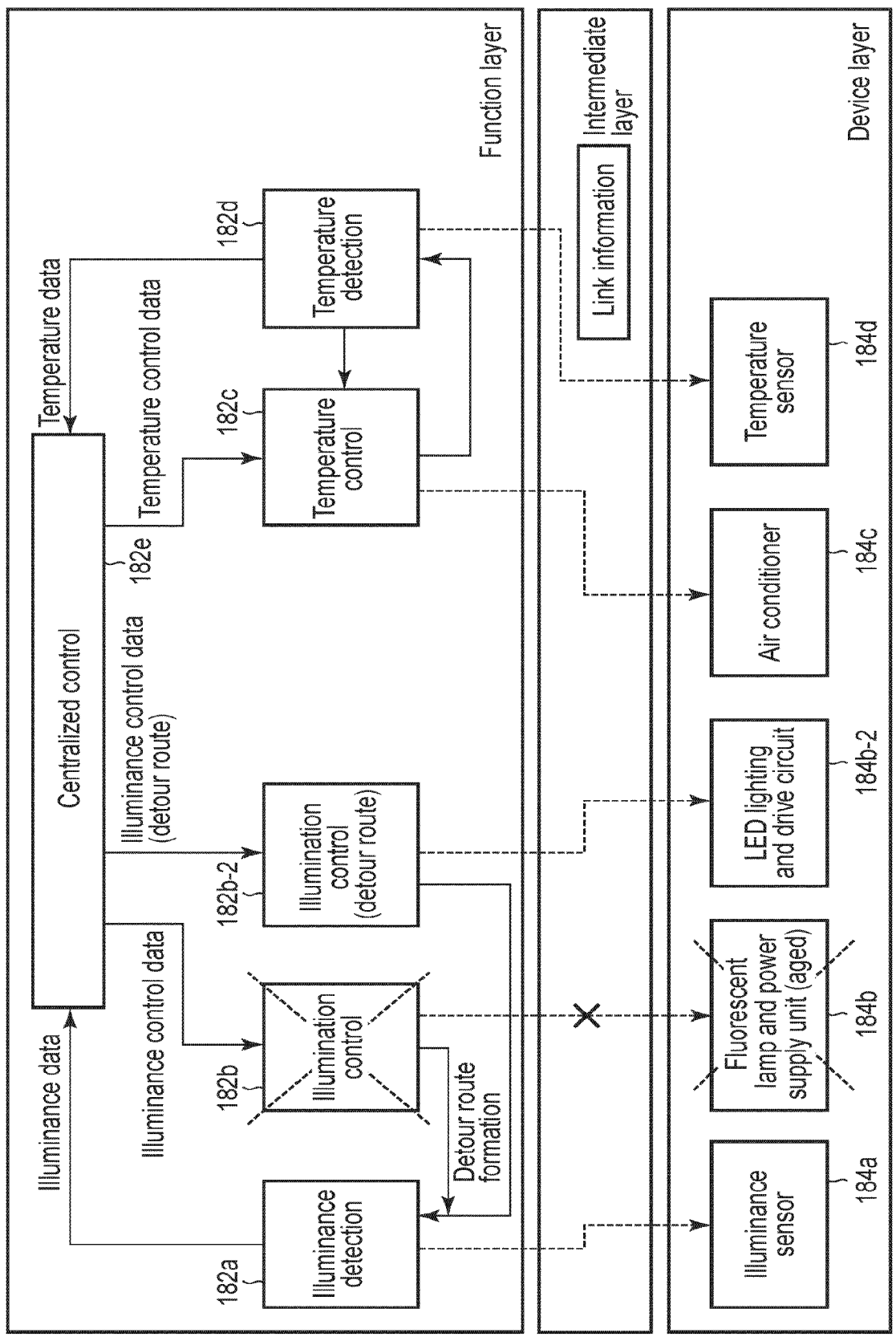
F I G. 46

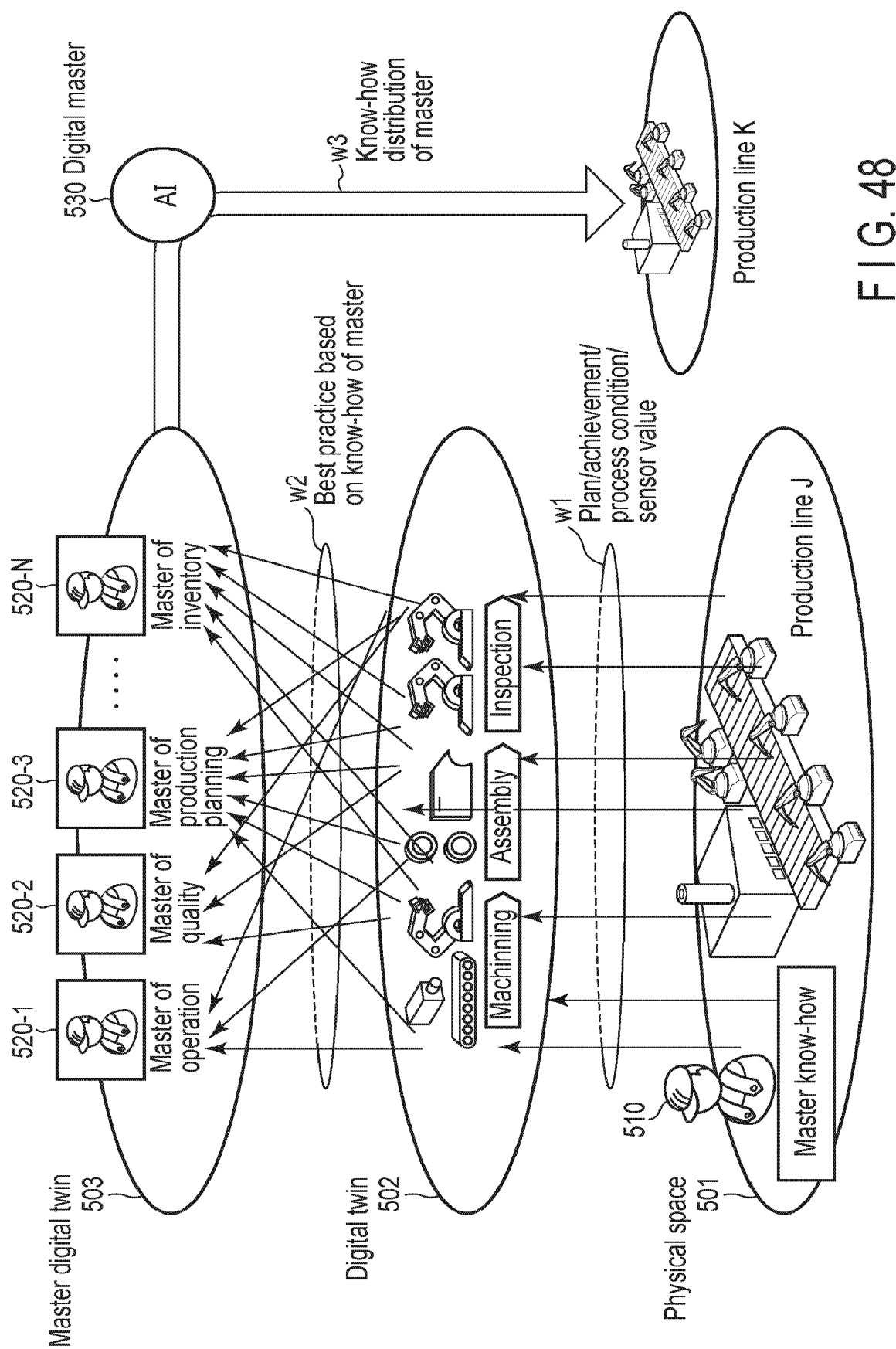
F I G. 48

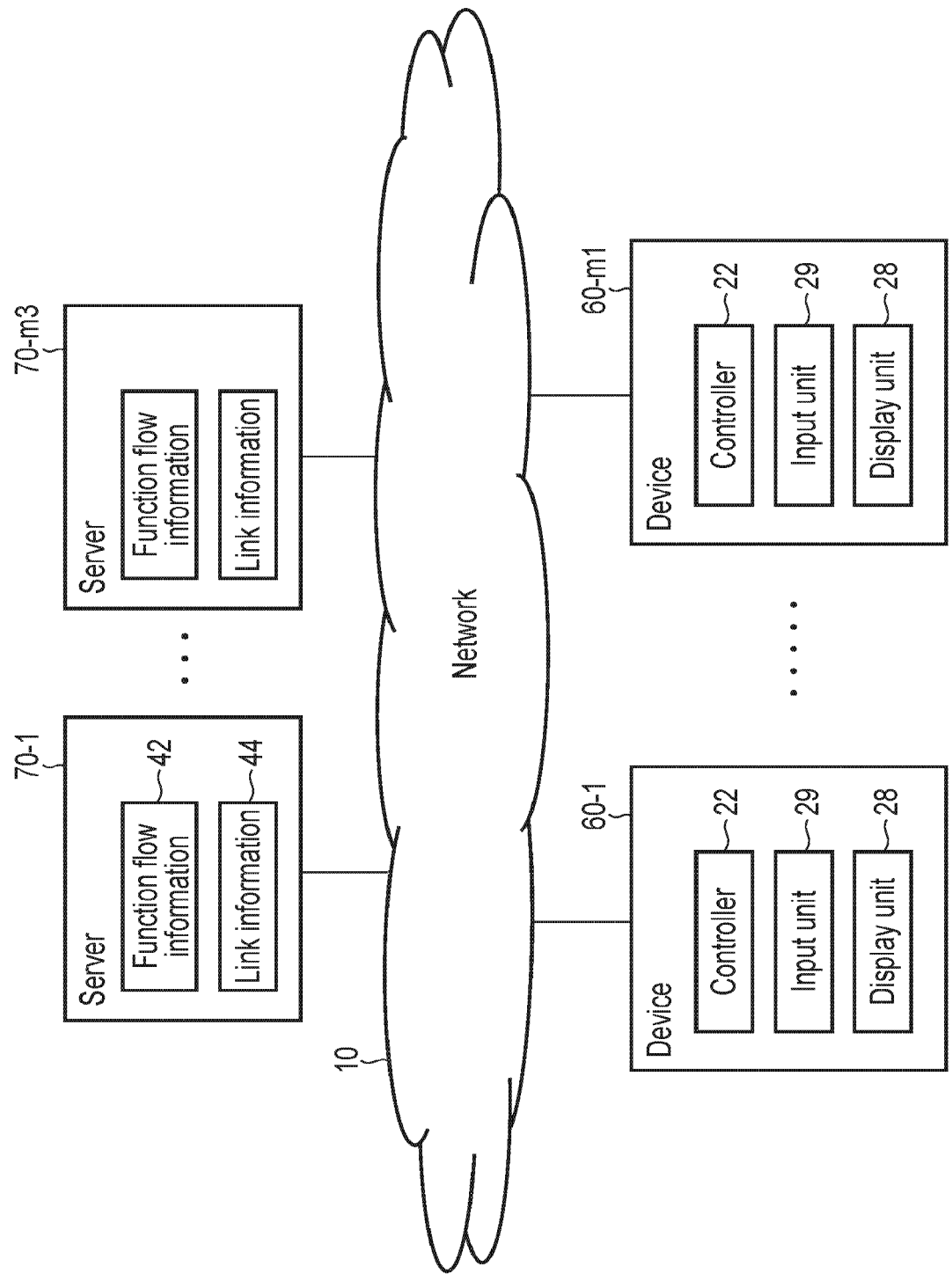
F I G. 49

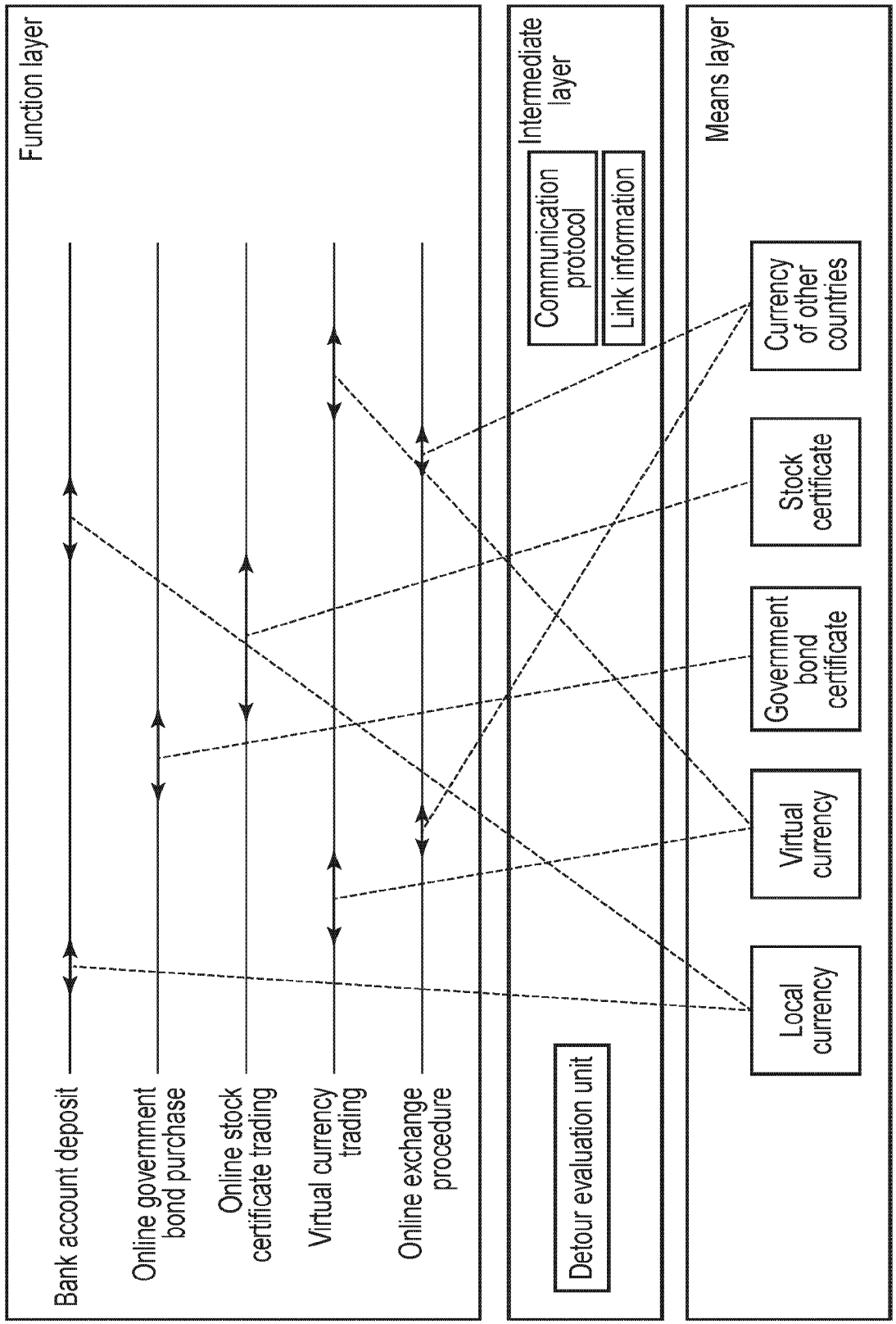
F I G. 50

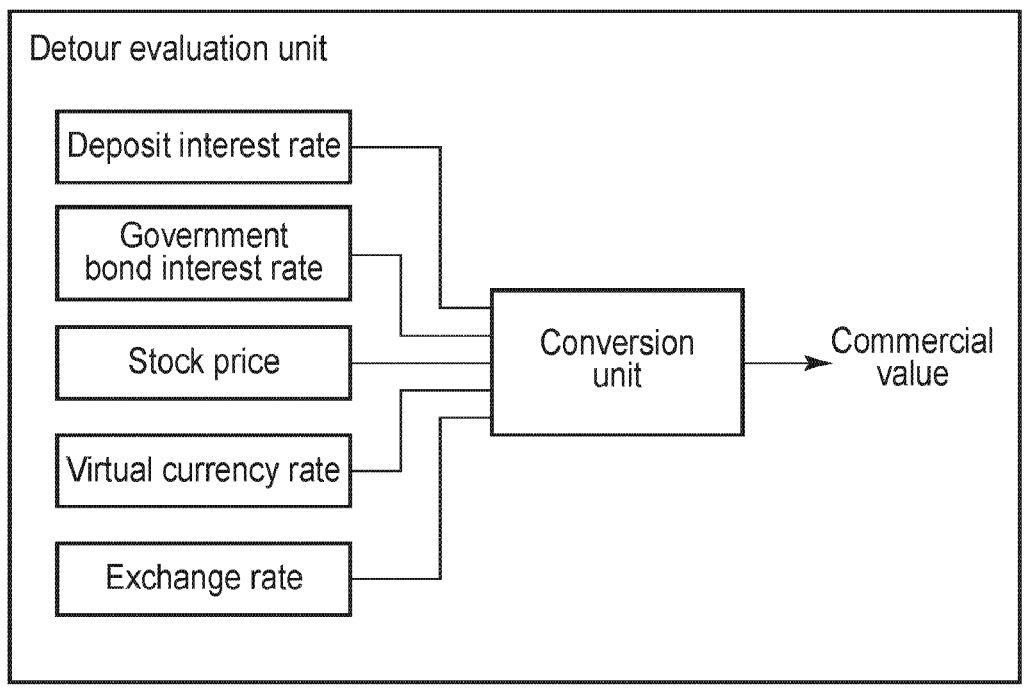
F I G. 51

CONTROL SYSTEM AND CONTROL METHOD

CROSS-REFERENCE TO RELATED APPLICATIONS

This application is a Continuation Application of PCT Application No. PCT/JP2020/021804, filed Jun. 2, 2020 and based upon and claiming the benefit of priority from Japanese Patent Application No. 2019-105919, filed Jun. 6, 2019, the entire contents of all of which are incorporated herein by reference.

FIELD

Embodiments described herein relate generally to a control system and control method for controlling linkage of multiple devices.

BACKGROUND

In recent years, with the progress of networks, a control system has been developed in which multiple devices are linked together to perform a single process. Each of the multiple devices realizes each of multiple functions that constitute the single process. Once the order in which the multiple functions are realized is determined, the multiple devices assigned to the multiple functions need to work in coordination in a predetermined order according to the order in which the functions are to be realized. The control system controls the linkage of the multiple devices.

In a case where any of the devices fails, the linkage of the multiple devices must be changed. In conventional control systems, the correspondence between functions and devices is often fixed to one to one in advance. Therefore, the linkage could not be easily changed in the event of a device failure, etc.

BRIEF DESCRIPTION OF THE DRAWINGS

FIG. 2 shows an example of function flow information used in an example of process management.

FIG. 3 shows an example of link information used in an example of process management.

FIG. 5 shows an example of function flow information used to change process management.

FIG. 6 shows another example of the function flow information used to change process management.

FIG. 7 shows a still another example of the function flow information used to change process management.

FIG. 8 shows an example of link information used to change process management.

FIG. 10 shows an example of function flow information used in another example of changing process management.

FIG. 11 shows an example of function flow information used in another example of changing process management.

FIG. 12 shows an example of a hierarchical structure of process management according to the first embodiment.

FIG. 17 shows a concept of changing the function flow shown in FIG. 16.

FIG. 18 shows an example of a function map used to create a detour route.

FIG. 19 shows an example of an operation to create a detour route using a function map.

FIG. 20 shows an example of operation rate management information used to create a detour route.

FIG. 21 shows a display example of a domain map based on the operation rate management information.

FIG. 25 shows an example of link information used to create a detour route.

FIG. 26 shows an example of transport of parts when creating a detour route.

FIGS. 30A, 30B, and 30C show an example of a function flow header in a payload of a second example of handover data.

FIGS. 31A, 31B, and 31C show an example of a function flow body in a payload of the second example of handover data.

FIG. 32 is a schematic diagram of a structure of an administration shell.

FIG. 38 is a flowchart showing an example of creating function flow.

FIG. 39 is a flowchart showing an example of creating function flow.

FIG. 40 is a flowchart showing an example of updating link information.

FIG. 41 is a flowchart showing an example of updating domain map.

FIG. 44 is a flowchart showing an example of creating a detour route.

FIG. 46 is a schematic view of an example of a building management system, which is an example of a control system according to a second embodiment.

FIG. 48 explains a concept of manufacturing skill control system according to a third embodiment.

FIG. 49 is a block diagram showing an example of an asset management system, which is an example of a control system according to the third embodiment.

FIG. 50 is a schematic view of an example of an asset management system.

FIG. 51 shows an example of a detour evaluation unit of the asset management system.

DETAILED DESCRIPTION

Figure 1:
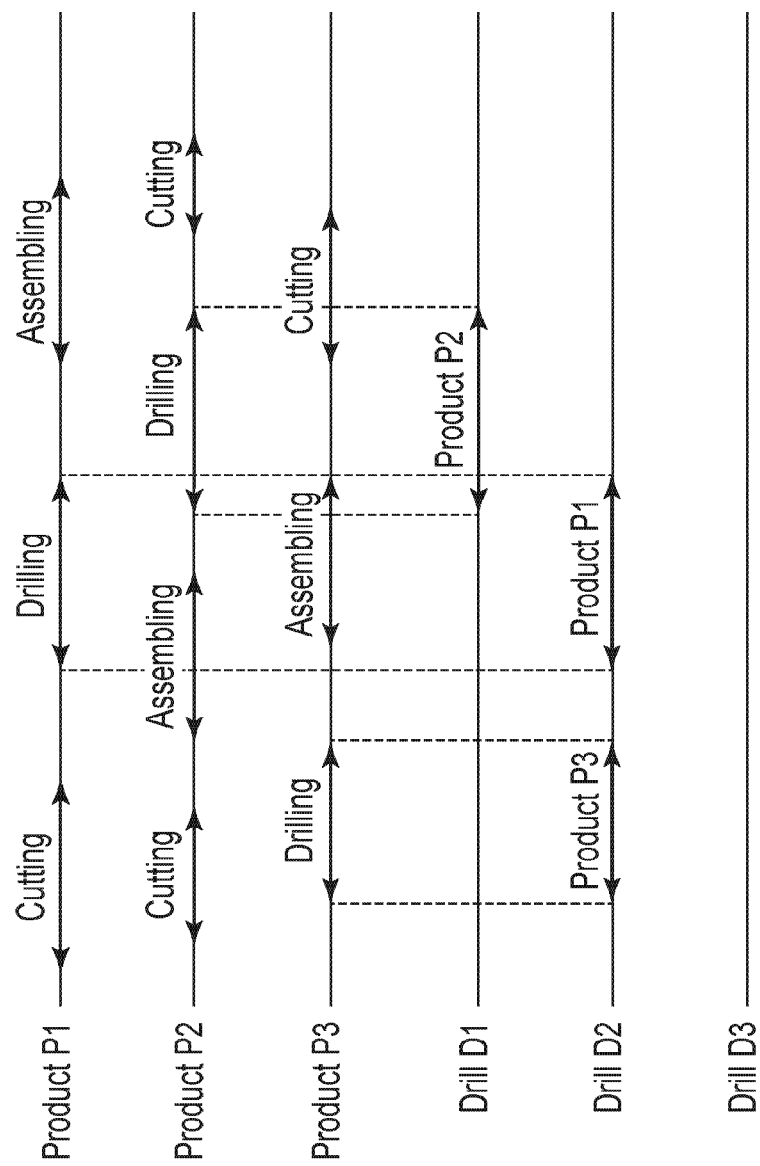
FIG. 1 is a schematic view of an example of process management by a control system according to a first embodiment.

Embodiments of the present invention are described below with reference to the accompanying drawings. The following description is intended to exemplify devices and methods for embodying the technical ideas of the embodiments, and the technical ideas of the embodiments are not limited to the structure, shape, arrangement, materials, etc., of the components described below. Variations that can be readily conceived by those skilled in the art are naturally included in the scope of the disclosure. For the sake of clarity of explanation, the size, thickness, planar dimension, or shape of each element may be schematically represented in the drawings with modifications to the actual implementation. In multiple drawings, elements may be included that have different dimensional relationships and proportions to each other. In multiple drawings, corresponding elements may have the same reference numerals and duplicate descriptions may be omitted. Although some elements may be given multiple names, the examples of these names are merely illustrative, and do not preclude the use of other names for these elements. In addition, elements that are not given multiple names are not precluded from using other names. In the following description, "connection" means not only a direct connection but also an indirect connection through other elements.

In general, according to one embodiment, a control system comprises a plurality of devices capable of realizing a plurality of functions, and a controller. The controller stores first information indicating when and in what order two or more functions necessary to realize a single process are to be realized and second information indicating which of the devices is assigned to each of the two or more functions, and controls the device assigned to the two or more functions among the devices based on the first information and the second information to realize the single process.

FIRST EMBODIMENT

[Overview of Process Management]

Although a control system according to the embodiment can be applied to various systems, an example of the control system applied to process management will be described as an example. Process management, for example, manages a manufacturing process of a manufacturing system that manufactures products from materials and parts. In order to manufacture a product, various functions are required. Items that realize the functions are referred to as devices. The process management manages the order in which multiple functions are realized and correspondence between devices and functions.

As a simple example of a manufacturing process, an example in which a material is cut into a predetermined shape to make a part, a hole of a predetermined size is drilled at a predetermined portion of the part, and another part is inserted into the hole to make a product is considered. Examples of functions are cutting materials, drilling holes in parts, and assembling multiple parts. An example of a device that realizes the cutting function is a milling machine. An example of a device that realizes a drilling function is a drill. An example of a device that realizes the assembling function is a robot arm. A worker operates an operation panel of a machining device to perform a predetermined processing work, and manufactures the product. Sometimes a computer-controlled machining device is used instead of the machining device operated by the worker. For example, sometimes the machining device such as milling machines, drills, robot arms, etc., may be replaced by a numerical control (NC) machining device. The NC machining device is operated by a control program. When the control program is changed, different functions can be realized by the same NC machining device. For example, an NC drill that drills a hole 10 cm in depth at a point 10 cm from the right edge of the part and 10 cm from the upper edge of the part will realize the function of "drilling a hole 5 mm in diameter and 10 cm in depth at a point 10 cm from the right edge of the part and 10 cm from the upper edge of the part". If the control program of the NC drill is changed, the NC drill can realize the function of "drilling a hole of 1 cm in diameter and 5 cm in depth at a point 5 cm from the right edge of the part and 20 cm from the upper edge of the part". Therefore, examples of devices are not limited to hardware such as the machining devices, but also include software such as the control program. Furthermore, hardware is not limited to dedicated hardware, but also includes general-purpose processing devices such as personal computers. In this case, too, a program installed on a general-purpose processing device is an example of the device. A system including a general-purpose processing device can change the functions to be realized by changing the program of the general-purpose processing device according to changes in the usage environment or purpose of use, thereby improving the diversity, autonomy, and rapid adaptability of the system.

A plurality of devices that realize each of the multiple functions required to make a single product may be arranged in a concentrated manner in the same factory of a single company, or may be located in different factories of a single company. Furthermore, the devices may be distributed in multiple locations across multiple companies. The devices are connected to each other via a network. A server is also connected to the network. The devices may be connected directly to each other without the server, or may be connected to each other via the server.

The control system notifies each device of the function to be realized, and each device realizes the function. When one device that realizes one function realizes the function, the parts obtained by the realization of the function are transported to a next device that realizes a next function to be realized, and information indicating the result of the realization of the function is transmitted to the next device via the network.

FIG. 1 is a schematic view of an example of process management in which the control system according to the embodiment is applied. In the process management, the flow of functions for each product is managed as a function flow.

The function flow indicates when and in what order multiple functions are to be realized, i.e., the linkage among multiple functions. Information representing the function flow is referred to as function flow information (first information). FIG. 1 shows the function flow for products P1, P2, and P3. The process management manages multiple devices that realize each of the multiple functions, and the combination of which device realizes which function is managed as link information (second information). The link information indicates which function corresponds to which device (also referred to as a link), i.e., which function is assigned to which device. FIG. 1 shows the links for drills D1, D2, and D3. Based on the function flow information and the link information, the device that realizes each function is recognized, the device is operated according to the function flow information, and the product can be manufactured.

A manufacturing manager may create the function flow information before the start of manufacturing and enter the information into the system. Alternatively, a personal computer or the like may scan a drawing of the product, automatically create the function flow information from the drawing, and enter the information into the system. In the case of automatically creating the function flow information, an approval of the manufacturing manager may be required.

As shown in FIG. 1, the function flow for product P1 indicates that the functions are realized in the following order: cutting, drilling, and assembling. The function flow for product P2 indicates that the functions are realized in the order of cutting, assembling, drilling, and cutting. The function flow for product P3 indicates that the functions are realized in the following order: drilling, assembling, and cutting. The function flow also indicates the total number of products to be manufactured.

The link information for drill D1 indicates that drill D1 realizes the drilling function of product P2. The link information for drill D2 indicates that drill D2 realizes the drilling function of product P3 and the drilling function of product P1. The link information for drill D3 indicates that drill D3 does not realize any function. For machining devices other than drills, such as milling machines and robot arms, link information similar to the link information for drills is also managed.

Before each drill D1, D2, and D3 realizes the function assigned to it, the control program corresponding to the function to be realized is installed in each drill D1, D2, and D3. After each drill D1, D2, and D3 has realized the function, the control program corresponding to the realized function is uninstalled from each drill D1, D2, and D3.

FIG. 2 shows an example of the function flow information used in the process management according to the embodiment. The function flow information is set for each product to be manufactured. The function flow information for product P1 (e.g., 1000 units) includes cutting start date and time, cutting end date and time, drilling start date and time, drilling end date and time, assembling start date and time, and assembling end date and time. These dates and times are future dates and times, and are set according to a manufacturing schedule. Similarly, the function flow information for product P2 (e.g., 2000 units) includes the cutting start date and time, cutting end date and time, assembling start date and time, assembling end date and time, drilling start date and time, drilling end date and time, cutting start date and time, and cutting end date and time. The function flow information for product P3 (e.g., 10000 units) includes the drilling start date and time, drilling end date and time, assembling start date and time, assembling end date and time, cutting start date and time, and cutting end date and time. In this manner, the order of cutting, drilling, and assembling may differ depending on the product. Although FIG. 2 shows the function flow information for the entire manufacturing flow of a plurality of products, sub-function flow information similar to the function flow information shown in FIG. 2 may be set for each individual product. In other words, there may be as many sub-function flow information as there are products.

FIG. 3 shows an example of link information used in process management according to the embodiment. The link information includes a list of functions assigned to each device the system comprises. The assignment of a function to a device is also referred to as a link. A circle mark indicates that the function has been assigned to the device and the link between the function and the device has been set, and an "x" mark indicates that the function has not been assigned to the device and the link between the function and the device has not been set, i.e., has been cancelled.

The link information regarding the drill indicates that the drilling function for product P2 is assigned to drill D1, the drilling function for product P1 and the drilling function for product P3 are assigned to drill D2, and no function is assigned to drill D3. The link information regarding the milling machine indicates that no function is assigned to milling machine M1, the cutting function for product P1 and the cutting function for product P2 are assigned to milling machine M2, and the cutting function for product P3 is assigned to milling machine M3. The link information regarding the robot arm indicates that no function is assigned to robot arms R1 and R3, and the assembling function for product P1, the assembling function for product P2, and the assembling function for product P3 are assigned to robot arm R2.

Since the function flow includes a set of functions for each product, the function column of the link information can be represented by which function of which function flow, instead of the function related to the manufacture of the product.

[Change of Process Management]

In the manufacturing process described above, suppose that a certain device, for example a drill, breaks down due to blade breakage. In this case, the linkage between predetermined functions stops and the realization of the function flow stops. A manufacturing system may be equipped with a large number of devices located in a large number of locations, such as in multiple factories of the same or different companies. Since conventional process management does not manage the operating status of devices that constitute the manufacturing system, it is not possible to find an alternative device that can take over the drilling function realized by the failed device. Therefore, when replacing a drill blade, the drilling function realized by such a drill also stops. Even if there were an alternative device that is not currently in use in the same factory, and the drilling function were to be taken over by the alternative device from the failed device, the realization of the drilling function may still stop if the alternative device is scheduled to be used. As the number of functions (number of processes) increases, the response to breakdowns becomes more complicated, and it may take a long time to find a best alternative.

In addition, in conventional NC machining devices, in order to install a control program for operating the machining device in the machining device, it is necessary to electrically connect a portable storage medium such as a USB memory that stores the control program to the machining device. Therefore, even if a best alternative device is found, it may take time to install the control program "to drill a hole 10 cm in depth at a point 10 cm from the right edge of the part and 10 cm from the top edge of the part" on the alternative device, and there may still be a period in which the realization of the drilling function stops.

In the process management according to the embodiment, the function flow information and link information are managed. Therefore, the operating status of multiple devices included in the system and the functions realized by the multiple devices can be recognized, and the linkage between the functions can be easily changed in the event of a device failure. In the process management according to the embodiment, the server installs the control program on the devices and uninstalls the control program from the devices via the network.

Figure 4:
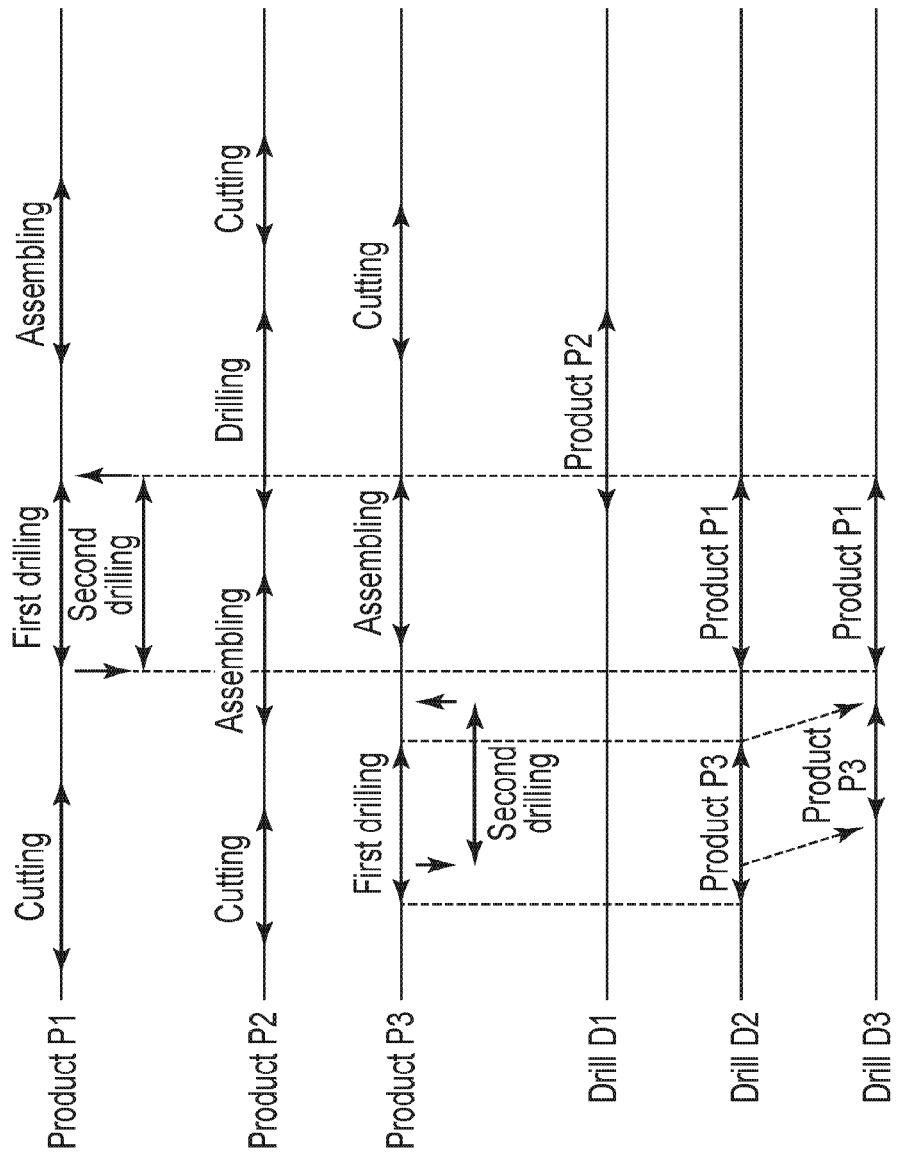
FIG. 4 shows an example of changing process management.

FIG. 4 shows an example of a change in process management in a process management system according to the embodiment. The process management is changed due to a failure of a device. Suppose that the same function flow as that shown in FIG. 1 is executed and the blade breaks while drill D2 is realizing the drilling function for product P3 (hereinafter referred to as first drilling function for product P3). In this case, since the first drilling function for product P3 is assigned to drill D2, when the failure of drill D2 is detected, the assignment of the first drilling function for product P3 to drill D2 is cancelled, and the link information is updated. At the same time, a new second drilling function for product P3 is added to the function flow, and the function flow is updated. The second drilling function for product P3 is assigned to an alternative drill other than drill D2. The second drilling function for product P3 that is assigned to the alternative drill is referred to as an alternative function or a detour function. The part of the function flow related to switching from the function that has become unfeasible to the alternative function, realization of the alternative function, and switching from the alternative function to the function immediately after the function that has become unfeasible is referred to as a detour route. A drill selected based on the attributes described below, for example, drill D3, is considered as the linked device for the second drilling function for product P3. When the link destination for the alternative function is determined, the assignment between the alternative function and the linked device is set, and the link information is updated.

In the function flow, the drilling function for product P1 (hereinafter referred to as first drilling function for product P1) is also assigned to drill D2. Therefore, when it is detected that drill D2 has failed, a new second drilling function for product P1 is added to the function flow and the function flow is updated. The second drilling function for product P1 is also assigned to a drill other than drill D2. A drill selected based on the attributes described below, for example, drill D3, is considered as the linked device for the second drilling function for product P1. When the link destination of the function is determined, the assignment of the first drilling function for product P1 to drill D2 is cancelled, the assignment of the second drilling function for product P1 to drill D3 is set, and the link information is updated.

FIG. 5 shows an example of the function flow information for product P1 updated in the process management system according to the embodiment when the failure occurs. The function flow information is updated when drill D2 fails. The function flow information for product P1 includes a cutting start date and time, cutting end date and time, first drilling start date and time, second drilling start date and time, first drilling end date and time, second drilling end date and time, assembling start date and time, and assembling end date and time. Drill D2 fails and second drilling starts. In the function flow, first drilling and second drilling coexist, but as mentioned above, the assignment of first drilling function to drill D2 is canceled when the failure of drill D2 is detected, so first drilling function is not realized after the failure of drill D2 is detected.

Since the function flow information for product P2 is not changed even when drill D2 fails, the updated function flow information for product P2 according to the embodiment shown in FIG. 6 is the same as the function flow information for product P2 shown in FIG. 2. The updated function flow information for product P2 includes the cutting start date and time, cutting end date and time, assembling start date and time, assembling end date and time, drilling start date and time, drilling end date and time, cutting start date and time, and cutting end date and time.

FIG. 7 shows an example of the function flow information for product P3 updated by the process management system according to the embodiment when the failure occurs. The function flow information for product P3 includes the first drilling start date and time, second drilling start date and time, first drilling end date and time, second drilling end date and time, assembling start date and time, assembling end date and time, cutting start date and time, and cutting end date and time. The start date and time of first drilling and the start date and time of second drilling are almost the same. The end date and time of first drilling and the end date and time of second drilling are also almost the same. In the function flow, first drilling and second drilling coexist, but as mentioned earlier, the assignment of first drilling function to drill D2 is canceled when the failure of drill D2 is detected, so first drilling function is not realized after the failure of drill D2 is detected.

FIG. 8 shows an example of the link information relating to the drill that is updated according to the embodiment in the case where the function flow information is updated. The second drilling function for product P3 and the second drilling function for product P1, which are newly added as shown in FIG. 4, are added to the link information shown in FIG. 3. The updated link information shown in FIG. 8 indicates that the assignment of the first drilling function for product P1 and the first drilling function for product P3 to drill D1 is cancelled, and the second drilling function for product P1 and the second drilling function for product P3 are assigned to drill D3.

Since the process management system leaves the unassigned first drilling function for product P1 in the updated function flow, it does not uninstall the control program in the case where the control program has already been installed in drill D2, which is scheduled to realize the first drilling function for product P1. This allows the process management system to stop drill D3 from realizing the second drilling function for product P3 in the case where the repair of the failed drill D2 is completed, and to resume realizing the first drilling function for product P3 by drill D2 that has been repaired.

Figure 9:
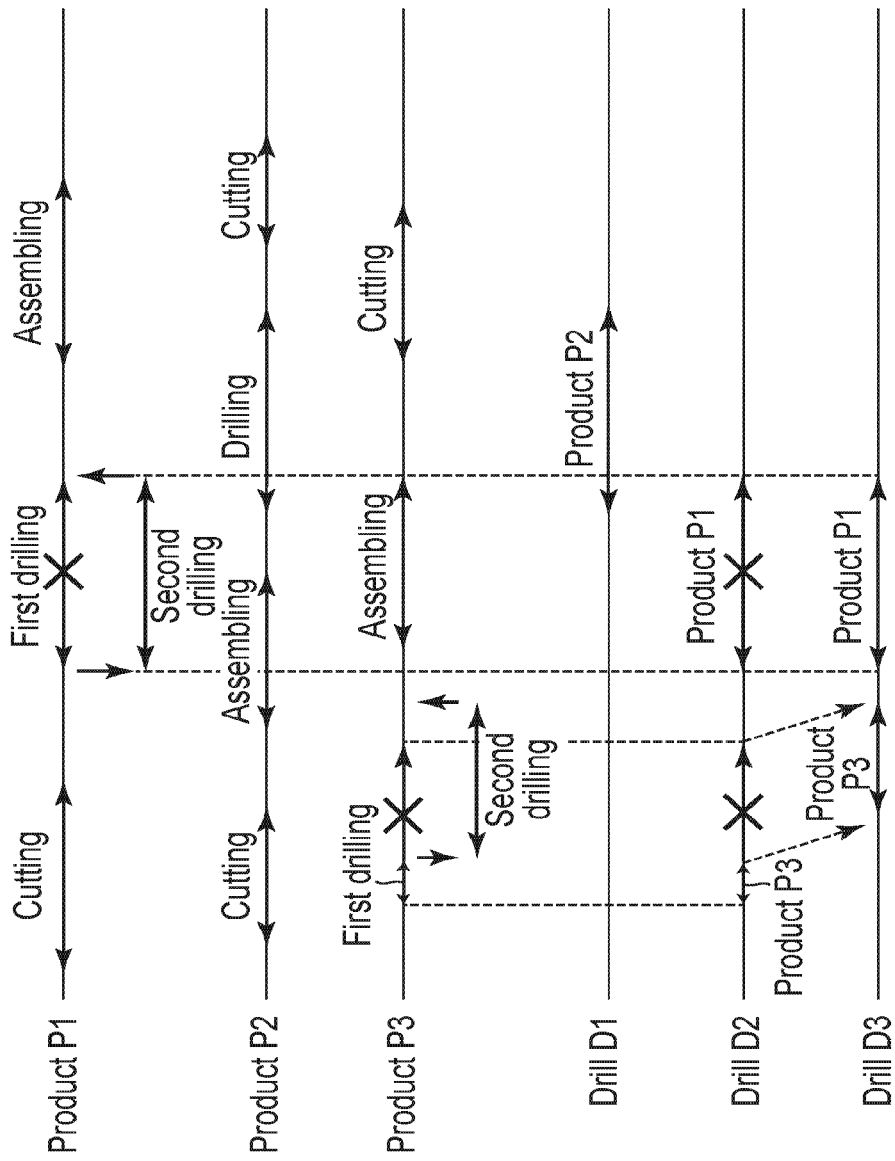
FIG. 9 shows another example of changing process management.

When the alternative function is added to the function flow, the process management system does not necessarily need to keep the original function assigned to the failed device in the function flow as shown in FIG. 4, and may delete the original function from the function flow according to the embodiment as shown in FIG. 9.

FIG. 10 shows an example of the updated function flow information for product P1 according to the embodiment. The new second drilling function for product P1 is added to the function flow, and the first drilling function for product P1 that was assigned to the failed device is deleted from the function flow. The function flow information for product P1 includes the cutting start date and time, cutting end date and time, second drilling start date and time, second drilling end date and time, assembling start date and time, and assembling end date and time.

Since the function flow information for product P2 is the same as the updated function flow shown in FIG. 6, the illustration is omitted.

FIG. 11 shows an example of the updated function flow information for product P3 according to the embodiment. The new second drilling function for product P3 is added to the function flow, and the first drilling function for product P3 assigned to the failed device is deleted from the function flow. The function flow information for product P3 includes the first drilling start date and time, first drilling end date and time, second drilling start date and time, second drilling end date and time, assembling start date and time, assembling end date and time, cutting start date and time, and cutting end date and time. The end date and time of first drilling and the start date and time of second drilling are almost the same.

Since the link information when the function flow information is updated is the same as the link information shown in FIG. 8, the illustration is omitted.

As shown in FIG. 4, in the case where the alternative function is added to the function flow, if the original function assigned to the failed device is left in the function flow, when the device assigned to the original function before the alternative function starts to operate normally, there is an advantage in that the original function is easily realized, i.e., when the detour route process is ended, the process can return to the original function flow.

Furthermore, the above examples of changes in process management include examples of changes in the function flow that leave the original function in the manner shown in FIG. 4 and examples of changes in the function flow that delete the original function in the manner shown in FIG. 9. However, since process management is controlled by the combination of function flow and link information, the process management can also be changed by changing only the link information without changing the function flow, and by changing the correspondence between the functions and devices. For example, in a case where there is a device that is not expected to operate normally, if the assignment of the relevant function to the device is canceled, and the link information is changed so that the function is assigned to another device that is expected to operate normally, the process management is changed even if the same function flow is executed.

Specific Examples of Process Management

The following describes specific examples of process management according to the embodiment.

FIG. 12 shows an example of process management according to the embodiment. The process management includes a function layer, a device layer, and an intermediate layer between the two layers. The function layer manages the function flow. The intermediate layer manages the link information and communication protocol. The device layer manages a domain map.

The function flow of FIG. 12 indicates that function F2 is realized after function F1, function F3 is realized after function F2, and function F4 is realized after function F3. The device layer includes devices D1 to D5 as means to realize each of the functions F1 to F5 that constitute the function flow. The devices may be devices that can realize multiple functions. For example, in the case of an NC-controlled device, when the control program is changed, the functions realized by the device are also changed, and the device can realize multiple functions.

If a device, for example, device D3 becomes inoperable, the function F3 corresponding to device D3 becomes infeasible. Alternatively, if device D3 is operating but there is a delay in its operation, it will take a long time for function F3 to be realized. When a process manager recognizes such a situation, he or she may look for an alternative function for function F3 (in this case, function F5) and rewrite the function flow so that function F5 is realized after function F2, and function F4 is realized after function F5.

In the case of changing the function flow as shown in FIG. 4, since the function flow includes both the original function F3 and its alternative function F5, the function flow includes a detour route from function F2 to function F5 in addition to the flow from function F2 to function F3, and a detour route from function F5 to function F4 in addition to the flow from function F3 to function F4.

In the case of changing the function flow as shown in FIG. 9, a detour route from function F2 to function F5 is included in the function flow instead of a flow from function F2 to function F3, and a detour route from function F5 to function F4 is included in the function flow instead of a flow from function F3 to function F4.

The following description is intended for the case where a new function is added while the original function is retained in the event of a device failure as shown in FIG. 4. However, the original function may be simply deleted and a new function may be added as shown in FIG. 9.

The function layer corresponds to the virtual space and the device layer corresponds to the physical space. The device layer is controlled by the function layer through the link information and communication protocol. The communication protocol does not depend on country, region, industry, etc., and is commonly used in any country, region, industry, etc.

The domain map managed by the device layer defines a display mode that indicates the operating status of each device. The device layer includes an information disclosure and sharing unit. The information disclosure and sharing unit discloses and/or shares the domain map and function flow on the network.

The function flow is displayed as a function map (a first image). The function map can be in various forms, and may, for example, include an icon indicating each function and an arrow indicating a route of linking functions. The function map may also display information on the realization of functions such as the progress of realization of each function and the congestion status of the linkage between functions. As shown in FIG. 3 and FIG. 8, etc., since the link information is managed in a tabular format, it is displayed as it is as a link table (a second image).

When a device fails, information about the details of the failure is transmitted to the server (controller) via the network. When the function layer receives information about the details of the failure from the server via the network, it may display an "x" mark on the icon of the corresponding function on the function map or on the arrow of the function.

The function layer includes a link evaluation unit. The link evaluation unit calculates an attribute value of the link between the function and each device, and displays it in a manner included in the function map. The process manager can look for alternative functions or rewrite the function flow based on the attribute value. Examples of the attribute value include an average processing time of a function, yield, etc.

Figure 13:
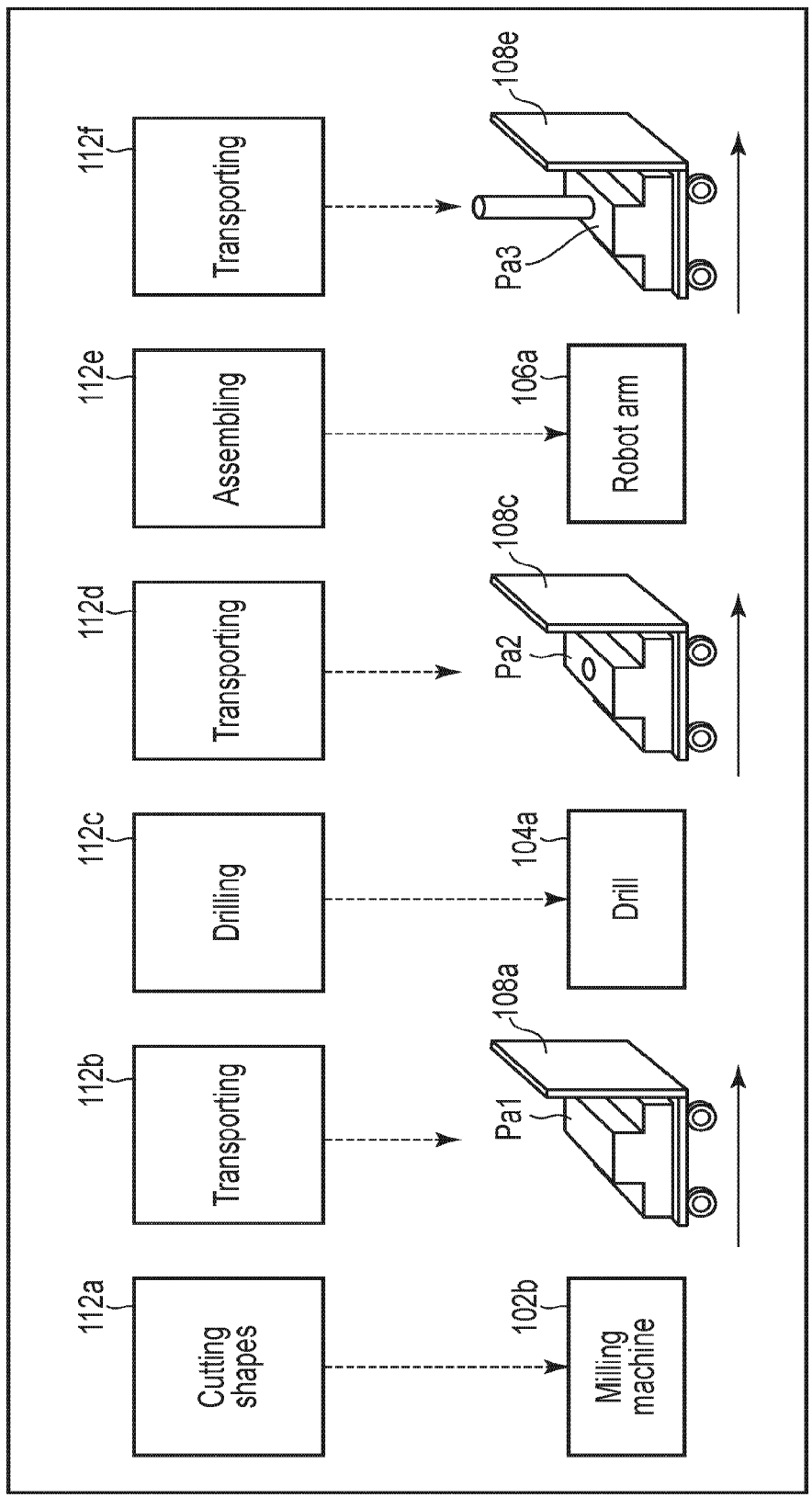
FIG. 13 shows an example of a function flow of process management of a manufacturing system.
Figure 14:
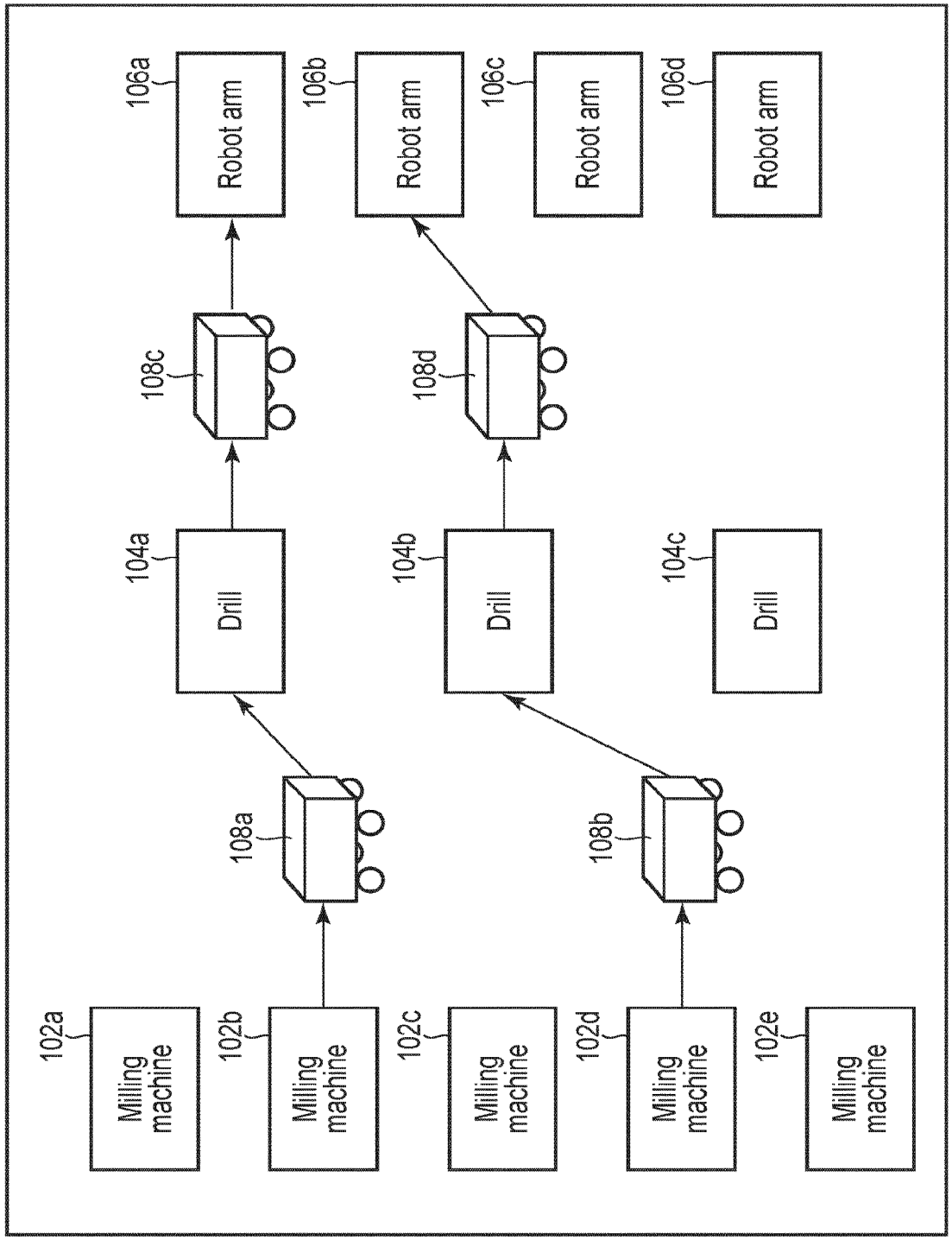
FIG. 14 shows an example of a function flow of the manufacturing system.

FIG. 13 and FIG. 14 show examples of the function flow of the manufacturing system according to the embodiment. For convenience of explanation, in the above description, a transport function of a processed product between each function is omitted from the function flow, but hereinafter, the transport function is also included in the function flow. FIG. 13 shows the concept of links between functions and devices according to the embodiment. FIG. 14 shows the concept of the device layer according to the embodiment.

The function flow includes the functions of cutting, transporting, drilling, transporting, and assembling. As shown in FIG. 13 and FIG. 14, the link information is set so that a cutting function 112a for product P1 is assigned to a milling machine 102b, a transport function 112b for part Pa1 after cutting is assigned to a cart 108a, a drilling function 112c for part Pa1 is assigned to a drill 104a, a transport function 112d for part Pa2 after drilling is assigned to a cart 108c, an assembling function 112e for part Pa2 is assigned to a robot arm 106a, and a transport function 112f for part Pa3 after assembling is assigned to a cart 108e. Similarly, the link information is set so that the cutting function for product P2 is assigned to a milling machine 102d, the transport function for a part after cutting is assigned to a cart 108b, the drilling function for the part is assigned to a drill 104b, the transport function for a part after drilling is assigned to a cart 108d, and the assembling function for the part is assigned to a robot arm 106b. In this manner, each function of the product is realized by each device, and the product is manufactured.

Figure 15:
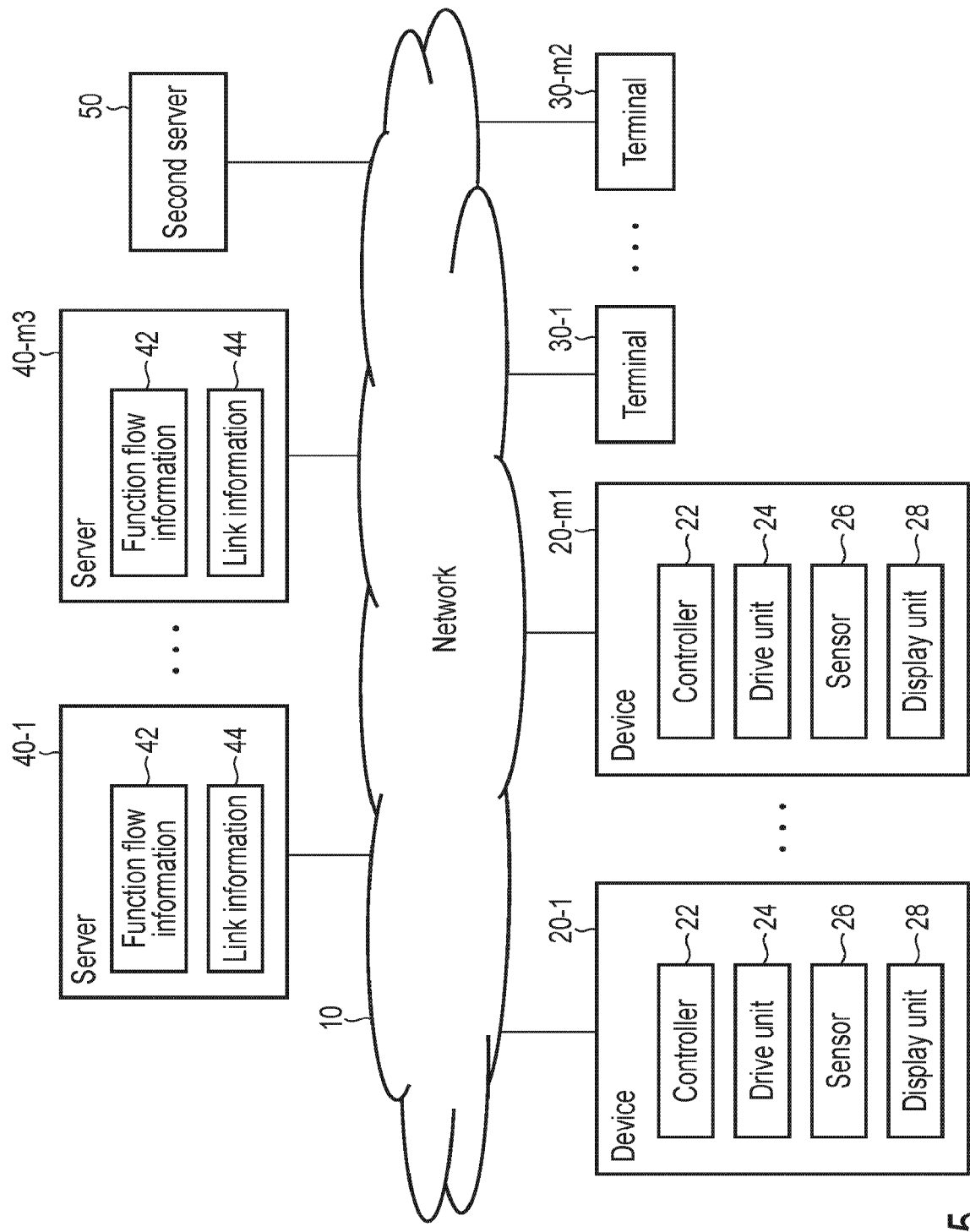
FIG. 15 is a block diagram showing an example of a process management system for managing a manufacturing process.

FIG. 15 shows a block diagram of an example of a process management system that manages the manufacturing process according to the embodiment. A plurality of devices 20-1 to 20-m1 (sometimes collectively referred to as a device 20), which are the means for realizing functions, terminals 30-1 to 30-m2 (sometimes collectively referred to as a terminal 30) used by the process manager, servers 40-1 to 40-m3 (sometimes collectively referred to as a server 40), and a second server 50 are connected to a network 10. Though not shown, the device 20, terminal 30, server 40, and second server 50 include a communication unit. The signs "m1", "m2", and "m3" are arbitrary positive integers. The network 10 includes intranet, internets, etc. The process to be managed by the process management system is assumed to be a process for each product. The manufacturing process is not limited to being carried out in the same factory, but may be carried out over multiple factories. Furthermore, the process may be implemented not only within the same company, but also across factories of multiple companies.

The device 20 include machining devices related to manufacturing, carts that transport parts from a location of a first device to a location of a second device, and the like. Each of the devices 20 includes a drive unit 24, a controller 22, a sensor 26, a display unit 28, and a communication unit. The drive unit 24 includes the milling machine, drill, and robot arm for machining and the cart for transport. The controller 22 includes a processor with a control program installed to control the drive unit 24. The sensor 26 detects the status of various parts of the device 20 and transmits the detection results to the server 40. The display unit 28 displays information transmitted from the server 40 or other devices 20. A plurality of servers 40 are provided for each product but a single server may be in charge of the process management of a plurality of products without providing a plurality of servers.

Each of the terminals 30 includes a portable electronic device, e.g., a smart phone, or a notebook or tablet personal computer. The terminal 30 may be equipped with an input device such as a mouse, keyboard, etc., and a display device, or it may be equipped with a touch panel type display and input device. The process manager can manage the manufacturing process by using the terminal 30 to create and update function flow, and to create and update links.

The server 40 is a server of a manufacturer of a product, and stores function flow information 42 and link information 44, as well as discloses function flow information and link information related to the product to devices 20 and terminals 30 of process managers related to the manufacture of the product, and shares the function flow information and link information.

The second server 50 is a server of a company other than the manufacturer of the product, e.g., a transportation company. When a plurality of devices involved in the manufacture of one product are located in remote areas, and processed parts for a certain device are transported to a remote device by a truck or the like of the transportation company, the second server 50, in addition to the server 40, is used for linkage control of functions.

Figure 16:
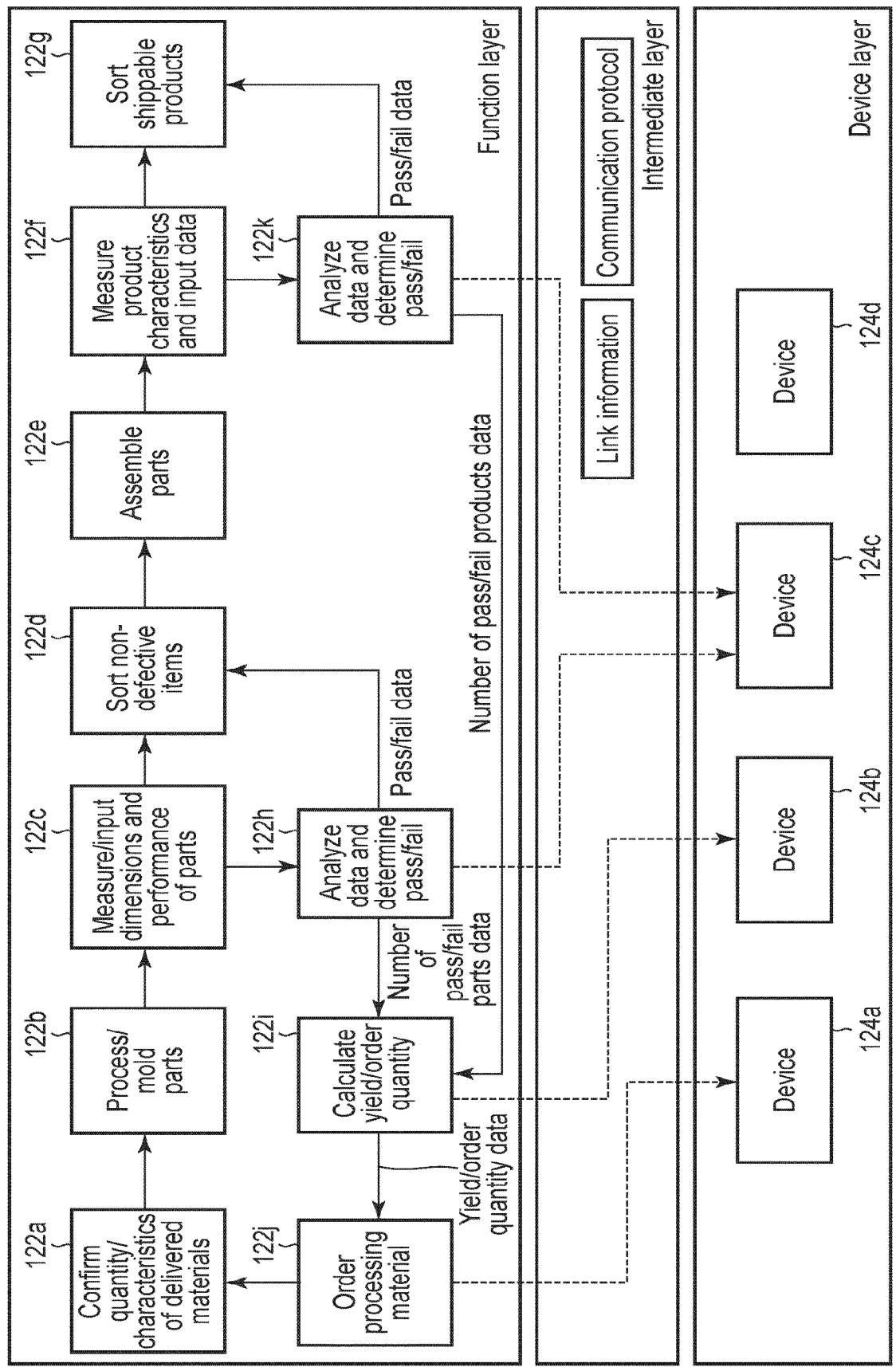
FIG. 16 shows an example of a function flow in the process management system shown in FIG. 15.

FIG. 16 shows an example of the function flow in the process management system shown in FIG. 15. The function layer manages a function flow including a function 122a of confirming quantity and characteristics of delivered materials, a function 122b of processing and molding parts, a function 122c of measuring and inputting dimensions and performance of parts, a function 122d of sorting non-defective items of processed parts, a function 122e of assembling parts, a function 122f of measuring product characteristics and inputting data, a function 122g of sorting shippable products, a function 122h of analyzing data and determining pass/fail, a function 122i of calculating yield and order quantity, a function 122j of ordering processing material, and a function 122k of analyzing data and determining pass/fail.

Examples of the function 122b of processing and molding parts include cutting and drilling. Examples of the function 122c of measuring and inputting dimensions and performance of parts include measuring the dimensions and performance of processed and molded parts, and transmitting the measurement results to the function 122h. Examples of the function 122h include determining the quality of the processed and molded parts, and transmitting the pass/fail determination result to the function 122d of sorting non-defective items. Examples of the function 122d include sorting non-defective items from among the processed and molded parts based on the pass/fail determination result.

Examples of the function 122h include transmitting data of the number of pass/fail parts to the function 122i of calculating yield and order quantity.

Examples of the function 122e of assembling parts include assembling multiple parts to complete a product. Examples of the function 122f of measuring product characteristics and inputting data include measuring the characteristics of the completed product and transmitting the measurement result to the function 122k of analyzing data and determining pass/fail. Examples of the function 122k includes determining the quality of the completed product and transmitting the pass/fail determination result to the function 122g of sorting shippable products. Examples of the function 122g include sorting a shippable product from among the completed products based on the pass/fail determination result.

Examples of the function 122k of analyzing data and determining pass/fail include transmitting data of the number of pass/fail products to the function 122i of calculating yield and order quantity. Examples of the function 122i include calculating a yield and order quantity based on data of the number of pass/fail parts and the data of the number of pass/fail products, and transmitting the calculation results to the function 122j of ordering processing material. Examples of the function 122j include determining an order quantity based on the yield and the order quantity, and transmitting the order quantity to the function 122a of confirming quantity and characteristics of delivered materials.

Each function of the function flow is linked to each device of the device layer, and the status of the link setting is managed by the link information. The device layer includes devices 124a, 124b, 124c, and 124d. The devices 124a, 124b, 124c, and 124d correspond to the device 20 shown in FIG. 15. Though not shown in FIG. 16, each of the devices 124a, 124b, 124c, and 124d includes the controller 22, drive unit 24, sensor 26, display unit 28, and communication unit. In an example of the link setting, the function 122j of ordering processing material is assigned to a device 124a, the function 122i of calculating yield and order quantity is assigned to a device 124b, and the functions 122h and 122k of analyzing data and determining pass/fail are assigned to a device 124c. Thus, in this function flow, since the functions 122h and 122k of analyzing data and determining pass/fail are assigned to the single device 124c, depending on the processing capacity of the device 124c, the functions 122h and 122k of analyzing data and determining pass/fail may be delayed in realization.

When the sensor 26 of the device 124c detects a delay in the processing of the device 124c, the detection result is transmitted to the server 40 of the manufacturer of the product. Alternatively, a worker in the vicinity of the device 124c may visually confirm a delay in processing of the device 124c and notify the server 40 of the delay using the communication unit of the device 124c.

When the server 40 is notified of the delay in processing of the device 124c, the server 40 notifies the terminal 30 of the process manager of the product of the delay in processing of the device 124c. The terminal 30 informs the process manager of the delay in the processing of functions 122h and 122k by sound, light, etc. When the process manager recognizes the delay in the realization of the functions 122h and 122k based on the device 124c, he or she can recognize the need to change the function flow.

FIG. 17 shows the concept of changing the function flow shown in FIG. 16. When the process manager recognizes the delay in the realization of functions 122h and 122k, he or she creates a second function 122h-2 of analyzing data and determining pass/fail, and changes the function flow information so that the measurement result of the function 122c of measuring and inputting dimensions and performance of parts are also transmitted to the second function 122h-2 of analyzing data and determining pass/fail in addition to the function 122h. In addition, the process manager changes the function flow information so that the number of pass/fail parts data obtained by the second function 122h-2 of analyzing data and determining pass/fail is transmitted to the function 122i of calculating yield and order quantity, and the pass/fail data obtained by the second function 122h-2 of analyzing data and determining pass/fail is transmitted to the function 122d of sorting non-defective items. The original function 122h of analyzing data and determining pass/fail may be left in the function flow information or deleted.

The process manager changes the link information to cancel assign of the function 122h of analyzing data and determining pass/fail to the device 124c and assign the second function 122h-2 of analyzing data and determining pass/fail to one of the devices, for example, the device 124d to which no function is assigned.

As a result, the device 124d realizes the second function 122h-2 of analyzing data and determining pass/fail, and the device 124c realizes the function 122k of analyzing data and determining pass/fail, so that the devices 124c and 124d can each realize the function rapidly, thereby solving the delay in realizing the function of analyzing data and determining pass/fail.

The function flow information is changed by the process manager by modifying the function map. FIG. 18 and FIG. 19 show examples of a function map. Process of changing the function flow information of a manufacturing system is described with reference to FIG. 18 and FIG. 19. When the sensor 26 detects an abnormality in the operation or stoppage of operation of the device 20 while the function flow is being executed to manufacture a product, the detection result is transmitted to the server 40. When the server 40 receives a notification of a delay or stoppage in the execution of a function, it notifies an alert to the terminal 30 of the process manager of the relevant function flow. The terminal 30 that receives the notification notifies the process manager of the need to change the function flow by sound, light, etc., and displays a menu. When the process manager recognizes the necessity of changing the function flow and selects "Change function flow" from the menu, the terminal receives the function flow information from the server 40 and displays a function map 132 as shown in FIG. 18.

The function map 132 displays the function flow information so that the user can see it as a figure, and includes an icon indicating a function 112a of cutting, an icon indicating a function 112c of drilling, an icon indicating a function 112e of assembling, and arrows 114a and 114b indicating the linkage of the functions. Here, for convenience of explanation, the function of transporting parts between functions is omitted. In the link information, not shown, the function 112a of cutting is assigned to the milling machine 102b, the function 112c of drilling is assigned to the drill 104a, and the function 112e of assembling is assigned to the robot arm 106a. In addition, the function map 132 also displays an "x" mark superposed on the icon indicating the function 112c of drilling to indicate that the drilling function with the drill 104a has not been realized or there is a delay in its realization.

In the example of FIG. 18, for example, a blade of the drill 104a breaks, and a worker in the vicinity of the drill 104a realizes that the blade of the drill 104a is broken and stops the operation of the drill 104a. Alternatively, in the example of FIG. 18, a sensor on the drill 104a detects the blade breakage, and the operation of the drill 104a is automatically stopped. The stoppage of the operation of the drill 104a is notified to the server 40, and the server 40 transmits data to the terminal 30 to display the function map 132 as shown in FIG. 18.

When the process manager drags and drops the icon of the function 112c of drilling that is not properly realized on the function map of FIG. 18 and changes the display position of the icon of the function 112c, an icon of a second function 112c-2 of drilling, which is a copy of the icon of the function 112c of drilling, is created on the function map as shown in FIG. 19. In addition, the arrow that indicates the flow from the icon of the function 112a of cutting to the icon of the function (first function) 112c of drilling is deleted, and instead an arrow 114a-2 that indicates the flow from the icon of the function 112a of cutting to the icon of the function (second function) 112c-2 of drilling is displayed. Similarly, the arrow indicating the flow from the icon of the first function 112c of drilling to the icon of the function 112e of assembling is deleted, and instead an arrow 114b-2 indicating the flow from the icon of the second function 112c-2 of drilling to the icon of the function 112e of assembling is displayed. The function flow information is also changed accordingly.

When the change of the function flow is completed, the server 40 stops displaying the function map 132 on the terminal 30 and instead displays the link information as shown in FIG. 3 and FIG. 8 as a link table on the terminal 30. Alternatively, the server 40 may display the function map 132 and the link table on two screens of the terminal 30. When the process manager executes an operation to cancel the link from the first function 112c of drilling to the drill 104a (changing the "O" mark to an "X" mark), and executes an operation to set a link from the second function 112c-2 of drilling to another drill, for example, drill 104c (changing the "X" mark to a "O" mark) on the link table, the link information is updated.

As a result, after the function of cutting is realized, the second function of drilling is properly realized instead of the first function of drilling that is not properly realized, and after the function of drilling is realized, the function of assembling is realized, thereby preventing a delay in the manufacturing process.

The original first function of drilling may be left in the function flow or deleted.

When assigning the newly added second function of drilling to other drills, the process manager can select an appropriate drill if the operating status of each drill is known. As an example of the operating status, the server 40 manages an operation rate management information of the device as shown in FIG. 20. The operation rate management information indicates the operation rate of all the devices 20 managed by the process management system. When the process manager assigns a new function to a device, the terminal 30 displays a domain map as shown in FIG. 21 based on the operation rate management information. The domain map displays the operation rate of the device for each company and factory in the form of a bar graph. The domain map and the function map may be displayed on the screen at the same time as, or may be selectively displayed by switching screens.

The domain map shows, for example, that drill D2 in company CA's factory FA1 and drill D2 in company CB's factory FB1 have high operation rates, while drill D1 in company CA's factory FA1, drill D1 and drill D2 in company CA's factory FA2, and drill D1 in company CB's factory FB1 are not operating. By looking at the domain map, the process manager can assign the newly added functions to devices with low operation rates, and use each device efficiently to manufacture products more efficiently.

Other examples of the operating status include CPU utilization of the device's controller, average processing time to achieve a function, and yield.

Figure 22:
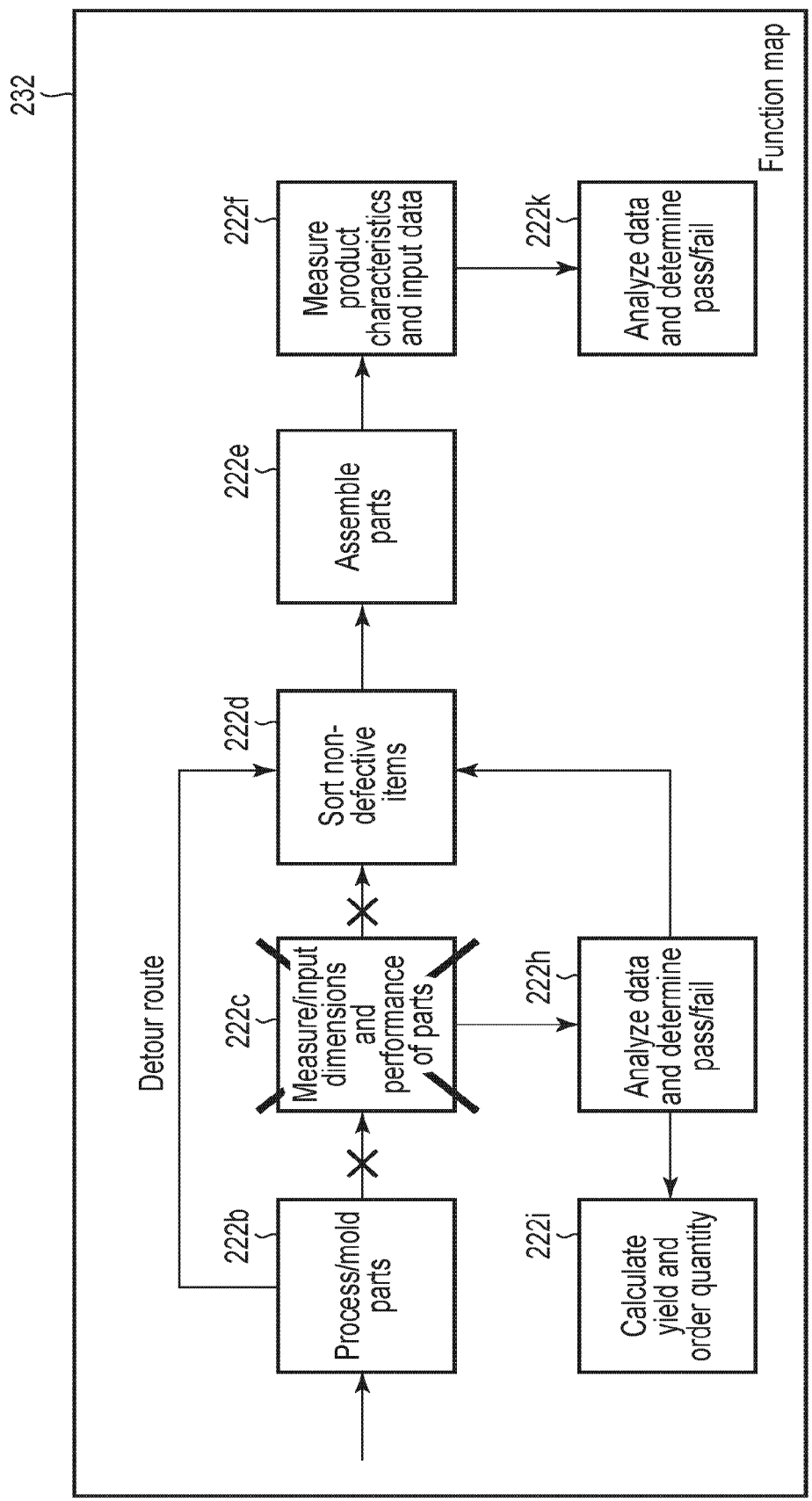
FIG. 22 shows another example of process management including detour route creation.

Another example of changing the function flow is described with reference to FIG. 22. FIG. 22 shows an example of a function map 232 displayed on the terminal 30. The function map 232 includes an icon 222b of the function of processing and molding parts, an icon 222c of the function of measuring and inputting dimensions and performance of parts, an icon 222d of the function of sorting non-defective items, an icon 222e of the function of assembling parts, an icon 222f of the function of measuring product characteristics and inputting data, an icon 222h of the function of analyzing data and determining pass/fail, an icon 222i of the function of calculating yield and order quantity, and an icon 222k of the function of analyzing data and determining pass/fail. Among these icons, an X mark is superposed on the icon 222c of the function of measuring and inputting dimensions and performance of parts, which is detected not to be properly realized. In the example of changing the function flow shown in FIG. 18 and FIG. 19, an alternative function is set for the function that cannot be properly realized, on which an X mark is superposed. However, in the example of changing the function flow shown in FIG. 22, a function that cannot be properly realized is simply deleted.

When the process manager executes the operation of the icon 222c on the function map 232, an arrow showing the flow from the icon 222b of the function of processing and molding parts to the icon 222c of the function of measuring and inputting dimensions and performance of parts and an arrow showing the flow from the icon 222c of the function of measuring and inputting dimensions and performance of parts to the icon 222d of the function of sorting non-defective items are deleted, and instead an arrow indicating the flow (detour route) from the icon 222b of the function of processing and molding parts to the icon 222d of the function of sorting non-defective items is displayed. The function flow information is also changed accordingly.

When the process manager executes the operation of cancelling the link to the device of the icon 222c of the function of measuring and inputting dimensions and performance of parts on the link table, the link information is updated.

Figure 23:
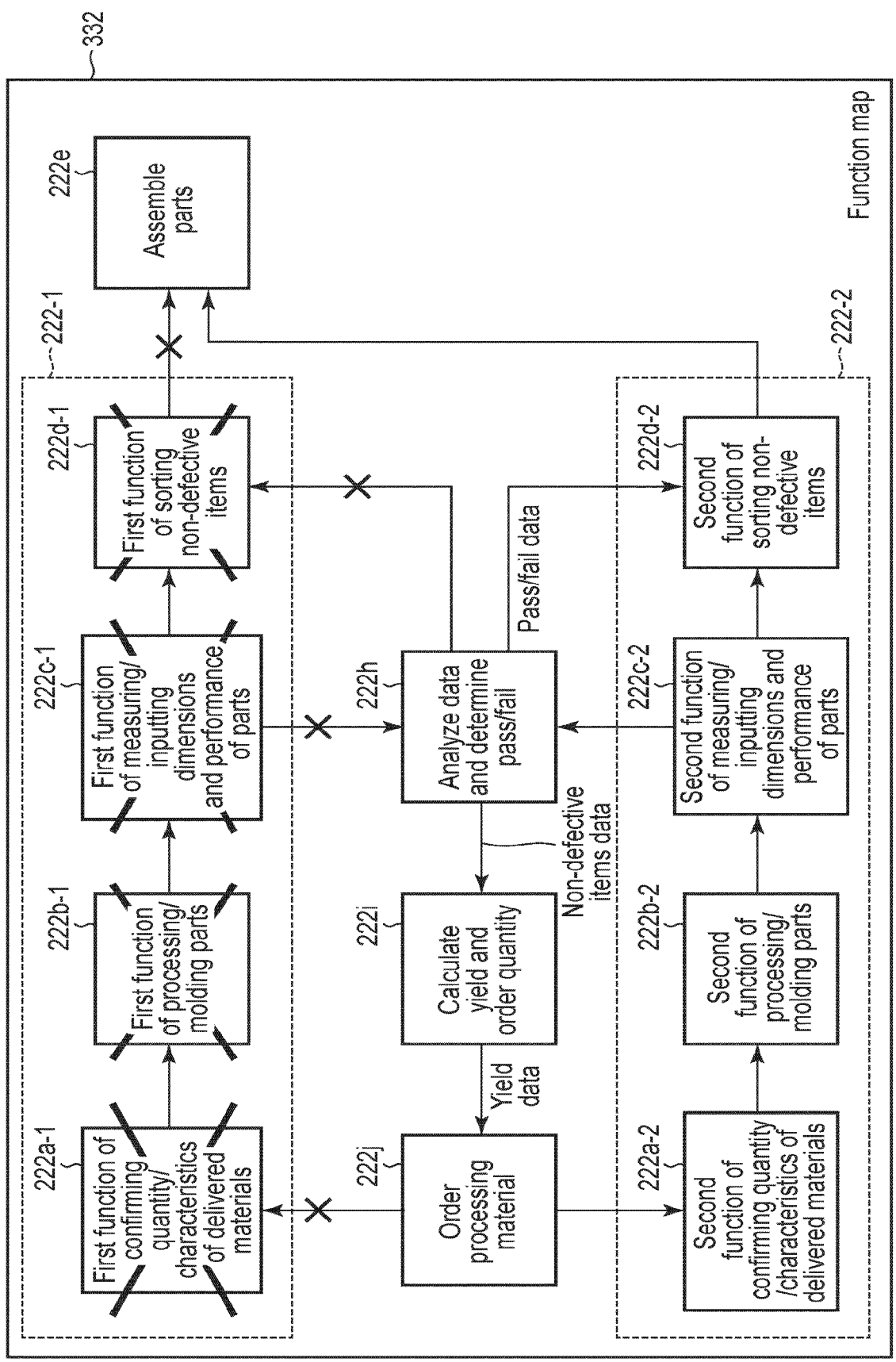
FIG. 23 shows yet another example of process management including detour creation.

Yet another example of changing the function flow is described with reference to FIG. 23. FIG. 23 shows an example of a function map 332 displayed on the terminal 30. The function map 332 includes an icon 222a-1 of the first function of confirming quantity and characteristics of delivered materials, an icon 222b-1 of the first function of processing and forming parts, an icon 222c-1 of the first function of measuring and inputting dimensions and performance of parts, an icon 222d-1 of the first function of sorting non-defective items, an icon 222e of the function of assembling parts, an icon 222h of the function of analyzing data and determining pass/fail, an icon 222i of the function of calculating yield and order quantity, and an icon 222j of the function of ordering processed materials. Among these icons, an X mark is superposed on a plurality of icons that are detected as not being properly realized (icon 222a-1 of the first function of confirming quantity and characteristics of delivered materials, icon 222b-1 of the first function of processing and forming parts, icon 222c-1 of the first function of measuring and inputting dimensions and performance of parts, and icon 222d-1 of the first function of sorting non-defective items). In such a manner, in the case where a partial flow 222-1 including a plurality of functions in the function flow cannot be properly realized, alternative functions can be set collectively. When the process manager selects the icons 222a-1, 222b-1, 222c-1, and 222d-1 on which X marks are superposed and drags and drops the icon group 222-1 on the function map, an icon group 222-2, which is a copy of the icon group 222-1, is created on the function map. The icon group 222-2 includes an icon 222a-2 of a second function of confirming quantity and characteristics of delivered materials, an icon 222b-2 of a second function of processing and molding parts, an icon 222c-2 of a second function of measuring and inputting dimensions and performance of parts, and an icon 222*d*-2 of a second function of sorting non-defective items.

In addition, an arrow indicating the flow from the icon 222*j* of the function of ordering processing materials to the icon 222*a*-1 of the first function of confirming quantity and characteristics of delivered materials is deleted, and an arrow indicating the flow from the icon 222*j* to the icon 222*a*-2 of the second function of confirming quantity and characteristics of delivered materials is displayed instead. Similarly, an arrow indicating the flow from the icon 222*c*-1 of the first function of measuring and inputting dimensions and performance of parts to the icon 222*h* of the function of analyzing data and determining pass/fail is deleted, and an arrow indicating the flow from the icon 222*c*-2 of the second function of measuring and inputting the dimensions and performance of parts to the icon 222*h* of the function of analyzing data and determining pass/fail is displayed instead. An arrow indicating the flow from the icon 222*h* of the function of analyzing data and determining pass/fail to the icon 222*d*-1 of the first function of the sorting non-defective items is deleted, and an arrow that indicates the flow from the icon 222*h* of the function of analyzing data and determining pass/fail to the icon 222*d*-2 of the second function of sorting non-defective items is displayed instead. An arrow indicating the flow from the icon 222*d*-1 of the first function of sorting non-defective items to the icon 222*e* of the function of assembling parts is deleted, and an arrow indicating the flow from the icon 222*d*-2 of the second function of sorting non-defective items to the icon 222*e* of the function of assembling parts is displayed instead. The function flow information is also changed accordingly.

Figure 24:
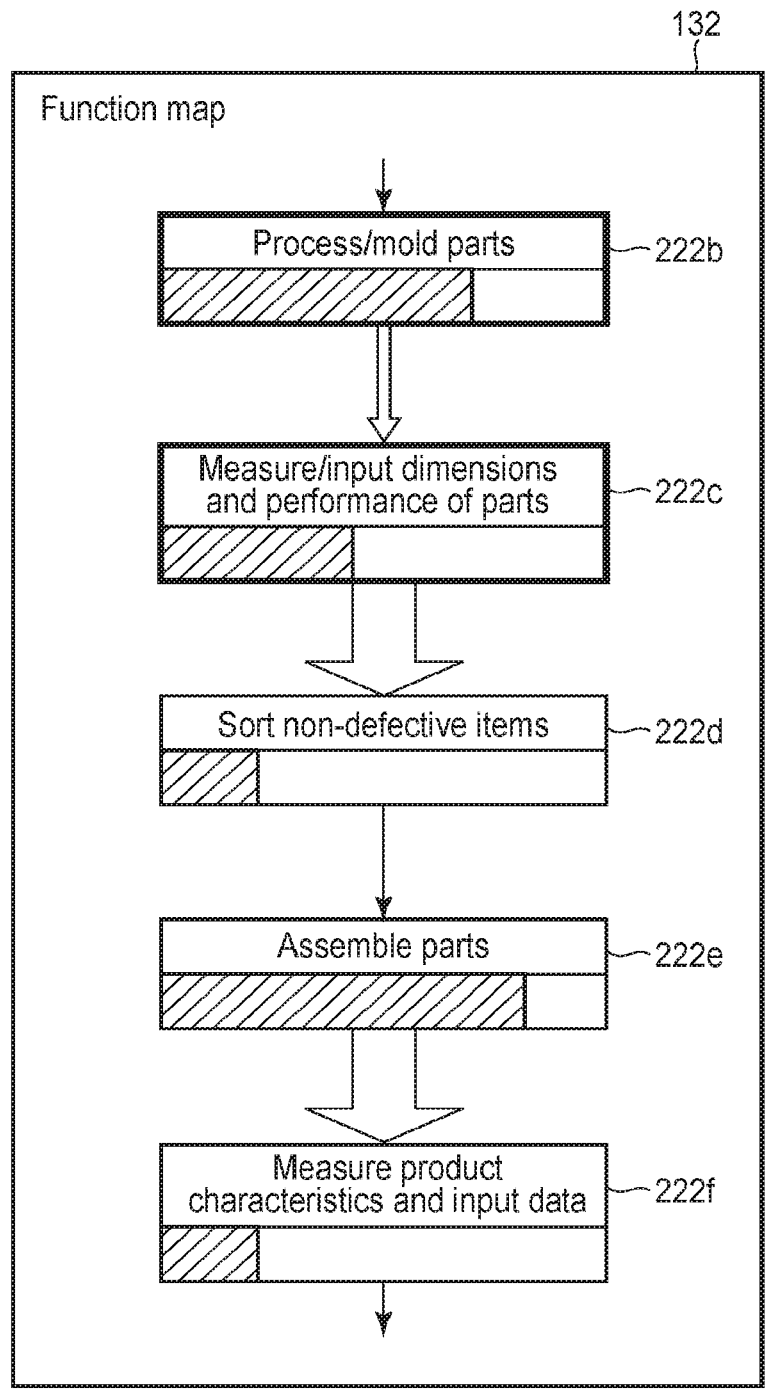
FIG. 24 shows another example of a function map used to create a detour route.

FIG. 24 shows a modified example of the display mode of the function map 132. In the previous function map, the arrows indicating the flow of functions only show the context of the order in which the functions are realized. In the function map of FIG. 24, the arrows indicate the delay and congestion of processing between functions by the thickness of the arrows. A flow with thin arrows indicates congested processing between the functions before and after the flow. By looking at this function map, the process manager can consider setting up alternative functions for the functions connected by the thin arrows.

In addition, the icon indicating the function may not only show the label of the function, but also the operating status of the device that realizes the function in the form of a bar graph. The operating status of the device can be CPU utilization, device operation rate, average processing time, yield rate, etc. In addition, the icons of functions that have been realized may be displayed as bold frame icons, for example, to differentiate them from the icons of functions that have not been realized.

This allows the process manager to change the function flow before the function cannot be realized so that the manufacturing is not hindered.

An example of the link information is shown with reference to FIG. 25. The link information indicates which functions are linked to each device and which functions are unlinked. When a function flow is created and function Fi is assigned to device Dj, data indicating the creation date and time is input in a column of a function flow creation date and time for function Fi of device Dj. The signs "i" and "j" are positive integers. If the function flow creation date and time for function Fi of device Dj is blank, it indicates that function Fi has not been assigned to device Dj. When the function flow is changed and the link of function Fi to device Dj is cancelled, data indicating the cancel date and time is input in a column of a link cancel date and time for function Fi of device Dj. If the link cancel date and time for function Fi of device Dj is blank, it indicates that function Fi is assigned to device Dj. In other words, data is input in either the function flow creation date and time or the link cancel date and time for function Fi of device Dj, and the other is blank.

Each time a function is added to the function flow, a function column is added to the link information.

The link information also manages device identification information, domain identification information, performance, additional performance, and attributes for each device. The device identification information to be focused on can be an IP address. Here, the domain identification information represents the name of the organization to which the device belongs. The performance to be focused on may be the capacity of a built-in memory, etc., for CPU power. The additional performance to be focused on may be a free space of additional memory.

FIG. 26 shows an example of changing the function flow in a manufacturing system that includes manufacturers from different companies. Assume that a certain function (e.g., drilling function) becomes unfeasible due to the failure of a certain device, and the process manager tries to change the function flow, but there is no device in the company that can realize the unfeasible function, and the process manager outsources the function to another company. A first factory 142 in FIG. 26 is the factory that contains the failed device linked to the function that has become unfeasible. The process manager requests a second server 114 to outsource the drilling function and also requests the server 40 (FIG. 15) to transmit the function flow information and link information to the second server 114. The second server 114 is a server of a goods processing and manufacturing contract agent company including logistics.

An administrator of the second server 114 searches for a subcontractor that can realize the drilling function, cancels the link of the unfeasible function to the failed device in the first factory 142, sets a link of the unfeasible function to a subcontractor's device 150, and updates the link information. The administrator of the second server 114 requests a subcontractor's server 146 to outsource the drilling function and transmits the updated function flow information to the server 146. In addition, the second server 144 requests a delivery company 154 to transport the parts in the first factory 142 to the subcontractor and to transport the processed parts from the subcontractor to a second factory 158. The second factory 158 is a factory that realizes the next function after the function (drilling function) realized by the first factory 142. The second factory 158 may also be the first factory 142.

The subcontractor's server 146 transmits the function flow information to a parser 148. The parser 148 is a parser for specifications and drawings and determines whether the subcontractor's device 150 can execute the function flow based on the function flow information. In a case where it is determined that it cannot be executed, the parser 148 transmits an error to the second server 144 via the server 146. In a case where it is determined that it can be executed, the parser 148 transmits the function flow information to the subcontractor's device 150.

As a result, the parts in the first factory 142 are transported to the device 150 of another company, and the device 150 realizes the drilling function instead of the device in the first factory 142. The parts after realizing the drilling function are transported to the second factory 158, where the next function after the drilling function is realized.

Handover data for linking functions is transmitted between the devices 20 or between the server 40 and the devices 20 (FIG. 15). An example of the handover data is described with reference to FIGS. 27A and 27B and FIGS. 28A, 28B, and 28C. When a function is realized by the first device, the processed parts that are the result of realizing the function are transported to the second device. Along with the transportation of the parts, the handover data indicating the process of realizing the functional flow is transmitted from the first device to the second device and also to the server 40 via the network 10. The second device starts to realize the function based on this handover data.

Figure 27A:
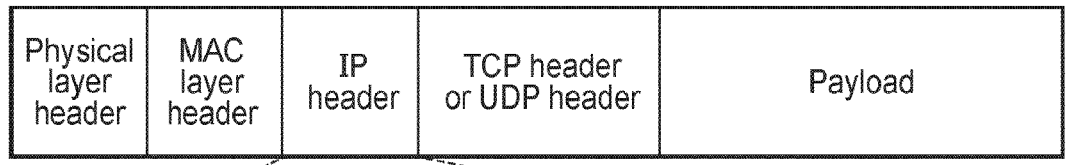
FIGS. 27A and 27B show an example of an IP header of a first example of handover data transmitted between devices.
Figure 27B:
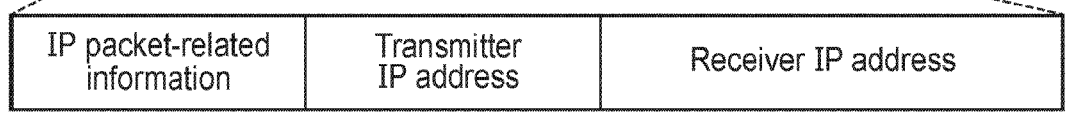
Figure 28A:
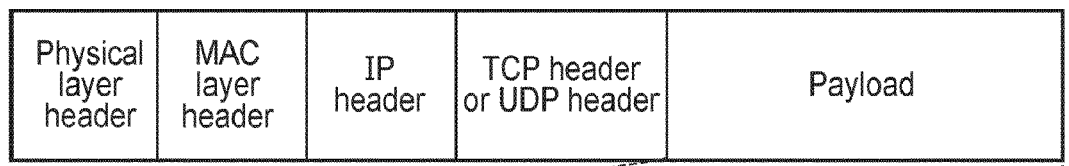
FIGS. 28A, 28B, and 28C show an example of a function flow header in a payload of a first example of handover data.
Figure 28B:
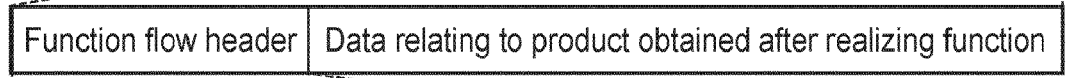

As shown in FIG. 27A (or FIG. 28A or FIG. 29A), the handover data is transmitted as a packet including a physical layer header, a MAC layer header, an IP header, a TCP header (or a UDP header), and a payload. As shown in FIG. 27B, the IP header includes IP packet-related information, a transmitter IP address, and a receiver IP address. As shown in FIG. 28B (or FIG. 29B), the payload includes a function flow header and data relating to a product obtained after a function is realized.

Figure 28C:
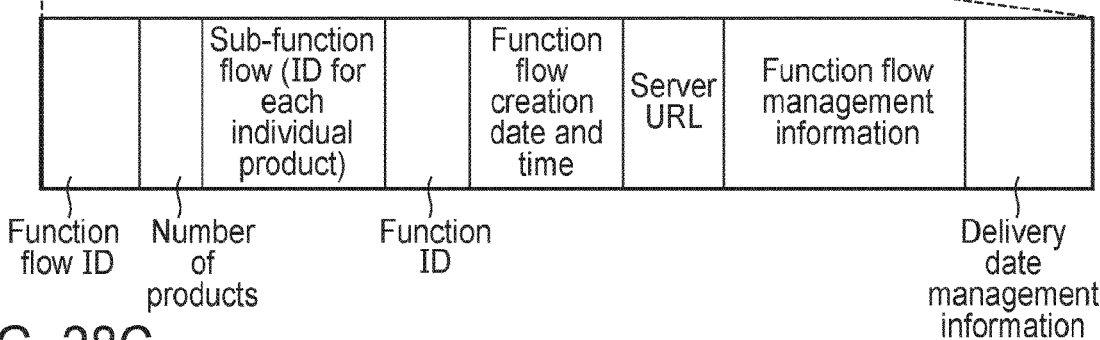

As shown in FIG. 28C, the function flow header includes a function flow ID, the number of products, a sub-function flow ID, a function ID, date and time of creating function flow, a server URL, function flow management information, and delivery date management information. An example of a function flow is: "By month/date/time, cut materials to make part Pa1; by month/date/time, drill holes in part Pa1 to make part Pa2; and by month/date/time, assemble part Pa2 and part Pa3 to make 1000 units of a product". The sub-function flow is a function flow for each individual product.

The above function flow includes 1000 sub-function flows. The function ID indicates the function of cutting, drilling, assembling, etc. The server URL is a URL of the server related to the product and indicates where to report or inquire about the progress of the product. The function flow management information is management information that indicates the flow of the function flow, and in this example includes the progress (processed flag, etc.) of the relevant function, delivery date information, etc. The delivery date management information indicates the actual delivery date. The information is written in Linux (registered trademark) or Jave Script (registered trademark).

The data relating to the product obtained after realizing the function includes data of dimensions and performance of parts, characteristics of the product, pass/fail determination, the number of pass/fail parts data, the number of pass/fail product data, yield data, etc., as shown in FIG. 16.

Figure 29A:
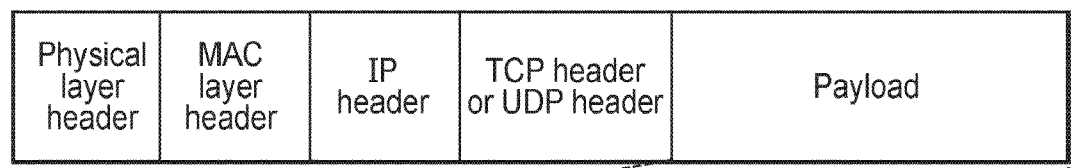
FIGS. 29A, 29B, and 29C show another example of the function flow header in the payload of the first example of handover data.
Figure 29B:
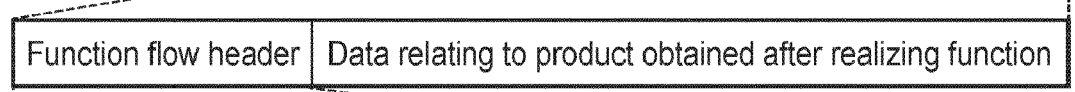
Figure 29C:
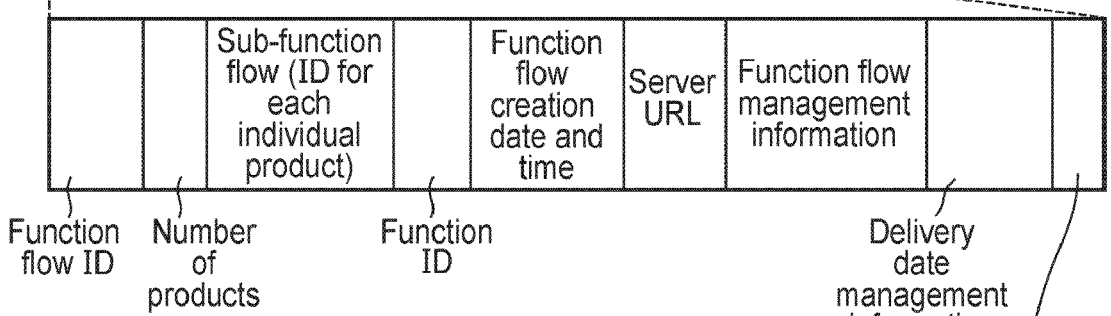

FIGS. 29A, 29B, and 29C show another example of a function flow header. As shown in FIG. 29C, in addition to the information shown in FIG. 28C, the function flow header may include the operating status, e.g., CPU utilization, of a corresponding device to which the data is transmitted. The operating status is not limited to CPU utilization, and may also include average processing time, yield, etc.

Another example of the data structure of the handover data is described with reference to FIGS. 30A and 30B and FIGS. 31A, 31B, and 31C. FIG. 30A and FIG. 31A are the same as FIG. 27A, FIG. 28A, or FIG. 29A. The examples in FIGS. 30A and 30B and FIGS. 31A, 31B, and 31C show handover data applying the concept of administration shell as defined in Industry 4.0 for digitization of manufacturing. Industry 4.0 is intended to network the business processes beyond the walls of the enterprise. All "things" that need to be connected to the world of Industry 4.0 are referred to as assets. All hierarchical levels of the production system will be networked, and communication will take place between "things" at all levels. The interface that connects the assets to the network is called the administration shell. In the administration shell, all the important information and data related to the asset is collected and stored. The administration shell can be called by its address on the Internet, and the asset is uniquely identified. The administration shell provides controllable access to all information related to the asset.

A schematic structure of this administration shell is shown in FIG. 32. The structure of an administration shell 401 is configured by a function flow header 402 and a function flow body 404. In the function flow header 402, an administration shell identifier (ID) 406 and an asset identifier (ID) 408 are assigned as information that can identify the administration shell 401 and an asset 412. URLs corresponding to each of the administration shell ID 406 and the asset ID 408 can be used. The function flow body 404 that configures the administration shell is configured by multiple sub-models 410A, 410B, . . . . The asset 412 to which the administration shell 401 is added and which is connected to the world of Industry 4.0 is referred to as an Industry 4.0 component 444.

Through these sub-models 410A, 410B, . . . , it is possible to describe (obtain information about) various aspects of the asset 412, such as security, safety, energy, and manufacturing capabilities. The sub-models 410A, 410B, . . . are configured by a set of attributes classified into a hierarchy, and all of the data related to the asset 412, such as data (specifications, performance) and functions of the asset 412, may be attributes.

These attributes are distinguished as "basic attributes", "mandatory attributes", "optional attributes", and "free attributes". "Basic attributes" are standardized mandatory attributes that apply to all administration shells. "Mandatory attributes" are standardized mandatory attributes that apply to sub-models. "Optional attributes" are standardized attributes, however, are optionally applied to sub-models. "Free attributes" are attributes of limited use that can be set independently by a manufacturer.

Figure 33:
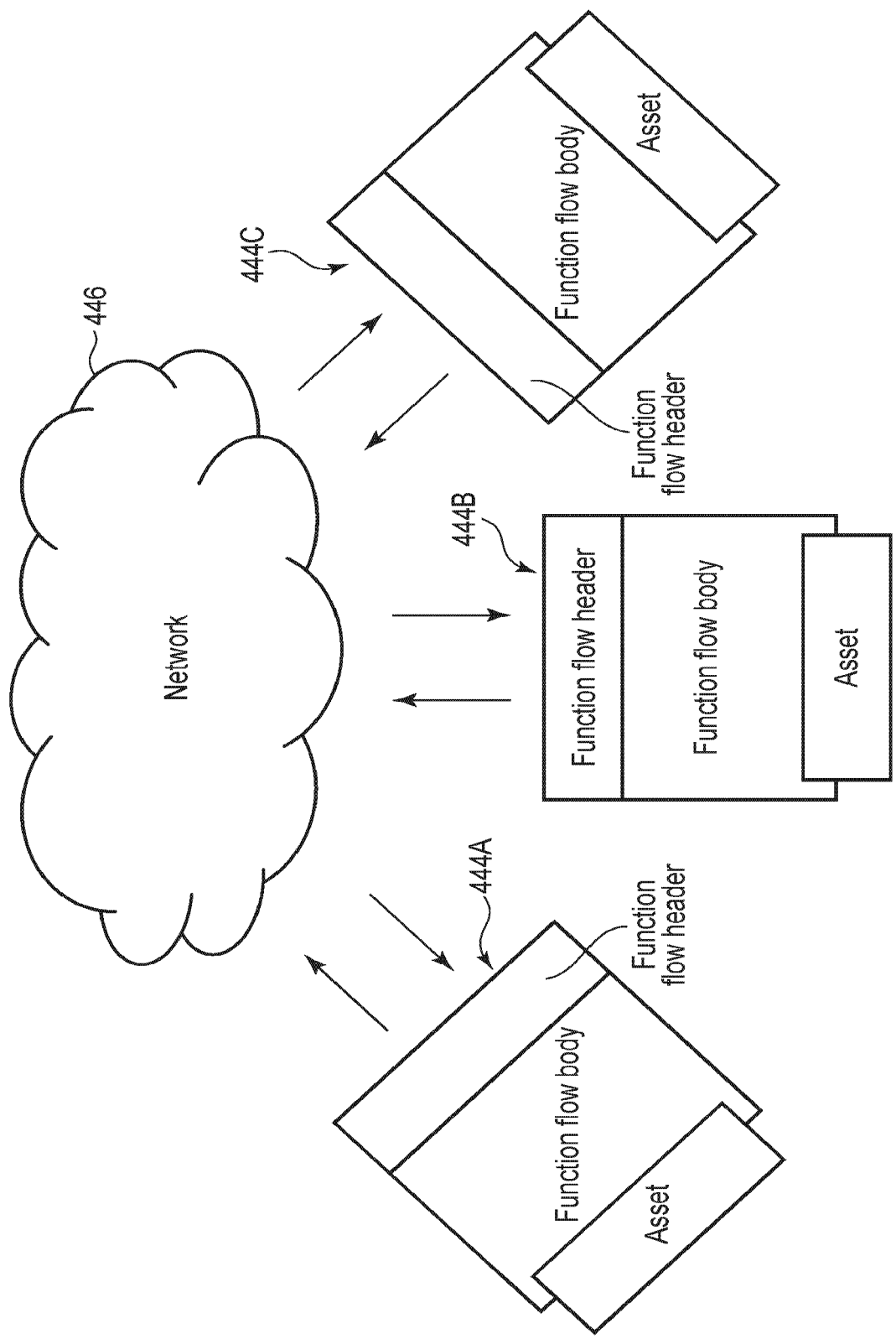
FIG. 33 shows an example of how the administration shells are linked to each other through a network.

A typical example of an asset is a machine, but as mentioned above, any "thing" at all levels can be an asset, including not only physical "things" such as entire factories, work stations, and parts inside machines, but also immaterial "things" such as documents (production plans, purchase orders, etc.). The administration shell can allow all assets to communicate with each other through a standardized communication interface. For example, as shown in FIG. 33, the administration shells contained in multiple components 444A, 444B, 444C, . . . can cooperate by exchanging information with each other over a network 446 via Web API or service API. The network 446 side has a structure that is open to the information stored by the administration shells, and the administration shells have a structure that is closed to their own information. Since they can cooperate via the Web API and service API, information can be distributed over the network 446 via the administration shells as a service.

FIGS. 30A and 30B and FIGS. 31A, 31B, and 31C schematically show the communication interface of the administration shell with these features. As shown in FIG. 30B, the payload in FIG. 30A includes a function flow header and a function flow body. The function flow header and function flow body configure the administration shell of Industry 4.0. As shown in FIG. 30C, the function flow header includes an asset ID and an administration shell ID. The asset ID describes the function flow ID. These IDs can be associated with URLs and used in the manner described above.

As shown in FIG. 31C, the function flow body includes field attributes, functional attributes, and communication protocol information and transmission data by field/theme. The function flow body is configured by a number of sub-models. Through these sub-models, it is possible to describe various aspects of the asset. Information related to an aspect is summarized in a single sub-model. There is one sub-model for a certain aspect. This allows, for example, to find a drill with appropriate performance and features in an Industry 4.0 network via the sub-model "drill".

Each sub-model deals with one well-defined field (theme). Each sub-model is configured by a number of attributes classified into a hierarchy. As for the content of these attributes, any information related to the asset, such as data (device configuration, specifications, performance, etc.) and functions of the asset, can be an attribute.

The information of the asset can be provided through the attributes. Examples of attributes include product characteristics, process characteristics, links to external data sources or files (references), links to other administration shells or other sub-models or attributes (references), descriptions of the capabilities, performance, and invocation, and sets of attributes of the asset. Attributes are described in the XML language. These include the relationships between electrical systems, piping, layout, etc., obtained from drawings, CAD, photographs, etc. At the time of operation and maintenance, for example, status data, operation data, maintenance history, etc., can be mentioned as this attribute. The data of these assets can be distributed on the network for utilization.

In other words, there is one sub-model for each aspect that is desired to be acquired (or controlled). With these sub-models, for example, it will be possible to acquire or control only the drill information of a specific machine tool.

A sub-model deals with one field or theme that is clearly defined. A plurality of such sub-models are included in the administration shell. In addition, there are common sub-models that are mostly applied to assets in Industry 4.0, and these are considered "basic sub-models". On the other hand, sub-models that are newly created for specific applications among trading companies in the value chain are positioned as "free sub-models". These sub-models are created according to every aspect of the asset, but since it is not practical to develop all of them in its own company, the administration shell reflects specifications established by various international standards and consortia that mostly already exist.

Figure 34:
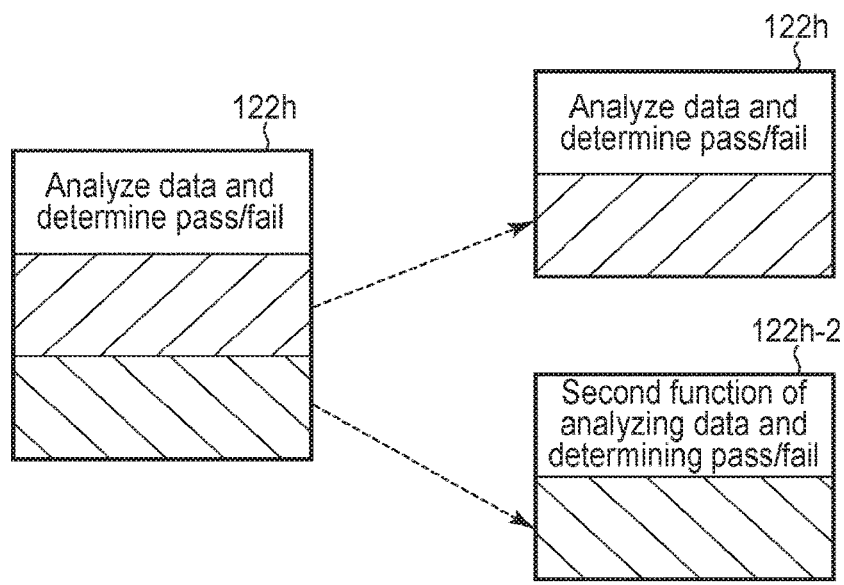
FIG. 34 shows a concept of dividing handover data.

Here, if a device malfunctions during the implementation of a function by a certain device and a detour route is created for the corresponding function, as shown in FIG. 34, handover data transmitted from the device corresponding to one function is also divided. For example, if the function 122$h$ of analyzing data and determining pass/fail becomes unfeasible and the second function 122$h$-2 of analyzing data and determining pass/fail is set as an alternative function, the handover data transmitted from the device corresponding to the function 122$h$ of analyzing data and determining pass/fail will be divided into handover data transmitted from the device corresponding to the function 122$h$ of analyzing data and determining pass/fail before the malfunction and handover data transmitted from another device corresponding to the second function 122$h$-2 of analyzing data and determining pass/fail.

Figure 35:
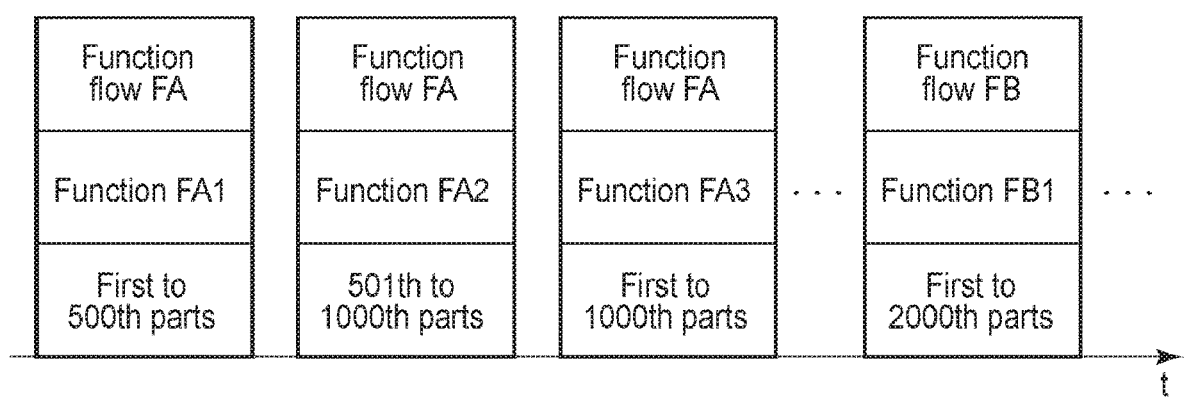
FIG. 35 shows an example of division transmission of handover data.

FIG. 35 shows an example of transmission of the handover data between devices. Although data may be transmitted every time the processing of one part/product is completed, in the embodiment, the function flow is set so that data transmissions transmitted between devices are grouped into packets and transmitted intermittently. For example, when the cutting of the first to 500th parts A for product P1 (function F1) is completed, handover data for the first to 500th parts is transmitted. Similarly, when the cutting of the 501st to 1000th parts for product P1 (function F2) is completed, handover data for the 501st to 1000th parts is transmitted.

Since the function flow is set so that the handover data is transmitted intermittently in this manner, the function flow can be changed (e.g., by creating a detour route) while the handover data is not being transmitted, which will allow to respond to malfunctions.

Figure 36:
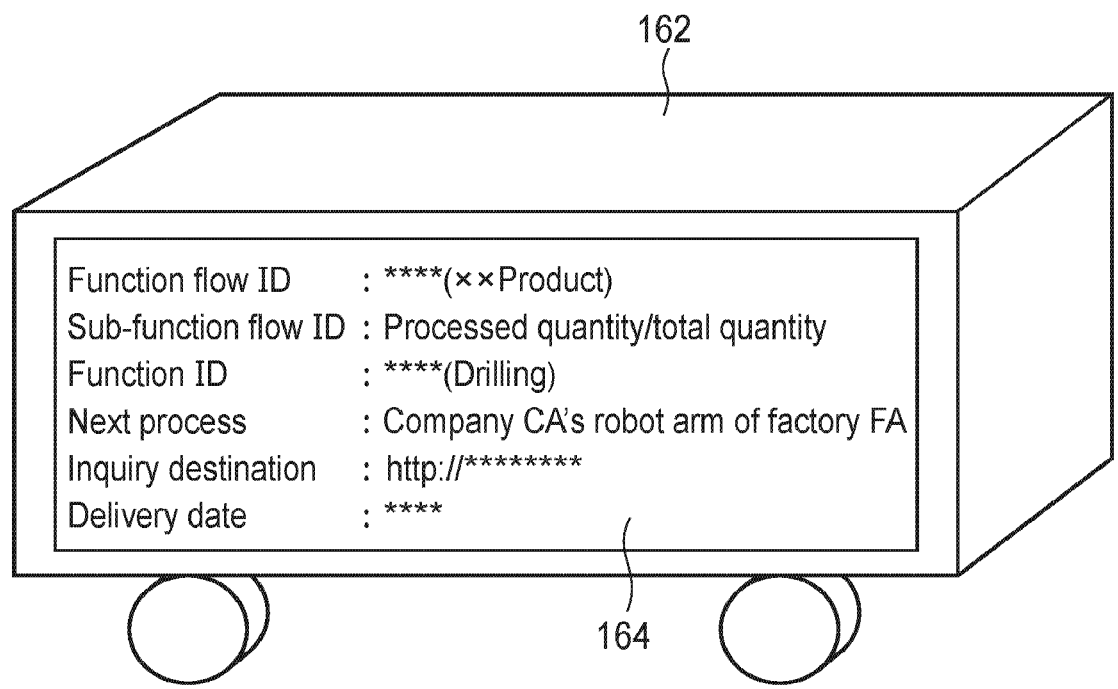
FIG. 36 shows an example of a cart for transporting processed parts from a first device to a second device.

FIG. 36 shows an example of the display content of a display unit 164 of a cart 162 as an example of the device 20 (a transport device 20) that moves processed parts from a manufacturing device to another manufacturing device in a factory. The manufacturing device transmits handover data shown in FIG. 27A to FIG. 31C to the manufacturing device that realizes the next function, and transmits the same data also to the cart 162. The display unit 164 of the cart 162 displays the function flow ID, sub-function flow ID, function ID, next process, inquiry destination, delivery date, etc. The worker of the transport device 20 can see the displayed contents of the next process and reliably transport the processed parts to the other manufacturing device of the next process.

Figure 37:
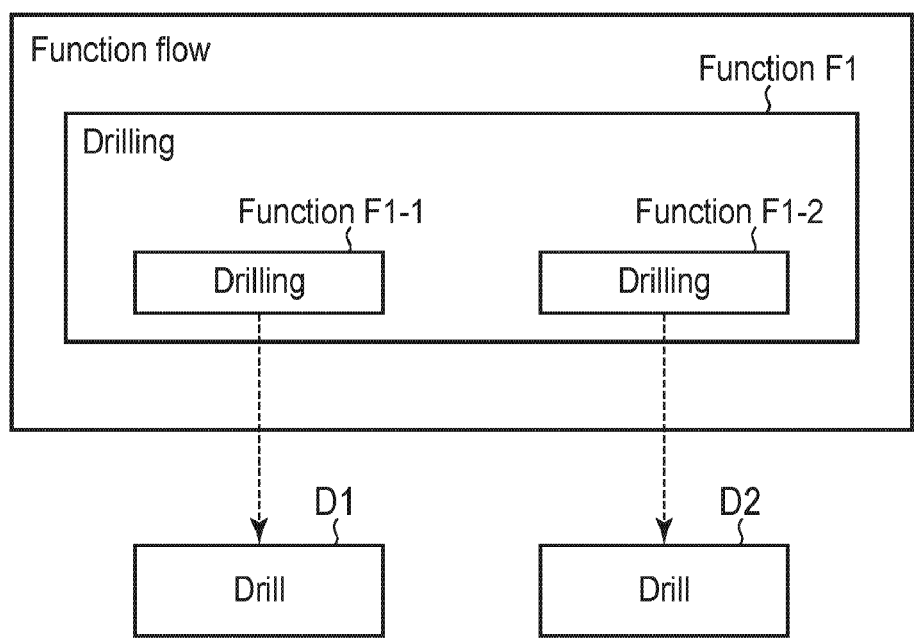
FIG. 37 shows another example of a function flow.

FIG. 37 shows yet another example of a function flow. In this function flow, different function IDs are set for different linked devices even if the functions are the same. For example, in a case of drilling a hole of a predetermined diameter at a predetermined depth in a predetermined position for 1000 parts, suppose that the first to 500th parts are drilled with drill D1 and the 501st to 1000th parts are drilled with drill D2. In the function flow, the drilling function for the first to 500th parts is designated as function F1-1, and the drilling function for the 501st to 1000th parts is designated as function F1-2. The link information is defined so that the drilling function F1-1 is linked to the drill D1, and the drilling function F1-2 is linked to the drill D2. This allows the function linked to the failed device to be identified on the function map when the drill D1 or D2 fails.

Operation Examples of Various Processes
Necessary for Process Management

FIG. 38 and FIG. 39 show a flowchart illustrating an example of creating function flow.

In step S102, the process manager operates the terminal 30 to request a menu display to the server 40. In step S104, the terminal 30 displays the menu transmitted from the server 40. The menu includes icons for various processes that can be executed by the terminal 30, such as an icon for creating a new function flow. In step S106, the process manager selects a new function flow creation icon in the menu. The result of this selection is transmitted to the server 40, and in step S108, the terminal 30 displays a function template transmitted from the server 40 according to the result of this selection. The function template is a list of functions. In step S110, the process manager selects a function in the function template. In step S112, the terminal 30 transmits the information of the selected function to the server 40. In step S114, the terminal 30 displays a recommended candidate of "devices (control program already installed) realizing selected function" transmitted from the server 40.

In step S116, the process manager decides whether or not to agree with the recommended candidate, and inputs the result of the decision to the terminal 30. In a case where the recommended candidate is agreed upon, in step S117, the server 40 assigns the selected function to the recommended candidate device 20 and updates the link information. In a case where the recommended candidate is not agreed upon, in step S118, the terminal 30 displays the domain map transmitted by the server 40. An example of the domain map display can be seen in FIG. 21. In step S120, the process manager selects a "device 20 realizing selected function" in the domain map. In step S122, the terminal 30 transmits the information of the selected device 20 in the domain map to the server 40. In step S124, the server 40 assigns the selected function to the selected device 20, updates the link information, and causes the selected device 20 to install the control program.

In step S126, which is executed subsequently to step S117 or S124, the process manager places a new another icon of the selected function on the function map. In a case where other icon has already been placed, the process manager connects the newly placed icon to the existing icon. The connection status of the icons is stored in the server 40 as function flow information. In step S128, the process manager inputs information to the terminal 30 indicating whether the function flow is completed or not. If information indicating that the function flow is incomplete is input, the process of step S106 is repeated. If information indicating that the function flow is completed is input, in step S130, the terminal 30 requests the server 40 to transmit the function flow information as shown in FIG. 2 to all devices 20 included in the function flow, and the function flow information is transmitted from the server 40 to the devices 20.

FIG. 40 is a sequence chart showing an example of installing the control program in step S124. The terminal 30 requests the server 40 to transmit the link information and domain map (S42). The server 40 transmits the link information and domain map to the terminal 30 (S44). The terminal 30 transmits a communication connection request to the device 20 (S46). The communication connection is established between the terminal 30 and the device 20 (S48). The terminal 30 transmits an instruction to obtain the control program to the device 20 (S50). The device 20 transmits a request to obtain the control program to the server 40 (S52). The server 40 transmits the control program to the device 20 (S54). The device 20 installs the control program (S56). The device 20 transmits a notification of completing the installation of the control program to the server 40 (S58). The server S40 updates the link information (S60) and transmits a notification of updating link information to the terminal 30 (S62).

FIG. 41 is a flowchart showing an example of updating the domain map. The process in FIG. 41 is initiated when a new function is added on the function map and a device assigned to the new function is selected. For example, the process is started when the device is selected in step S120 of FIG. 39. In step S142, the server 40 determines whether or not the selected device supports automatic program installation.

In the case where it is determined that the automatic program installation is supported, in step S144, the server 40 transmits a request to install the control program to the selected device 20. In step S146, the selected device obtains the installation file from the server 40, executes it, installs the control program, and notifies the server 40 of the completion of the installation.

In the case where it is determined that the automatic program installation is not supported, in step S148, the server 40 mails a request to install the control program to the selected device or the terminal of the device's operator. In step S150, the operator of the selected device 20 installs the control program.

In step S152 performed subsequently to step S146 or S150, the server 40 adds the selected device to the domain map and updates the domain map.

Figure 42:
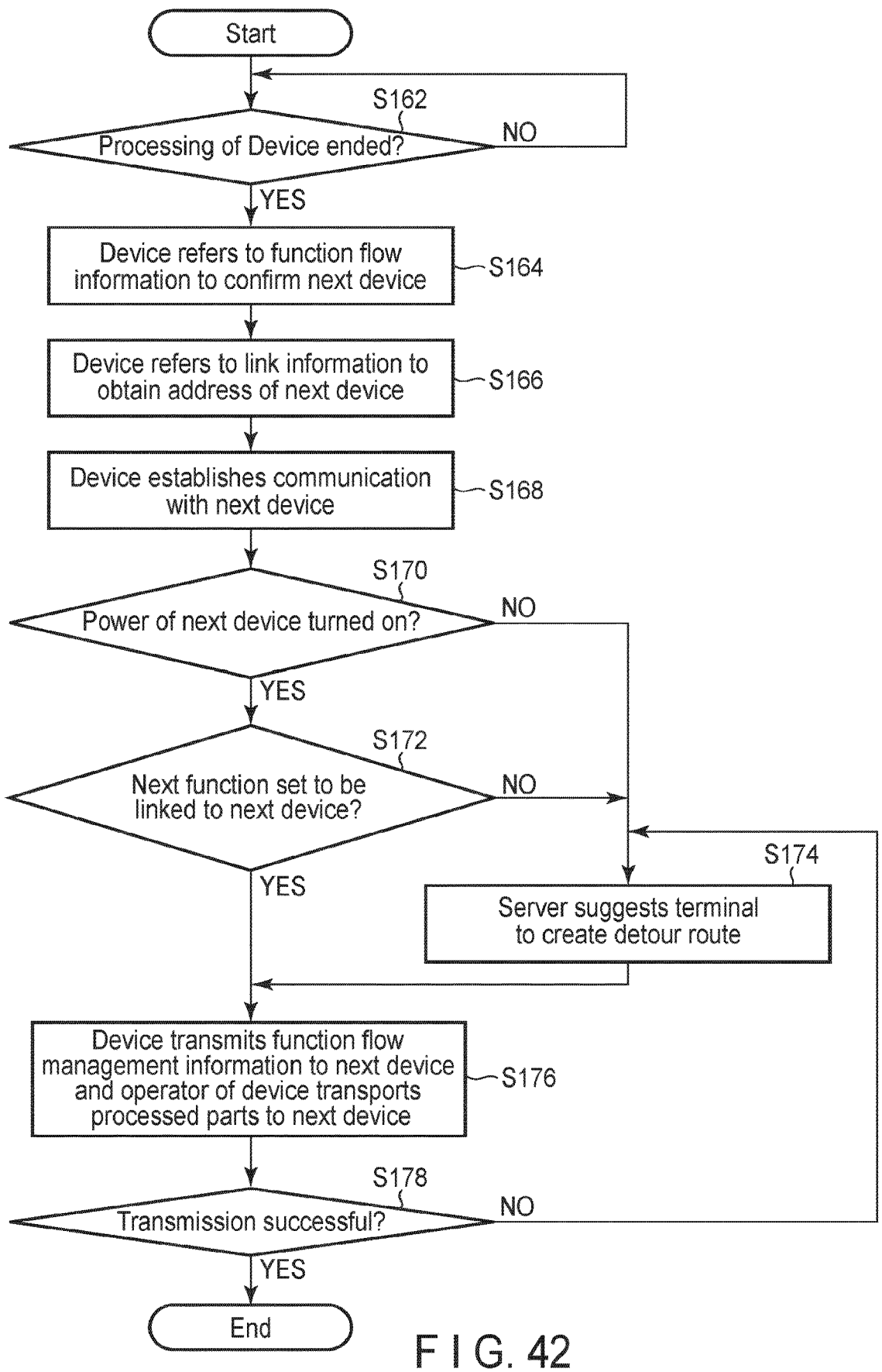
FIG. 42 is a flowchart showing an example of data transmission when processing by the first device is completed.

FIG. 42 is a flowchart showing an example of data transmission and parts transportation when the process of the device 20 is ended. In step S162, the device 20 determines whether or not the processing of one function in one function flow has been ended. In a case where the function flow is "cutting material to make part Pa1, drilling holes in part Pa1 to make part Pa2, and assembling part Pa2 and part Pa3 to make 1000 products", the determination result in step S162 is yes when the cutting, drilling, or assembling of 1000 products is completed.

When the processing of one function is completed, in step S164, the device 20 accesses the server 40 and refers to the function flow information to confirm what the device that realizes the next function on the function flow is. In step S166, the device 20 obtains the identification number (IP address) of the next device by accessing the server 40 and referring to the link information. In step S168, the device 20 establishes communication with the next device. In step S170, the device 20 determines whether the power of the next device is turned on. In the case where it is determined that the power of the next device is on, in step S172, the device 20 accesses the server 40 and refers to the link information to determine whether the next function is set to be linked to the next device.

In the case where it is determined that the power of the next device is not turned on in step S170, or in the case where it is determined that the next function is not set to be linked to the next device in step S172, the device 20 notifies the server 40 of the determination result. When the server 40 receives the notification of the determination result, in step S174, the server 40 suggests to the terminal 30 to create a detour route. The terminal 30 informs the process manager of the suggestion from the server 40. This allows the process manager to create a detour route when necessary.

In the case where it is determined that the link has been set in step S172, or after sufficient time has elapsed for creating a detour route since the suggestion of creating the detour route in step S174, in step S176, the device 20 transmits the handover data including the function flow management information to the next device. The operator of the device 20 transports the processed parts to the next device. In step S178, the device 20 determines whether the data transmission was successful or not. In the case where it is determined that the data transmission has failed, the process returns to step S174, and the server 40 suggests the terminal 30 to create a detour route. In the case where it is determined that the data transmission was successful, the process ends.

Figure 43:
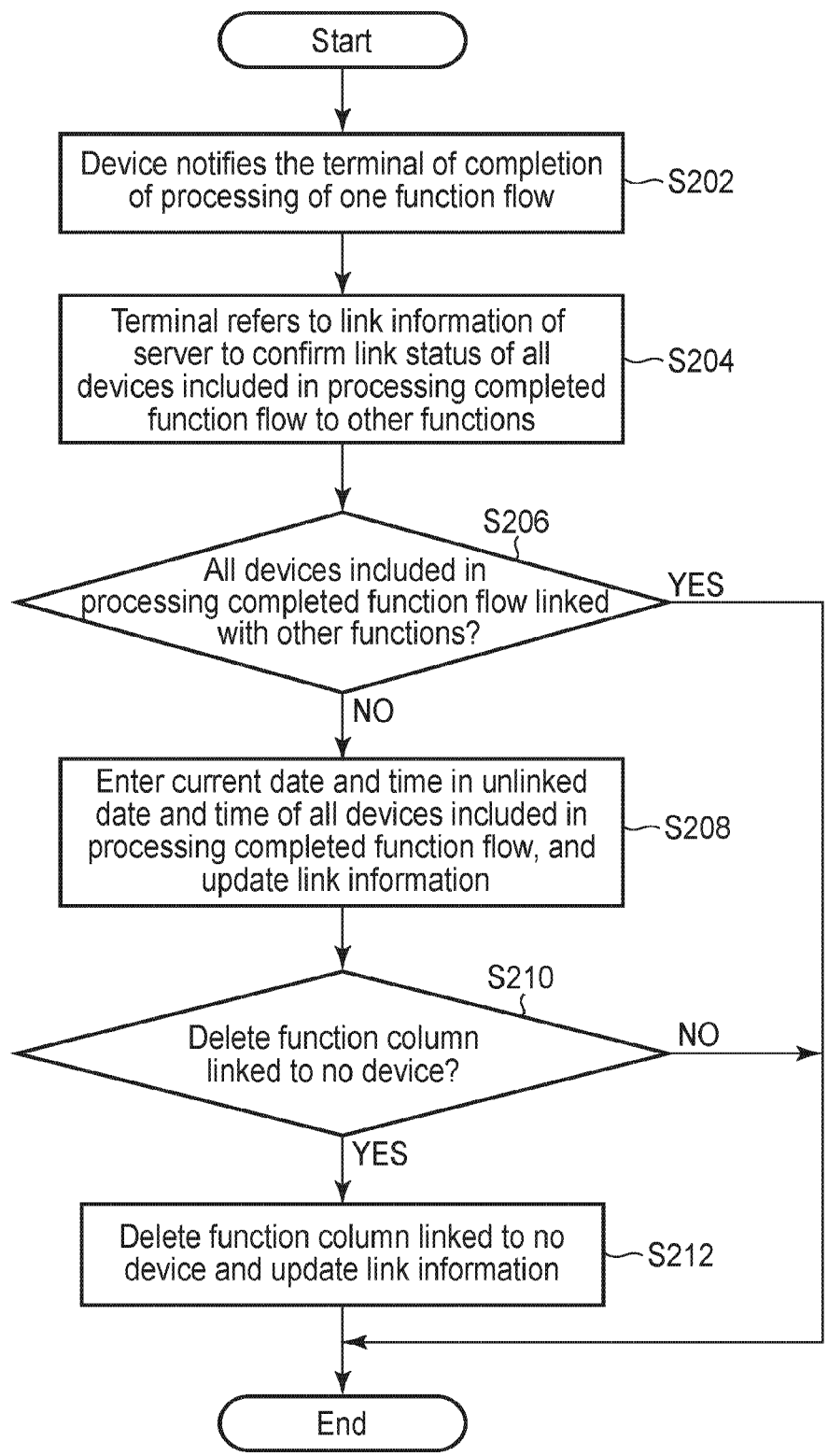
FIG. 43 is a flowchart showing another example of updating link information.

FIG. 43 is an example of a flowchart when the processing of one function flow is completed.

In step S202, the device 20 notifies the terminal 30 of the completion of the processing of one function flow. In step S204, the terminal 30 accesses the server 40 and refers to the link information to detect the devices 20 linked to the functions included in the function flow whose processing has been completed (processing completed function flow), and to confirm the link status of those devices 20 to other functions not included in the processing completed function flow.

In step S206, the terminal 30 determines whether or not the devices 20 linked with the functions included in the processing completed function flow are linked with other functions not included in the processing completed function flow. If it is determined that the device 20 linked to the function included in the processing completed function flow is not linked to other functions not included in the processing completed function flow, in step S208, the terminal 30 enters the current date and time in the unlinked date and time of the device 20 linked to the function included in the processing completed function flow, and updates the link information. The terminal 30 displays the link table based on the link information.

In a case where there is a function column in the link table that is not linked to any device, the process manager viewing the link table decides whether to delete the function column or not in step S210, and enters the result of the decision in the terminal 30. In a case where the process manager decides to delete the function column that is not linked to any device, in step S212, the terminal 30 deletes the function column that is not linked to any device and updates the link information.

Figure 45:
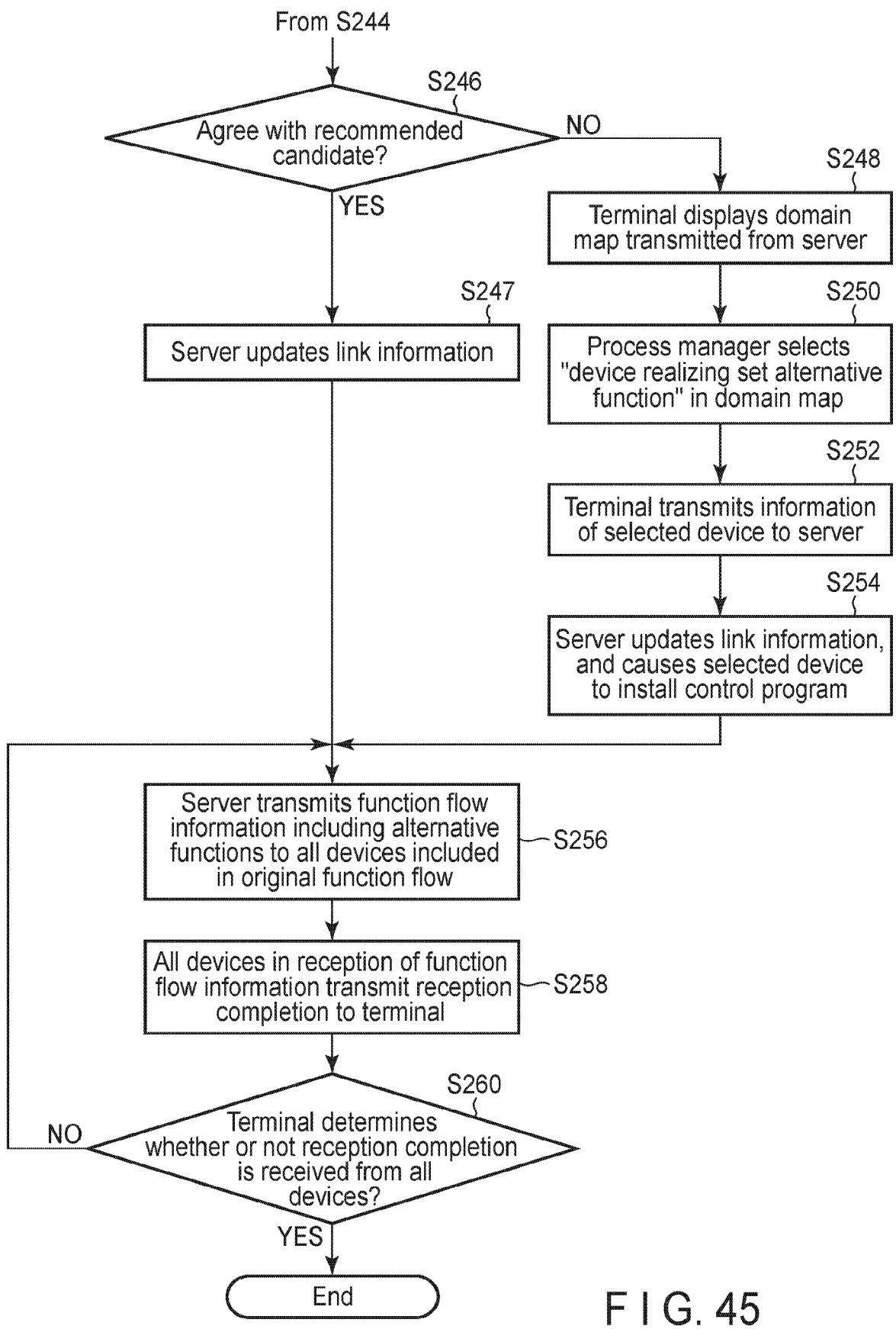
FIG. 45 is a flowchart showing the example of creating the detour route.

FIG. 44 and FIG. 45 are flowcharts showing an example of a detour route formation process.

In step S232, the process manager operates the terminal 30 to request a menu display to the server 40. In step S234, the terminal 30 displays the menu based on a signal transmitted from the server 40. The menu includes icons of various processes that can be executed by the terminal 30, such as detour route creation. In step S236, the process manager selects the detour route creation icon in the menu. A signal indicative of the result of this selection is transmitted to the server 40, and in step S238, the terminal 30 displays the function map based on the signal transmitted from the server 40 in response to the result of this selection. In step S240, the process manager sets an alternative function on the function map as shown in FIG. 18, FIG. 19, etc. In step S242, the terminal 30 transmits the signal of the set alternative function to the server 40. In step S244, the terminal 30 displays the recommended candidate of "device 20 (control program already installed) realizing set alternative function" based on a signal transmitted from the server 40.

In step S246, the process manager decides whether or not to agree with the recommended candidate, and inputs the result of the decision to the terminal 30. In the case where the recommended candidate is agreed upon, in step S247, the server 40 assigns the selected function to the recommended candidate device 20 and updates the link information. In the case where the recommended candidate is disagreed upon, in step S248, the terminal 30 displays the domain map based on a signal transmitted from the server 40, for example, in the manner shown in FIG. 21. In step S250, the process manager selects "device 20 realizing set alternative function" in the domain map. In step S252, the terminal 30 transmits information of the selected device 20 to the server 40. In step S254, the server 40 assigns the set function to the selected device 20, updates the link information, and causes the selected device 20 to install the control program.

In step S256, which is executed subsequently to step S247 or S254, the terminal 30 requests the server 40 to transmit the function flow information including the alternative functions to all the devices 20 included in the original function flow, and a signal is transmitted from the server 40 to the devices 20. In step S258, all devices 20 that have received the signal transmit a signal of reception completion to the terminal 30. In step S260, the terminal 30 determines whether or not the terminal 30 has received the signal of reception completion from all the devices 20. In the case of determining that the signal of reception completion has not been received from at least one of the devices 20, step S256 is repeated.

According to the first embodiment, since process management is performed using the function flow information and the link information, a large number of devices can be used efficiently and process management can be easily changed.

In the embodiment, integrated processing is realized in which a plurality of different functions are processed in cooperation with each other. In the integrated processing, a plurality of different devices share a plurality of different functions. When one device ends processing a function of which it is in charge, it transmits handover data indicating the processing result to the device in charge of the next function via the network. As a means for accomplishing the function, a device consisting of specific hardware may be used or a program installed in a general-purpose device such as a personal computer may be used. In the embodiment, the relationship between the function and the device can be freely changed. Therefore, it is easy to speed up the adaptation of the system and to perform autonomous operation of each component in the system.

SECOND EMBODIMENT

In the first embodiment, an example of a control system applied to a manufacturing system has been described. As a second embodiment of the control system, management of social infrastructure, here, a building management system will be described. FIG. 46 shows an example of a function flow in a building management system. A function layer manages a function flow including an illuminance detection function 182*a* for a predetermined area of a building, an illumination control function 182*b* for a predetermined area of the building, a temperature control function 182*c* for a predetermined area of the building, a temperature detection function 182*d* for a predetermined area of the building, and a centralized control function 182*e*.

In the first embodiment, the functions are connected in series in the order in which they are realized, but in the second embodiment, the functions are connected to a single centralized control function and the functions are not connected to each other. Illuminance data detected by the illuminance detection function 182*a* is transmitted to the centralized control function 182*e*. Illuminance control data from the centralized control function 182*e* is transmitted to the illumination control function 182*b*. Temperature data detected by the temperature detection function 182*d* is transmitted to the centralized control function 182*e*. Temperature control data from the centralized control function 182*e* is transmitted to the temperature control function 182*c*.

Each function of the function flow is linked to each device of the device layer, and the status of the link setting is managed by link information. In an example of the link setting, the illuminance detection function 182*a* is assigned to an illuminance sensor 184*a*, the illumination control function 182*b* is assigned to a fluorescent lamp and power supply unit 184*b*, the temperature control function 182*c* is assigned to an air conditioner 184*c*, and the temperature detection function 182*d* is assigned to a temperature sensor 184*d*. The illuminance sensor 184*a*, the fluorescent lamp and power supply unit 184*b*, the air conditioner 184*c*, and the temperature sensor 184*d* correspond to each of the devices 20 in FIG. 15. The centralized control function 182*e* is assigned to a dedicated device within the devices 20.

Assume that the fluorescent lamp and power supply unit 184*b* have aged. When it is detected that the fluorescent lamp and power supply unit 184*b* have aged, the detection result is transmitted to a terminal 30 of a process manager. As a result, when the terminal 30 displays a function map, the illumination control function 182*b* linked to the fluorescent lamp and power supply unit 184*b* is displayed on the function map in a manner that can be distinguished from other functions. The process manager creates an illumination control function 182*b*-2 on the function map, which is an alternative function (a detour route) of the illumination control function 182*b*, and changes the function flow (function flow information) so that the illuminance control data from the centralized control function 182*e* is not transmitted to the illumination control function 182*b*, but instead the illuminance control data from the centralized control function 182*e* is transmitted to the illumination control function 182*b*-2. When the terminal 30 displays a link table, the process manager updates the link information on the link table so that the illumination control function 182*b*-2 is linked to an LED lighting and drive circuit 184*b*-2.

Figure 47:
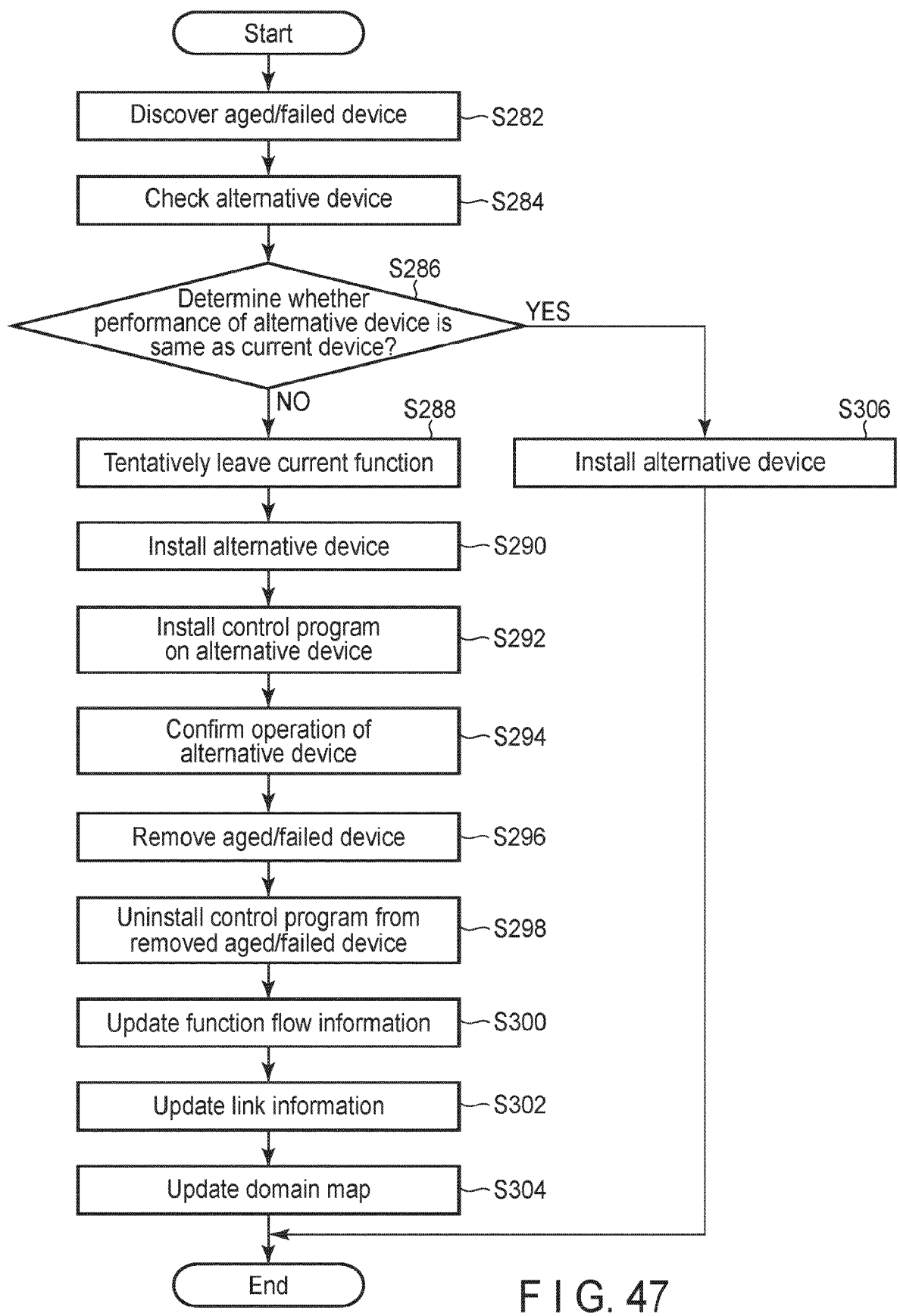
FIG. 47 is a flowchart showing an example of building management of a building management system.

FIG. 47 is a flowchart showing an example of the operation of the building management system. A sensor 26 of each device 20 constantly determines whether each device 20 has aged/failed, and when an aged/failed device is found, in step S282, the device 20 (in this case, the fluorescent lamp and power supply unit 184*b*) notifies the server 40 of the discovery of the aged/failed device. In step S284, the server 40 checks the performance of an alternative device for the aged/failed device. Examples of the alternative device are fluorescent lamps or LEDs. In step S286, the server 40 determines whether the performance of the alternative device is the same as the current device. In the case where it is determined that the performance of the alternative device is the same as that of the current device, installation of the alternative device is performed in step S306. In the case where the alternative device is a fluorescent lamp, the performance of the fluorescent lamp is the same as that of the current device so that the current device is replaced with the fluorescent lamp.

In the case where it is determined that the performance of the alternative device is not the same as that of the current device (if the alternative device is LED), in step S288, the server 40 decides to tentatively leave the current function (illumination control function 182*b*) in the function map. Subsequently, in step S290, the installation of the alternative device (LED lighting and drive circuit 184*b*-2) is carried out. In step S292, the server 40 causes the LED lighting and drive circuit 184*b*-2 to install a control program. Subsequently, in step S294, the operation of the LED lighting and drive circuit 184*b*-2 is confirmed. In a case where normal operation is not confirmed, if there are other alternative devices, other alternative devices are checked (step S284). If there are no other alternative devices, the process is ended.

In the case where normal operation is confirmed, the removal of the aged/failed device is carried out in step S296. In step S298, the control program is uninstalled from the removed aged/failed device. In step S300, the server 40 causes the process manager to update the function flow. The process manager drags and drops an icon of the illumination control function 182*b* on the function map to create an icon of the second illumination control function (the detour route) 182*b*-2, and updates the function flow information. The updated function flow information is disclosed on a network. The disclosed function flow information may also be further updated by other process managers. In step S302, the server 40 causes the process manager to update the link information. The process manager cancels the link from the illumination control function 182*b* to the fluorescent lamp and power supply unit 184*b* and sets a link from the second illumination control function 182*b*-2 to the LED lighting and drive circuit 184*b*-2 on the link table, and updates the link information. The updated link table is disclosed on the network. The disclosed link information may also be further updated by other process managers. In step S304, the server 40 updates a domain map. The updated domain map is also disclosed on the network. The disclosed domain map may also be further updated by other process managers.

According to the second embodiment, the concept of process management is applied to facility management, a large number of facilities are controlled using the function flow and the link table, and process management is easily modified.

THIRD EMBODIMENT

A manufacturing skill platform system is described as a third embodiment of a control system. FIG. 48 is a diagram describing the concept of the manufacturing skill platform system of the present embodiment. This manufacturing skill platform system is hereinafter referred to as a digital master platform.

The digital master platform is, for example, a system implemented by combining the Internet of Things (IoT) technology and the Artificial Intelligence (AI) technology. Examples of the digital master platform are broadly classified into a phase to create a digital master 530 and a phase to utilize the digital master 530.

First, a summary of the phase to create the digital master 530 will be described.

The digital master platform constructs a digital twin 502 that reproduces, for example, the work performed by workers (including a master 510 having a superior skill, i.e., a real worker called master) in physical space 501 such as a production line J in cyberspace. The production line J corresponds to the manufacturing system including the devices 20 described in the first embodiment. In the first and second embodiments, the workers do not need to operate the devices 20 when realizing the functions. In the third embodiment, the workers sometimes operate the devices. This operation requires skills. The third embodiment relates to a system that takes advantage of the skills of the master 510. The digital master platform builds a master digital twin 503 that reproduces the work done by the master 510 in the physical space 501 in cyber space, using data w2 related to the work done by the master 510 in data w1 that is acquired to build this digital twin 502. Here, the skills of the master 510 include those that are not visualized, which are also generally referred to as "know-how".

The skills of the master 510 can be derived from daily reports or trouble reports (in natural language), and analysis of sounds and vibrations. In addition, the skills of the master 510 can be digitized by sensing the situations that the master 510 grasps with the five senses. The movements of the master 510 can also be grasped through voice and image recognition, and other means, such as wristbands. The movements of the master 510 is analyzed to determine skills of the master 510, which is based on experience. In other words, by using the IoT and AI, the skills of the master 510 can be quantified and formalized.

Next, the phase of utilizing the digital master 530 will be described. By digitizing the skills of skilled workers (experts) such as the master 510, the skills of these people can be inherited, human resources can be developed, and automation and autonomy can be performed as needed. That is, the experience and tacit knowledge of the master 510 can be passed on to future generations through digitization. The skills of the master 510, which have been quantified and formalized in the above manner, can be transmitted as information to workers other than the master, so that the workers who are given the skills information can judge appropriate actions in the same way as the master, and execute the appropriate actions accurately and rapidly.

Here, the information in the physical space 501 is transmitted to the cyber space in almost real time by utilizing IoT, etc., and the environment of the physical space 501 is reproduced in the cyber space, which is referred to as "digital twin". The method of building the digital twins 502 and 503 formed in the cyber space is not limited to a specific method, and various known methods can be adopted. In addition, IoT technology can be applied in the acquisition of data to build the digital twins 502 and 503.

Specifically, data for building the digital twins 502 and 503 includes, for example, information on events recognized by the five senses, such as those seen, heard, or touched by the worker, information on the worker's line of sight or movement of a specific part of the body, information on the state of a device handled by the worker, or information on the worker's deliverables (not limited to manufactured products, but including plans, etc.). The line of sight of the worker or the movement of a specific part of the worker may, for example, be detected by attaching a sensor to the worker, or detected from an image of the worker taken by a camera. In other words, one of the data for building the digital twins 502 and 503 may be a captured image of the worker. In addition, in the case of detecting the eye movement of the worker from the image, a camera for capturing the image may be mounted on glasses worn by the worker. As described above, the method of acquiring data for building the digital twins 502 and 503 is not limited to a specific method, and various known methods may be employed. It is also possible to change the method as the IoT technology evolves.

The data acquired to build the digital twins 502 and 503 includes data belonging to the input of the worker and data belonging to the output of the worker. For example, consider the case in which a worker recognizes some event by the five senses, such as seeing, hearing, touching, etc., and takes some action. In that case, the information about some event that the worker recognized by the five senses, such as seeing, hearing, touching, etc., is acquired as data that belongs to the worker's input. In parallel, information about some action taken by the worker is acquired as data belonging to the worker's output. To the data belonging to the input or output of the worker obtained in this way, for example, identification information that can identify the production base or individual is added. This identification information can be used in the process of extracting data related to work by the master 510 (to build the master digital twin 503) from the data of the digital twin 502.

In FIG. 48, for the sake of clarity, the master 510 is shown to be present in one production base (production line J); however, the masters 510 can be scattered in multiple production bases in different locations. Furthermore, the masters 510 may also be considered as being present in one production base (FIG. 48 is not intended to show that there is only one master 510 on production line J). The masters 510 are a mix of people with excellent skills in various fields and processes, such as "operation", "quality", "production planning", and "inventory", for example.

Of course, there are cases where these superior skills originate from each of the workers, but there are also cases where a single worker has multiple superior skills.

A plurality of masters 520 (520-1, 520-2, 520-3, . . . , 520-N) on the master digital twin 503 are a collection of data relating to the work done by the masters 510. The digital master platform models the skills of each of these masters 510, for example, by deep learning using the data of the masters 520 on this master digital twin 503 as training data. The digital master 530 is a module for distributing the skills of the masters 510 using the neural network created by this modeling (a master model). Creating the digital master 530 is, in effect, modeling the skills of the masters 510. In other words, it is to create a "master model".

For example, consider the case of creating a master model, i.e., the digital master 530, which models the skills of the masters 510 working on the production line J. In this case, from the information (input) relating to some event that a worker perceives with the five senses, such as seeing, hearing, touching, etc., on a production line K where the master 510 is not present, some action (output) that the master 510 would take can be estimated, and the estimated result can be reflected on the production line K. In other words, skill information w3 indicating the skills of the master 510 can be distributed on the network through a controller (not shown) of the digital master platform. As shown in FIG. 33, since the administration shell can be linked through Web API and service API, information can be distributed over the network through the administration shell as a service.

In the present embodiment, in addition to the function flow information, each skill information w3 of the masters 510 (the masters 520, each of which is a collection of data related to work done by the masters 510) is also managed as an asset using the administration shell. In other words, the administration shell allows function flow information and skill information w3 to be connected to the network through a standardized communication interface, and also allows assets to communicate with each other. This makes it possible for any production line other than the production line J, for example the production line K, to follow the function flow and perform efficient manufacturing using the skill information w3 of the master. The skill information w3 is displayed on the display unit 28 of the device 20 or a display unit of the terminal 30.

Information to be collected in creating the digital master 530, for example, "operation", "quality", "production plan", "inventory", and all other "things of value to the organization" at all levels can be assets. In such case, "things" such as facilities and machines may be linked thereto and managed.

As shown in FIG. 32, the function flow body 404 of the administration shell 401 includes a number of sub-models 410A, 410B, . . . , and through these sub-models 410A, 410B, . . . , various aspects of the asset 412 can be described. Each of the sub-models 410A, 410B, . . . deals with one well-defined field (theme), and these sub-models are configured by a number of attributes classified into a hierarchy. Thus, any information on the asset 412, such as data of the asset 412 (various digital data taken from the master 510 that make up the digital master 530), can be an attribute. The information on the asset 412 can be provided through the attributes. Through the administration shell 401, which includes the sub-models 410A, 410B, . . . , the digital master 530 can be distributed over a network for use and utilization.

The production line K can be viewed as the future production line J after the master 510 retires. In addition, AI technology can be applied to model the skills of the master 510.

According to the third embodiment, the skills of masters can be distributed in both time and space, such as passing on the skills of masters to the next generation and transmitting the skills of masters to overseas.

FOURTH EMBODIMENT

An asset management system as a fourth embodiment of a control system will be described. FIG. 49 is a block diagram showing an example of the asset management system.

A plurality of devices 60-1 to 60-$m1$ (in some cases, collectively referred to a device 60) and a plurality of servers 70-1 to 70-$m3$ (in some cases, collectively referred to a server 70) are connected to the network 10. An asset manager who performs financial transactions operates the device 60 to link with the server 70, receives data for asset management from the server 70, and performs transactions for asset management. The device 60 includes notebook and tablet personal computers, smart phones, and the like. Each of the devices 60 includes the controller 22, display unit 28, and input unit 29. The input unit 29 includes a mouse, keyboard, etc. The display unit 28 may be equipped with a touch panel type display and input device. The server 70 is provided for each financial institution and stores the function flow information 42 and link information 44.

FIG. 50 shows an example of an overview of the asset management system. The asset management includes the function layer, intermediate layer, and a means layer. The function layer manages the function flow. The means layer manages the actual assets. Examples of functions provided by the functional layer include a bank account deposit function, an online government bond purchase function, an online stock certificate trading function, a virtual currency trading function, and an online exchange procedure function. The bank account deposit function is a real-world financial transaction, and the online government bond purchase function, online stock certificate trading function, virtual currency trading function, and online exchange procedure function are virtual-world financial transactions on the network. For an asset manager who is conducting financial transactions in the real world to switch to financial transactions in the virtual world can be regarded as a functional detour. Unlike the first and second embodiments, the temporal order in which the functions are realized is not defined in the function flow, and the timing for the realization of all functions is switched by the asset manager as appropriate.

In manufacturing systems, those that realize functions are referred to as devices, while in financial systems, those that realize functions are referred to as means. The means layer includes a means necessary to realize each function of the function layer, such as local currency, virtual currency, government bond certificates, stock certificates, and currency of other countries. Therefore, the means layer plays a role corresponding to the device layer described above, and is applicable to the concept of the device layer.

The intermediate layer includes a communication protocol and link information in the same manner as in the first and second embodiments, and further includes a detour evaluation unit. The link information defines that the bank account deposit function is linked to the local currency, the online government bond purchase function is linked to the government bond certificate, the online stock certificate trading function is linked to the stock certificate, the virtual currency trading function is linked to the virtual currency, and the online exchange procedure function is linked to the currency of other countries. When the asset manager realizes the functions in the function layer as appropriate, the means in the means layer linked to the functions are executed, and financial transactions take place.

Each function has attributes related to the value of the function. Examples of the attributes include a deposit interest rate for the bank account deposit function, a government bond interest rate for the online government bond purchase function, a stock price for the online stock certificate trading function, a virtual currency rate for the virtual currency trading function, and an exchange rate for the online exchange procedure function.

The detour evaluation unit calculates the commercial value of financial transactions obtained by realizing each function. FIG. 51 shows an example of the detour evaluation unit. A conversion unit stores the deposit interest rate, the government bond interest rate, the stock price, the virtual currency rate, and the exchange rate. When the asset manager makes a deposit in a bank account, the value of the deposit is calculated based on the deposit interest rate; when the asset manager purchases a government bond online, the value of the government bond is calculated based on the government bond interest rate; when the asset manager purchases a stock certificate online, the value of the stock certificate is calculated based on the stock price; when the asset manager purchases or sells virtual currency, the value of the virtual currency transaction is calculated based on the virtual currency rate; and when the asset manager conducts an exchange transaction online, the value of the transaction is calculated based on the exchange rate. When calculating the value of each transaction, the conversion unit converts the value into the same monetary value.

According to the fourth embodiment, the asset manager can accurately determine what transactions will increase the assets the most.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A control system, comprising:
 a first device and a second device, each capable of realizing a plurality of functions;
 a controller configured to:
  store first information indicative of a realizing order of a first function and a second function to realize a process, and store second information indicating that the first function is assigned to one of the first device and the second device and the second function is assigned to another of the first device and the second device, and
  operate the first device and the second device based on the first information and the second information;
 a terminal connected to the controller and that includes a display device and an input device, the terminal configured to display on the display device a first icon indicative of the first function, a second icon indicative of the second function, and a first route image, the first icon and the second icon arranged in the realizing order, the first route image arranged between the first icon and the second icon; and a sensor configured to detect a status of the first device and a status of the second device; wherein when the sensor detects that the second device does not operate, the sensor sends a detection result to the controller;

when the controller receives the detection result, the controller sends an alert to the terminal;

when the terminal receives the alert, the terminal displays a mark on one of the first icon and the second icon indicative of a function assigned to the second device; and the terminal is configured to:
  change a position of the one of the first icon and the second icon on which the mark is displayed, based on an operation of the input device, and
  display a third icon indicative of an alternative function of the function assigned to the second device on the display device and a second route image between the third icon and another of the first icon and the second icon on which the mark is not displayed.

2. The control system of claim 1, wherein
the first device comprises a transmission unit that transmits handover data to the second device or the controller when the first device realizes an assigned function, and
the handover data comprises:
identification information that identifies the first information;
function information that indicates a function realized by the first device; and
result information that indicates processing result of the function realized by the first device.

3. The control system of claim 2, wherein the handover data further comprises realization deadline information for the function realized by the first device and realization date and time information for the function realized by the first device.

4. The control system of claim 2, wherein the transmission unit transmits the handover data using an administration shell defined in Industry 4.0.

5. The control system of claim 1, wherein the first device and the second device are located in a plurality of factories of a same company or a plurality of factories of a plurality of companies.

6. A control method for operating a first device and a second device based on first information and second information, the first information indicative of a realizing order of a first function and a second function to realize a process, the second information representing that the first function is assigned to one of the first device and the second device and the second function is assigned to another of the first device and the second device, comprising:
  displaying, on a display device, a first icon indicative of the first function, a second icon indicative of the second function, and a first route image, the first icon and the second icon arranged in the realizing order, the first route image arranged between the first icon and the second icon;
  detecting that the second device does not operate;
  displaying, in response to detecting that the second device does not operate, a mark on one of the first icon and the second icon indicative of a function assigned to the second device;
  receiving an operation of an input device;
  changing a position of the one of the first icon and the second icon on which the mark is displayed, based on the received operation of the input device; and
  displaying a third icon indicative of an alternative function of the function assigned to the second device and a second route image between the third icon and another of the first icon and the second icon on which the mark is not displayed.

7. The control method of claim 6, wherein
the first device transmits handover data to the second device, and
the handover data comprises:
identification information that identifies the first information;
function information that indicates a function realized by the first device; and
result information that indicates processing result of the function realized by the first device.

* * * * *